US010894664B1

(12) United States Patent
Brady et al.

(10) Patent No.: US 10,894,664 B1
(45) Date of Patent: Jan. 19, 2021

(54) MOBILE SORTATION AND DELIVERY OF MULTIPLE ITEMS

(71) Applicant: Amazon Technologies, Inc., Seattle, WA (US)

(72) Inventors: Tye Michael Brady, Southborough, MA (US); Joseph Quinlivan, Medway, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/023,686

(22) Filed: Jun. 29, 2018

(51) Int. Cl.
*B65G 1/04* (2006.01)
*G05D 1/00* (2006.01)

(52) U.S. Cl.
CPC .......... *B65G 1/0492* (2013.01); *G05D 1/0088* (2013.01); *G05D 2201/0216* (2013.01)

(58) Field of Classification Search
CPC combination set(s) only.
See application file for complete search history.

(56) References Cited

U.S. PATENT DOCUMENTS

| | | | |
|---|---|---|---|
| 8,820,509 B2 | 9/2014 | Shatters | |
| 9,002,506 B1* | 4/2015 | Agarwal | B65G 1/137 700/216 |
| 9,067,743 B1 | 6/2015 | Sotelo et al. | |
| 9,519,882 B2* | 12/2016 | Galluzzo | B25J 5/007 |
| 9,637,318 B2* | 5/2017 | Messina | B65G 41/008 |
| 9,733,646 B1* | 8/2017 | Nusser | B65G 1/137 |
| 10,392,190 B1* | 8/2019 | Theobald | G05D 1/0212 |
| 2009/0165524 A1 | 7/2009 | Hoffman | |
| 2009/0252577 A1 | 10/2009 | Tuffs et al. | |
| 2012/0059545 A1 | 3/2012 | Furuno et al. | |
| 2015/0274421 A1* | 10/2015 | Yamada | B65G 1/0492 700/218 |
| 2016/0176638 A1* | 6/2016 | Toebes | G06Q 10/087 700/216 |

(Continued)

FOREIGN PATENT DOCUMENTS

WO 2006044108 A3 5/2007

OTHER PUBLICATIONS

"Adept Lynx Platform Peripherals Guide," Adept Technology, Inc., Dec. 2015, 132 pages.

(Continued)

*Primary Examiner* — Kyle O Logan
(74) *Attorney, Agent, or Firm* — Athorus, PLLC

(57) ABSTRACT

Autonomous mobile robots include transfer systems that may receive multiple items for delivery to one or more destinations. The transfer systems may be specifically configured to detect and identify items that are placed on loading surfaces, and to independently discharge specific items at selected destinations or to selected recipients. The transfer systems feature loading surfaces that may be defined by a plurality of independently operable conveyors to receive or discharge items, by independently operable floors that allow items to pass therethrough, or by independently operable diverters for detecting and expelling items therefrom. The transfer systems may receive items from, or discharge items to, one or more humans, other robots, or other systems such as conveyors, chutes, robotic arms or other mechanical implements or effectors, and be aligned at any angle or provided at any height, as desired.

22 Claims, 48 Drawing Sheets

(56) References Cited

U.S. PATENT DOCUMENTS

2016/0236867 A1* 8/2016 Brazeau ............... B65G 1/1378
2016/0236869 A1* 8/2016 Kimura ................ G05D 1/0297

OTHER PUBLICATIONS

"Adept Lynx Platform User's Guide," Adept Technology, Inc., Jan. 2015, 126 pages.
"Lynx Conveyor," Specifications, Adept Technology, Inc., 2014, 2 pages.
PCT Search Report and Written Opinion dated May 17, 2016 for PCT Application No. PCT/US2015/064802, 8 pages.

* cited by examiner

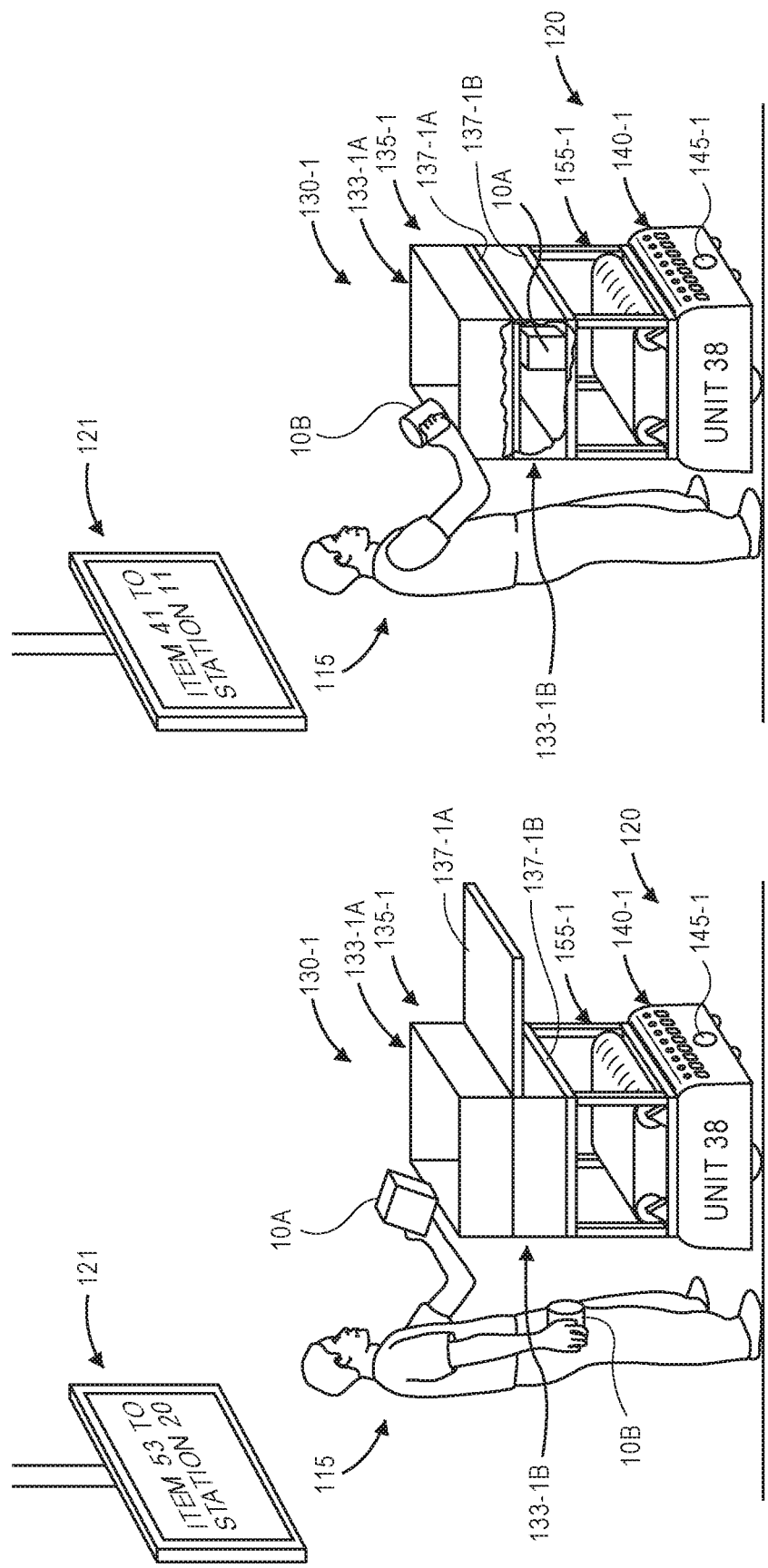

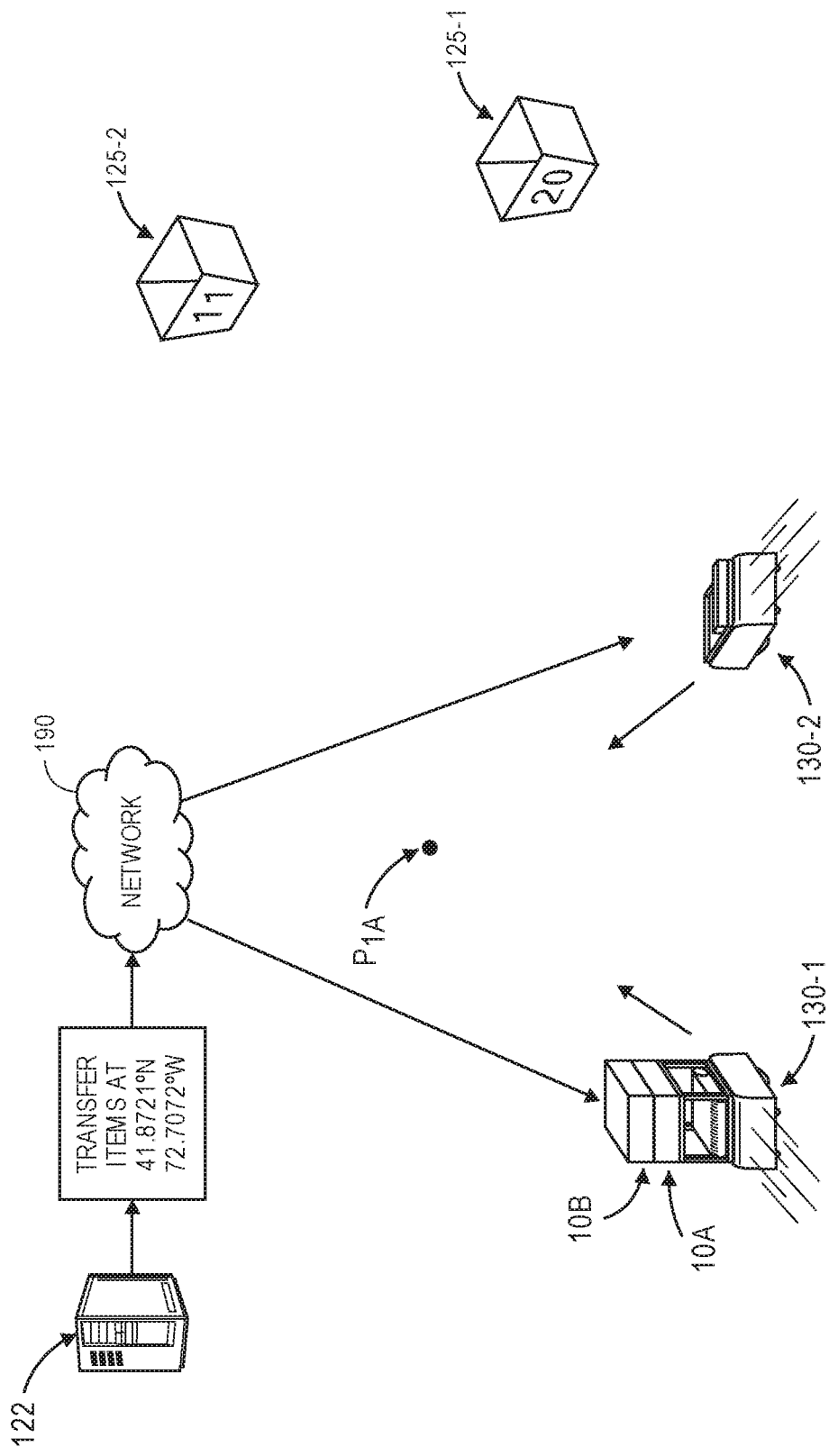

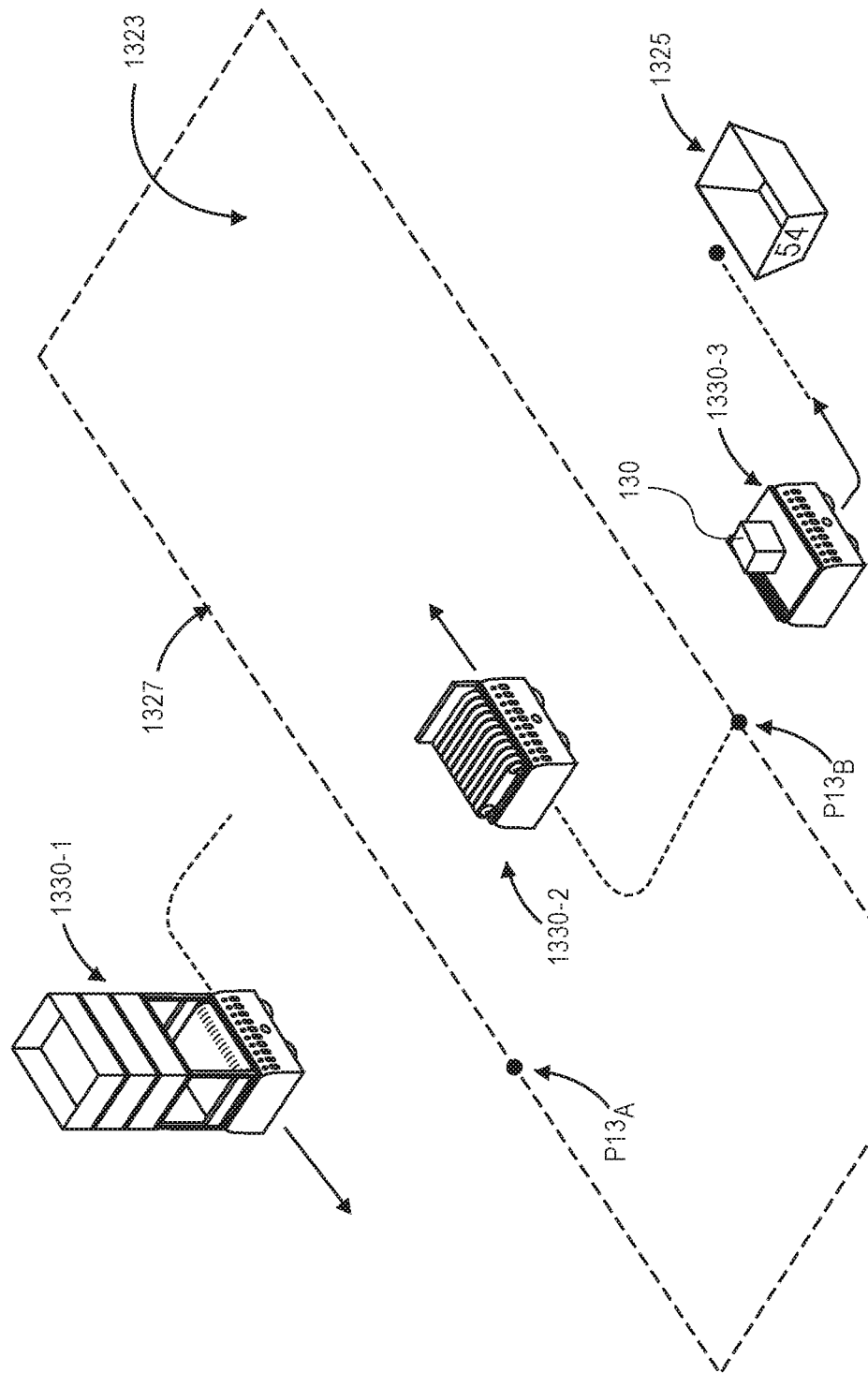

US 10,894,664 B1

MOBILE SORTATION AND DELIVERY OF MULTIPLE ITEMS

BACKGROUND

An order fulfillment center is a facility, a warehouse or another like structure that is constructed in a distributed, centralized location and adapted to receive items from sources of items (e.g., manufacturers, merchants, vendors or other fulfillment centers). A fulfillment center may include stations for receiving shipments of items, for storing such items, for preparing such items for delivery to customers, and/or for sorting packages of such items according to delivery locations. When an order for the purchase of one or more of the items stored in a fulfillment center is received from a customer, the ordered items may be retrieved from the spaces or areas in which such items are stored, and prepared for delivery to the customer, e.g., by packing the ordered items into one or more appropriate containers with a sufficient type and amount of dunnage, and delivering the containers to a destination designated by the customer. Once packaged, the packaged item may be grouped with other packages that are headed towards a similar geography and/or delivery route. The present disclosure relates to a system that may be used to facilitate the order fulfillment process, including sorting packages according to delivery route.

BRIEF DESCRIPTION OF THE DRAWINGS

FIGS. 1A through 1I are views of aspects of one system for mobile sortation and delivery of items in accordance with embodiments of the present disclosure.

FIGS. 13A through 13H are views of aspects of one system for mobile sortation and delivery of items in accordance with embodiments of the present disclosure.

DETAILED DESCRIPTION

Figure 1D:
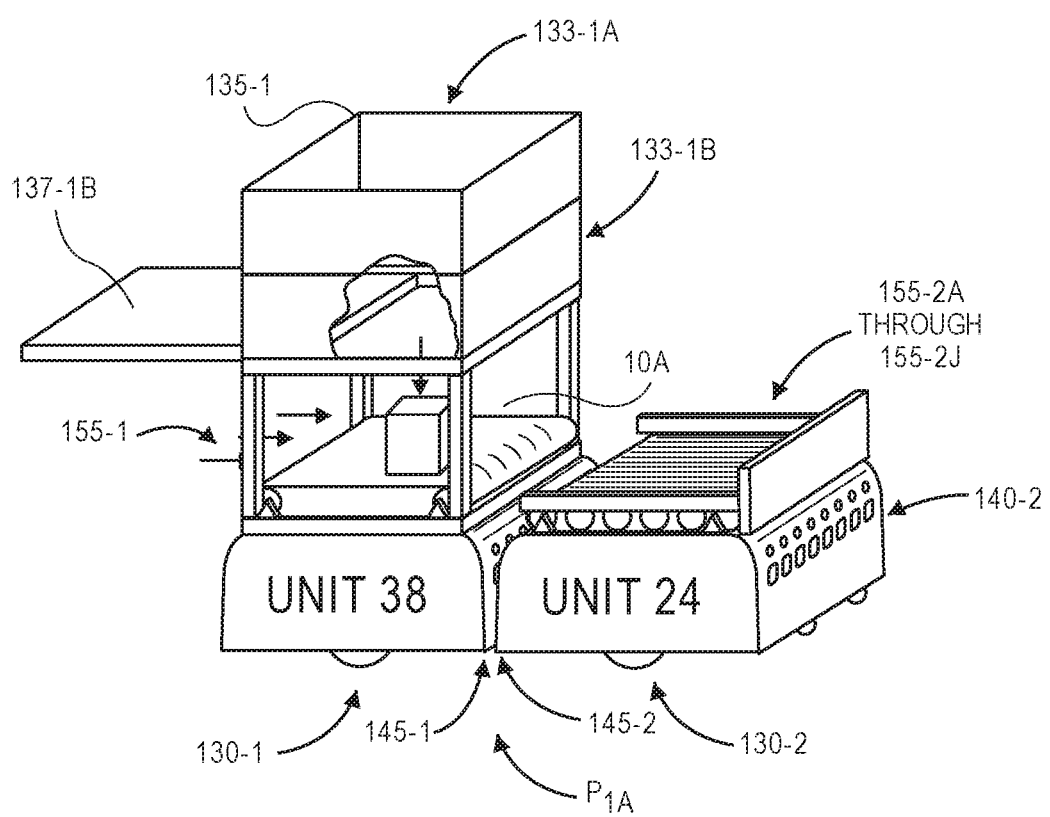

As is set forth in greater detail below, the present disclosure is directed to distributing items from one location to another by one or more autonomous mobile robots. Each of the robots may be independently configured with one or more independently configurable transfer systems for individually or collectively receiving items from an origin (or source), which may be a human operator, a workstation or another robot, or for individually or collectively transferring the items to a recipient (or destination), which may also be a human operator, a workstation or another robot. The transfer systems may be releasably mounted to drive units in a modular fashion.

In some embodiments, a transfer system may comprise a plurality of conveyors aligned in series, and a loading surface or storage surface defined by upper surfaces of the conveyors. During operation, when an item is to be discharged from a robot, the transfer system may identify a select number of conveyors upon which the item rests, e.g., using tension sensors provided within such belts, load sensors associated with such belts, imaging devices including such belts within their respective fields of view, proximity sensors, or any other sensors. Upon identifying the conveyors upon which the item rests, the transfer system may cause the conveyors to translate in a direction toward the selected destination. In some embodiments, a transfer system may comprise a receptacle or another vertically aligned storage unit having one or more deployable floors defining one or more chambers disposed above the robot. For example, the receptacle may define a chamber configured to hold one or more packages. The chamber may have a generally cuboidal shape, or alternatively may have other shapes, such as a conical or funnel shape, or a frustopyramidal shape, as may be employed in a hopper. During operation, when an item is to be discharged from the robot, the item may be identified as being disposed within one of the chambers, and one or more of the deployable floors may be selectively operated to cause the item to descend onto a conveyor belt, which may be translated in a direction toward the selected destination. In some embodiments, a transfer system may comprise a plurality of diverters aligned in series along one side of a loading surface or storage surface, and each of the diverters may be configured to be independently extended along specific paths across the loading surface or storage surface. During operation, when an item is to be discharged from the robot, the diverters that are determined to have an item to be discharged within their respective paths, e.g., based on data captured by proximity sensors within contact surfaces of the diverters, or any other sensor provided in association with the diverters or the loading surface or storage surface, may be extended by sufficient distances to cause the item to be discharged from the loading surface or storage surface.

One or more of the transfer systems disclosed herein may further feature loading surfaces or storage surfaces that are configured to be raised, lowered or translated with respect to a drive unit, or oriented at any selected angles, to further enhance the receipt of items on such surfaces or the discharge of items from such surfaces or, alternatively, to aid in the maintenance or replacement of one or more components, such as conveyor belts. Additionally, one or more of the robots disclosed herein may be designated for operation in a specific zone, or restricted from operation within a specific zone. When an item is to be delivered to a destination within a restricted zone, or when an optimal path or route for delivering an item passes through a restricted zone, one robot may transfer the item to another robot at a boundary of the restricted zone, e.g., by one or more of the transfer systems disclosed herein.

Referring to FIGS. 1A through 1I, views of aspects of one system for mobile sortation and delivery of items in accordance with embodiments of the present disclosure are shown. As is shown in FIGS. 1A and 1B, the system includes a worker 115 at a fulfillment center 120 (or warehouse or other like facility), and a robot 130-1. The worker 115 bears an item 10A and an item 10B. The robot 130-1 includes a vertical receptacle 135-1 mounted to a drive unit 140-1. The receptacle 135-1 has a pair of deployable floors 137-1A, 137-1B, and defines a pair of chambers 133-1A, 133-1B in which one or more items may be loaded or stored. For example, the chamber 133-1B is defined by interior surfaces of the receptacle 135-1 between an upper surface of the deployable floor 137-1B and a lower surface of the deployable floor 137-1A, while the chamber 133-1A is defined by interior surfaces of the receptacle 135-1 above an upper surface of the deployable floor 137-1A. The deployable floors 137-1A, 137-1B may each travel between loading or storage positions (or closed positions) within the receptacle 135-1 and release positions (or open positions) outside of the receptacle 135-1, e.g., extending through lateral openings in the receptacle 135-1.

The drive unit 140-1 includes any number of wheels mounted to axles that may be rotated by one or more motors, and may be sized and configured to travel on roads or other surfaces at various times or during various levels of congestion, and at various speeds, e.g., in response to one or more computer-based instructions. The drive unit 140-1 further includes a sensor 145-1 and a conveyor 155-1 provided beneath the chamber 133-1B of the receptacle 135-1. In some embodiments, the conveyor 155-1 may be configured to be raised, lowered or translated in any direction with respect to the drive unit 140-1, e.g., along a direction of one or more axes, or aligned at any angle with respect to the drive unit 140-1, e.g., about one or more axes, and operated at various speeds, e.g., in response to one or more computer-based instructions.

The sensor 145-1 may be used to detect the presence of one or more objects, to determine ranges to one or more objects, or to identify one or more objects, and may include an imaging device having any form of recording sensor or device (e.g., digital cameras, depth sensors or range cameras, infrared cameras, radiographic cameras or other sensors), a proximity sensor or any other device or component for determining positions, geolocations and/or elevations, as well as one or more environmental or operational sensors. The sensor 145-1 may further be an item identification sensor (e.g., a bar code scanner, a radiofrequency identification transmitter or reader), or any other component. The conveyor 155-1 is a motorized, belted conveyor for translating an object in forward or reverse directions along an axis.

As is shown in FIGS. 1A and 1B, and in response to instructions provided on a display 121 at the fulfillment center 120, the worker 115 manually deposits the items 10A, 10B into the receptacle 135-1 of the robot 130-1. First, as is shown in FIG. 1A, the worker 115 deposits the item 10A into the receptacle 135-1, with the deployable floor 137-1A extended outwardly therefrom into an open position, thereby enabling the item 10A to descend through the chamber 133-1A and into the chamber 133-1B, where the item 10A comes to a rest on the upper surface of the deployable floor 137-1B. Next, as is shown in FIG. 1B, and with the deployable floor 137-1A in the closed position, the worker 115 deposits the item 10B into the receptacle 135-1, where the item 10B comes to a rest on the upper surface of the deployable floor 137-1A, inside the receptacle 135-1 and within the chamber 133-1A. Alternatively, the robot 130-1 may be configured to receive items from any other machines or systems (not shown) and in any other manner, e.g., from other humans, or from another robot, or from one or more conveyors, robotic arms or other mechanical implements or effectors.

After confirming its receipt of the items 10A, 10B, the robot 130-1 may receive instructions to transport the items 10A, 10B to another location, or to another person or machine or system. As is shown in FIG. 1C, the robot 130-1 receives an instruction to transfer the items 10A, 10B to a robot 130-2 at a rendezvous point $P_{1A}$ from a server 122 over a network 190. The server 122 may be associated with the fulfillment center 120, or another organization or entity, and may be provided in the same physical location as the fulfillment center 120, or in one or more alternate or virtual locations, e.g., in a "cloud"-based environment. The network 190 may include the Internet, in whole or in part. In some embodiments, the rendezvous point $P_{1A}$ may be associated with a boundary between a zone in which the robot 130-1 is permitted to operate, and a zone in which the robot 130-1 is restricted from operating.

As is also shown in FIG. 1C, the robot 130-2 also receives the same instruction, which includes the coordinates or other physical or logical identifiers of the rendezvous point $P_{1A}$, or a counterpart instruction, from the server 122 over the network 190. As is shown in FIG. 1D, the robot 130-2 is outfitted with a plurality of independently addressable conveyors 155-2A through 155-2J that are aligned in series to form a loading surface (or a storage surface) on the robot 130-2.

Each of the conveyors 155-2A through 155-2J is outfitted with an independently operable actuator for causing one of the conveyors 155-2A through 155-2J to translate a belt or other member in either direction, and to thereby receive one or more items thereon or discharge one or more items therefrom. In some embodiments, the belts or other surfaces of the conveyors 155-2A through 155-2J may be equipped with one or more tensile sensors for detecting stresses in tension within the respective belts or members, or load sensors for detecting loading on such conveyors 155-2A through 155-2J. In such embodiments, where a mass of an item is known, the item may be identified where the stress on the one or more conveyors 155-2A through 155-2J on which the item rests corresponds to the mass of the item. In some other embodiments (not shown), the conveyors 155-2A through 155-2J may be associated with one or more other sensors that are configured to detect the presence of objects thereon, to determine ranges to such objects, or to identify such objects (e.g., optical sensors or imaging devices).

Additionally, the robot 130-2 is also equipped with a drive unit 140-2 having any number of wheels, axles and/or motors, and may be sized and configured to travel on various surfaces, at various times or during various levels of congestion, and at various speeds, e.g., in response to one or more computer-based instructions, as well as a sensor 145-2, which may have one or more of the same properties or characteristics discussed above with regard to the sensor 145-1, or one or more different properties or characteristics.

In some embodiments, one or more of the conveyors 155-2A through 155-2J may be configured to be raised, lowered or translated in any direction with respect to the drive unit 140-2, in directions of one or more axes, or aligned at any angle with respect to the drive unit 140-1, e.g., about one or more of the axes. For example, each of the conveyors 155-2A through 155-2J may be raised, lowered or translated in unison or independently, such that each of the conveyors 155-2A through 155-2J is provided at the same elevation or angle, or at different elevations or angles. Furthermore, each of the conveyors 155-2A through 155-2J may be operated at the same speeds, or at different speeds, in response to one or more computer-based instructions.

Figure 1E:
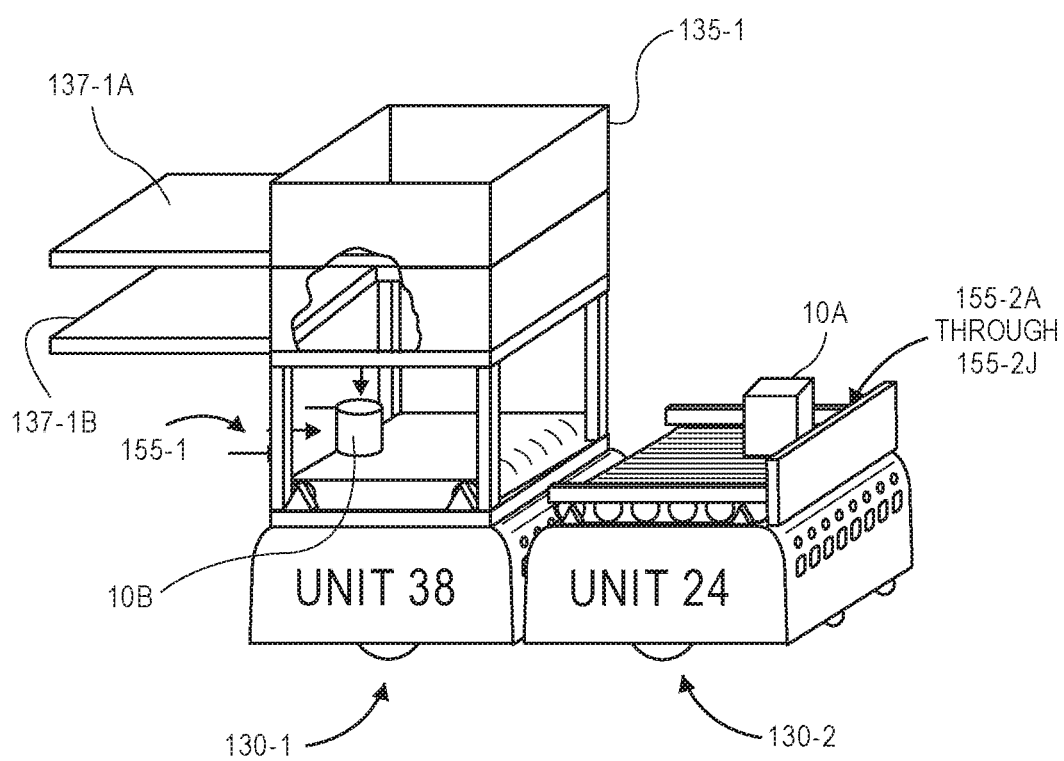

Upon arriving at the rendezvous point $P_{1A}$, the robot 130-1 and the robot 130-2 may confirm their absolute and/or relative positions and orientations with respect to one another based on information or data captured by the respective sensors 145-1, 145-2, e.g., imaging data (e.g., visual imaging data, depth or range imaging data, RFID signals, LIDAR transmissions, or the like). After confirming that the robot 130-2 is properly positioned and aligned to receive the items 10A, 10B from the robot 130-1, the robot 130-1 may begin to transfer the items 10A, 10B to the robot 130-2. For example, as is shown in FIG. 1D, the robot 130-1 may extend the deployable floor 137-1B to an open position, thereby causing the item 10A to descend from the chamber 133-1B onto the conveyor 155-1, which may be operated to transfer the item 10A onto one or more of the conveyors 155-2A through 155-2J. As is shown in FIG. 1E, with the deployable floor 137-1B in the open position, the robot 130-1 may also extend the deployable floor 137-1A to an open position, thereby causing the item 10B to descend from the chamber 133-1A through the chamber 133-1B and onto the conveyor 155-1, which may be operated again to transfer the item 10B onto one or more of the conveyors 155-2A through 155-2J.

In some embodiments, the conveyor 155-1 may be operated once, e.g., after both of the items 10A, 10B are confirmed to have descended from the chambers 133-1A, 133-1B and onto the conveyor 155-1. In some embodiments, one or more of the conveyors 155-2A through 155-2J may be operated in concert with the conveyor 155-1 to aid in receiving the items 10A, 10B therefrom. Alternatively, the robot 130-1 may be configured to discharge items to any other machines or systems (not shown) and in any other manner, e.g., to other humans, or to another robot, or to one or more conveyors, chutes, robotic arms or other mechanical implements or effectors.

Figure 1F:
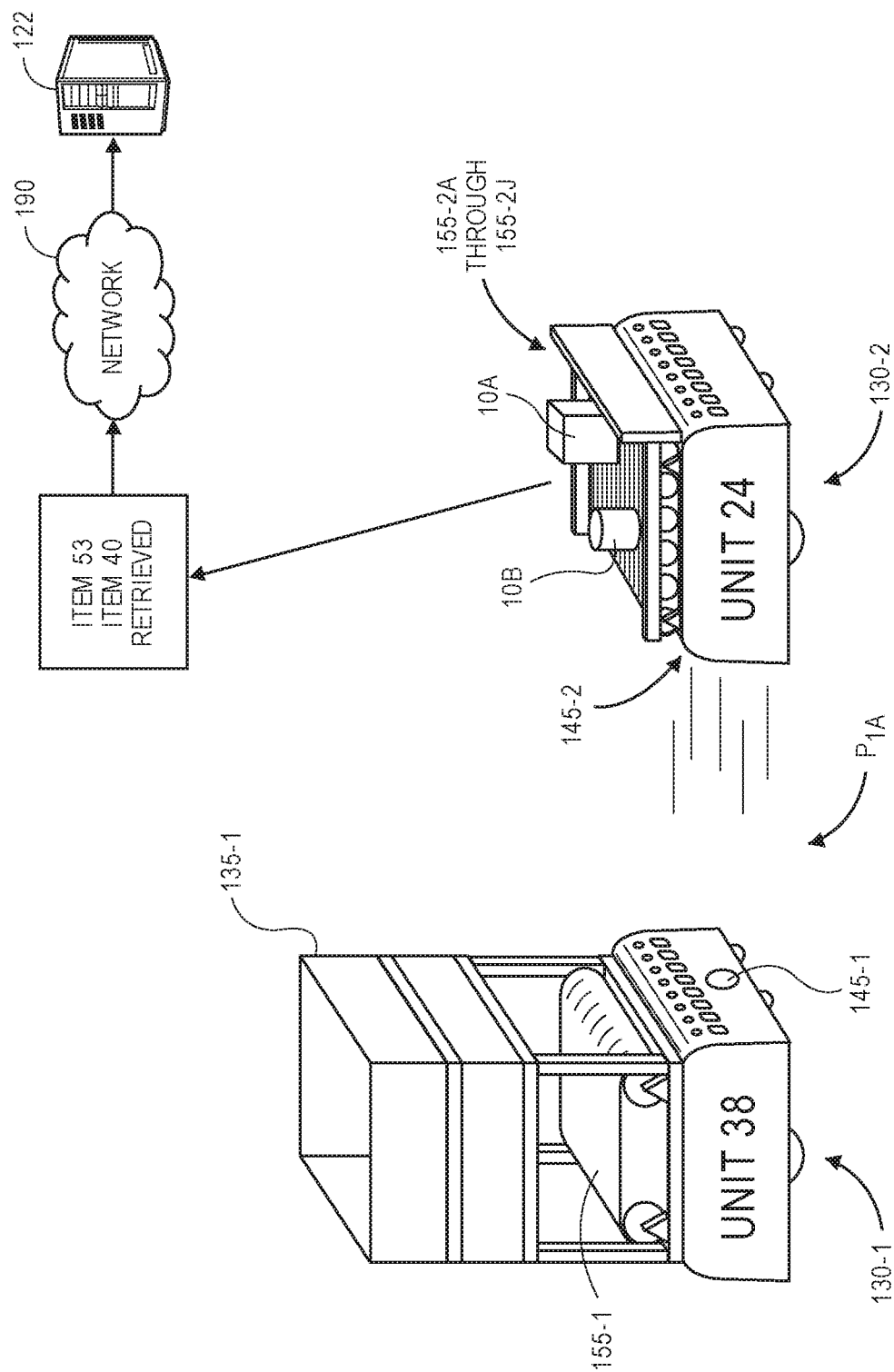
Figure 1G:
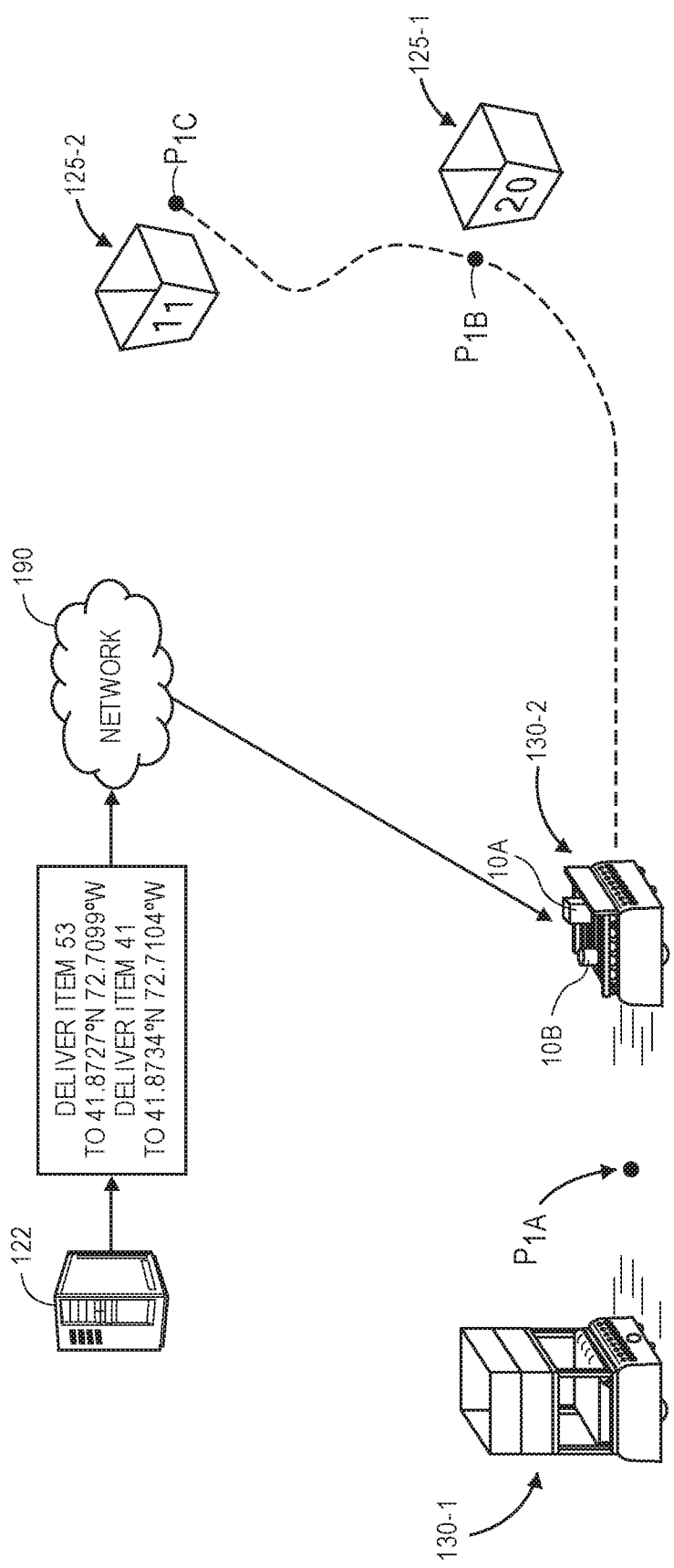

As is shown in FIG. 1F, upon confirming that the items 10A, 10B have been received from the robot 130-1, e.g., based on one or more signals received from tension sensors, load sensors or other sensors provided in association with the conveyors 155-2A through 155-2J, the robot 130-2 departs from the rendezvous point $P_{1A}$ and reports that it has retrieved the items 10A, 10B from the robot 130-1 to the server 122 over the network 190. As is shown in FIG. 1G, upon receiving a report that the robot 130-2 has retrieved the items 10A, 10B from the robot 130-1, the server 122 transmits an instruction to the robot 130-2 to deliver the items 10A, 10B to bins 125-1, 125-2 over the network 190. For example, and as is shown in FIG. 1G, the instruction may include coordinates or other physical or logical identifiers of rendezvous points $P_{1B}$, $P_{1C}$ at which the robot 130-2 is to transfer the items 10A, 10B into the bins 125-1, 125-2.

Figure 1H:
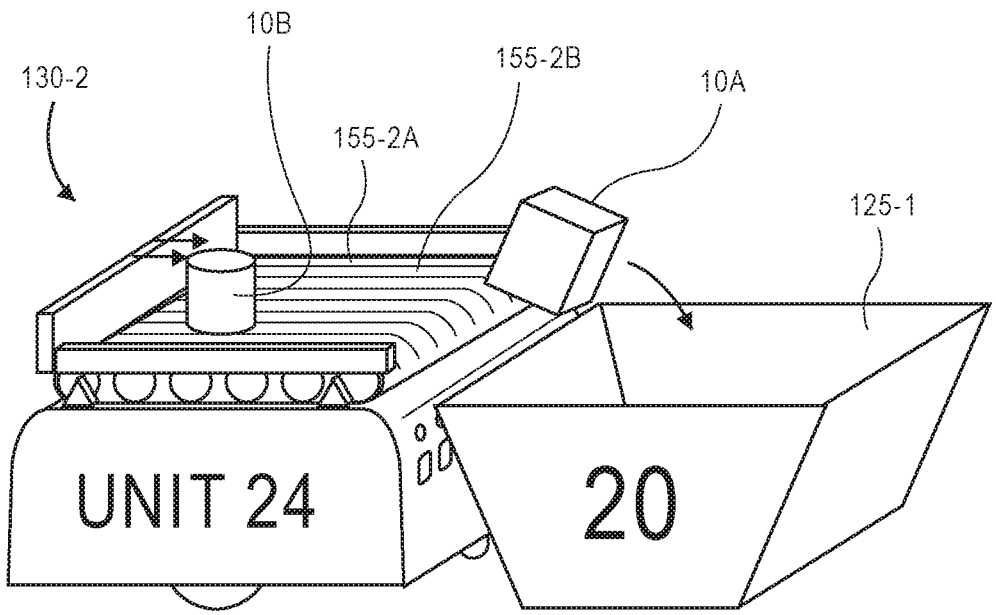

As is shown in FIG. 1H, upon arriving at the rendezvous point $P_{1B}$, the robot 130-2 may transfer the item 10A into the bin 125-1. For example, where the item 10A has a known mass, and tension sensors or load sensors associated with a select number of the conveyors 155-2A through 155-2J, viz., the conveyors 155-2A, 155-2B, indicate that an object having the mass of the item 10A is present thereon, the conveyors 155-2A, 155-2B may be operated in a direction toward the bin 125-1 to discharge the item 10A therefrom. The robot 130-2 may then travel from the rendezvous point $P_{1B}$ to the rendezvous point $P_{1C}$. As is shown in FIG. 1I, upon arriving at the rendezvous point $P_{1C}$, the robot 130-2 may transfer the item 10B into the bin 125-2, e.g., by determining that an object having the mass of the item 10B is present on conveyors 155-2F, 155-2G, and operating the conveyors 155-2F, 155-2G in a direction of the bin 125-2 to discharge the item 10B therefrom.

Figure 1I:
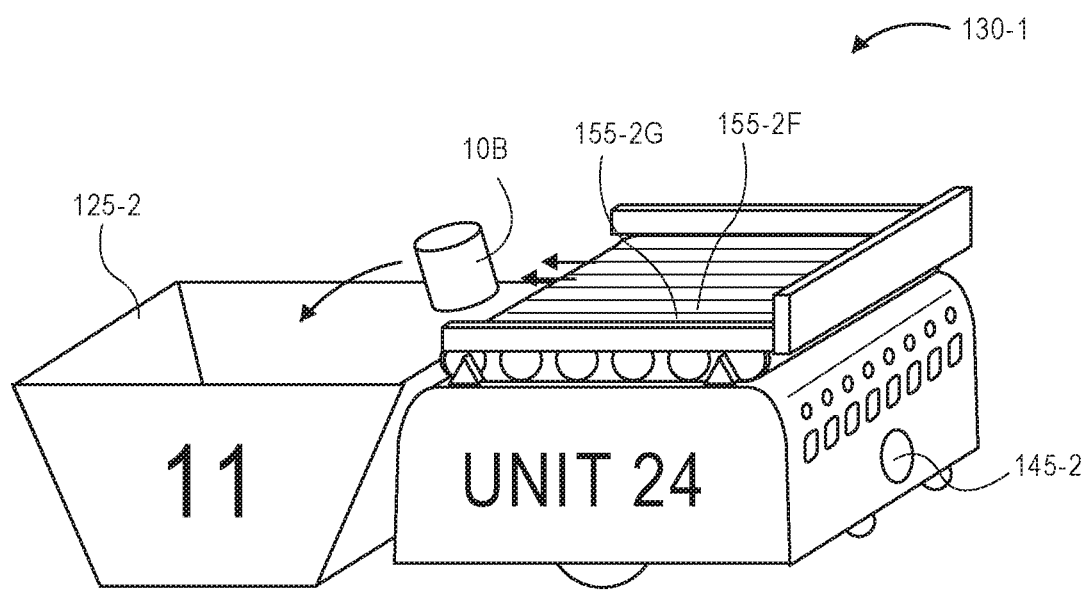

After discharging the items 10A, 10B therefrom and into the bins 125-1, 125-2, such as is shown in FIGS. 1H and 1I, the robot 130-2 may then take any other action regarding the items 10A, 10B, e.g., by transmitting one or more messages confirming that the items 10A, 10B, have been deposited into the bins 125-1, 125-2. Alternatively, the robot 130-2 may receive any other tasking, such as one or more instructions to transport one or more other items from various origins to various destinations, or the like.

Accordingly, the systems and methods of the present disclosure are directed to the mobile sortation and delivery of one or more items by one or more autonomous mobile robots. The robots may be outfitted with transfer systems for receiving multiple items thereon from one or more humans, robots or other systems, and selectively discharging the multiple items therefrom at selected destinations, e.g., to one or more humans, robots or other systems. Additionally, or alternatively, in some embodiments, a robot may be assigned to operate in a specific two-dimensional area (e.g., a zone), or restricted from operating in a specific two-dimensional area. In such embodiments, where a destination for an item, or where one or more segments of an optimal path or route for transporting an item from an origin to the destination, is within a restricted zone, a first robot may transfer the item to a second robot that is authorized to operate in the restricted zone, e.g., at or near a boundary of the restricted zone, by way of one or more of the transfer systems of the present disclosure.

At a fulfillment center, receiving inbound shipments of items and placing the items into storage, or retrieving ordered items from storage and preparing the items for delivery to customers, can frequently be tedious and labor-intensive processes. In many fulfillment centers, such processes are performed by robots, e.g., autonomous mobile robots having motorized drive units that are configured to retrieve items in one location and transport the items to another location.

In accordance with the present disclosure, autonomous mobile robots having transfer systems that are configured to independently receive one or more items from selected locations and independently discharge the one or more items at selected locations are provided. The transfer systems may be mounted to mobile drive units in a modular fashion, and contain any number of actuators, sensors and/or structural components or systems that may be required to independently receive one or more items, each of which may be packaged or unpackaged, and to independently discharge the one or more items. The robots, mobile drive units and/or transfer systems of the present disclosure may have any number of wheels mounted to axles that may be rotated by one or more motors, with dimensions, masses or other indicators of size that may be selected on any basis. For example, such robots may be sized and configured to travel within indoor facilities such as floors of fulfillment centers or on other like surfaces at various times or during various levels of congestion, and at various speeds, e.g., in response to one or more computer-based instructions.

The robots, mobile drive units and/or transfer systems of the present disclosure may include any number of sensors such as position sensors (e.g., Global Positioning System, or "GPS," receivers, or cellular transceivers configured to triangulate positions based on signals received from multiple cellular transmitters), imaging sensors (e.g., digital cameras or other imaging devices) or other sensors, including but not limited to speedometers, inclinometers, compasses, altimeters, gyroscopes or scanners. The robots, mobile drive units and/or transfer systems of the present disclosure may also include communications equipment (e.g., wired or wireless means for communication such as components or systems operating Wireless Fidelity, or Wi-Fi, Bluetooth, near-field communications or cellular technologies or protocols), along with one or more batteries (e.g., dry cell batteries, wet cell batteries, lead-acid batteries, lithium ion batteries, nickel cadmium batteries or nickel metal hydride batteries, or any other type, size or form of batteries) or other power sources, such as fuel cells or solar panels, which may be rechargeable, refuelable or replaceable in nature. Information or data obtained or determined by such sensors or such communications equipment may be utilized in manually or automatically controlling a robot, e.g., in causing the robot to travel along one or more paths or routes, or to receive or discharge one or more items. The robots of the present disclosure may further include any number of computer components (e.g., processors, data stores, transceivers or input/output devices) for performing any of the tasks or executing any of the functions described herein, such as display screens (e.g., touchscreen displays, scanners, keypads) having one or more user interfaces for displaying information regarding such vehicles or their contents to humans, or for receiving interactions (e.g., instructions) from such humans, or any other input/output devices for such purposes.

Additionally, the transfer systems may receive electrical or other power from onboard power sources associated with the mobile drive units to which each is coupled, such as batteries, fuel cells, solar panels or other power sources. The transfer systems may be configured to receive items from any type of source, such as humans, other robots, or other systems or machines, including but not limited to conveyors, robotic arms or other mechanical implements or effectors.

In some embodiments, a transfer system may include a modular electro/mechanical device that operates in conjunction with a mobile drive unit to sort multiple packages to different desired sort locations. The modular electro/mechanical device may operate in conjunction with a mobile drive unit to transfer multiple packages between two drive units, even while in motion, and may include a coordinated series of mechanical belts and/or drive actuators that operate to automatically move a discrete item among any number of items on or off the robot. In some embodiments, the transfer system may include a coordinated series of mechanical belts (or other conveyors) and/or drive actuators that can automatically detect and identify an item thereon, as well as a location of the item, by sensing weight or loads supplied to each of the belts or actuators, and correlating the weights or loads to one or more specific items.

In such embodiments, the series of belts or other conveyors may be individually operated to receive an item thereon, to sense a loading associated with the item and/or to discharge the item therefrom. Each belt or other conveyor may independently measure a loading supplied thereto, e.g., by one or more force sensors in the belts, by one or more load sensors in the actuators for such belts, or by determining levels of capacitance or inductance, and determine whether a specific belt or other conveyor is subject to loading and, therefore, has one or more items thereon. In this regard, such embodiments may automatically segment distances between items, or automatically sense perimeter boundaries of items, in a self-contained manner. Where numbers and/or types of items deposited onto such transfer systems are determined, a robot may then transport each of the items to rendezvous points associated with their respective recipients, e.g., humans, other robots, or systems or methods such as conveyors, chutes, robotic arms or other mechanical implements or effectors, and transfer or discharge such items accordingly.

In some other embodiments, a transfer system may include a modular electro/mechanical device that operates in conjunction with a robotic drive unit to sort multiple packages to different desired sort locations. The modular electro/mechanical device may operate in conjunction with a mobile drive unit to transfer multiple packages between two drive units, even while in motion, and may include a receptacle or other storage unit having a coordinated series of vertically stacked containers having deployable (or movable) floors that define one or more chambers, and work to automatically move items on or off a robot. In such embodiments, the containers may rely on gravity to cause items to individually descend, in a selected series or sequence, onto a transfer system such as a conveyor. When a plurality of items are loaded into a vertical receptacle, the deployable floors may independently operate to move each of the items into a respective chamber within the receptacle. Such chambers may be used to securely maintain items therein at any desired temperature, pressure or alignment or orientation, and to protect such items against the elements. Furthermore, in some embodiments, the robots, drive units and/or transfer systems may include various equipment or components for determining whether a chamber is empty or includes one or more items, or for identifying specific items that are stored therein, along with equipment or components for engaging or interacting with such items. If one of the items is to be transferred out of the receptacle, the deployable floors may again be selectively operated to cause the one of the items to be dropped onto the conveyor, and to be transferred into a selected direction toward a recipient such as one or more conveyors, chutes, robotic arms or other mechanical implements or effectors.

In some other embodiments, a transfer system may include a modular electro/mechanical device that operates in conjunction with a mobile drive unit to sort multiple packages to different desired sort locations. The modular electro/mechanical device may operate in conjunction with a mobile drive unit to transfer multiple packages between two drive units, even while in motion, and may include a coordinated series of mechanical diverters that operate to automatically move a discrete item or multiple items by a selected distance, e.g., on or off the robot. In some embodiments, the diverters may include optical sensors (e.g., imaging devices, visual or depth cameras, LIDAR sensors or the like) that may determine distances from each of such sensors to any given item provided thereon. When an item being transported by a robot is identified, the diverters may be individually operated to extend at selected distances, thereby causing the item to be repositioned elsewhere on the transfer system, or to be discharged from the transfer system accordingly.

The robots and/or transfer systems may be configured to receive items from or transfer items to any source or recipient, including but not limited to humans (e.g., human operators), other robots, or other systems such as conveyors, chutes, robotic arms or other mechanical implements or effectors. In this regard, where one or more items are to be delivered from their respective sources to their respective recipients, an optimal path for the delivery of the items that relies on any number of robots and/or transfer systems to transport the items along any number of segments between any number of points in accordance with the present disclosure may be established in any manner. For example, a single robot may be loaded with one or more items at sources of such items by one or more humans, robots or other systems or machines, and programmed with rendezvous points or other information or data regarding locations of recipients for each of such items. The robot may confirm its arrival at a rendezvous point based on data gathered by one or more sensors, and may transfer the items to the recipients by independently operating one or more floors, belts, diverters to discharge the items therefrom. Alternatively, two or more robots may be tasked with delivering such items to their recipients, and the items may be transferred between such robots while the items are en route from their respective sources to their respective recipients, e.g., by independently operating one or more floors, belts, diverters of transfer systems associated with each of such robots. As yet another alternative, any combination of humans, robots or other systems or machines may be utilized to deliver an item from a source to a recipient, and such items may be transferred to, from or between one or more robots by independently operating one or more floors, belts, diverters of such robots.

In some embodiments, robots may be assigned to specific zones or other regions within a fulfillment center or other environment, or restricted from operating within one or more of such zones or regions. In such embodiments, where an optimal path for the delivery of an item from a source to recipient would include at least one point within, or at least one segment extending over or through, a zone in which a first robot in possession of the item is prohibited from entry, the first robot and a second robot that is permitted to operate in the zone may be programmed to proceed to a rendezvous point at or near a boundary to the zone, where the item may be transferred from the first robot to the second robot. Upon confirming the transfer of the item, the second robot may be programmed to proceed to a location of the recipient within the zone, or to another rendezvous point on another boundary to the zone, where the item may be transferred from the second robot to a third robot for delivery to a location of the recipient outside of the zone.

Figure 2:
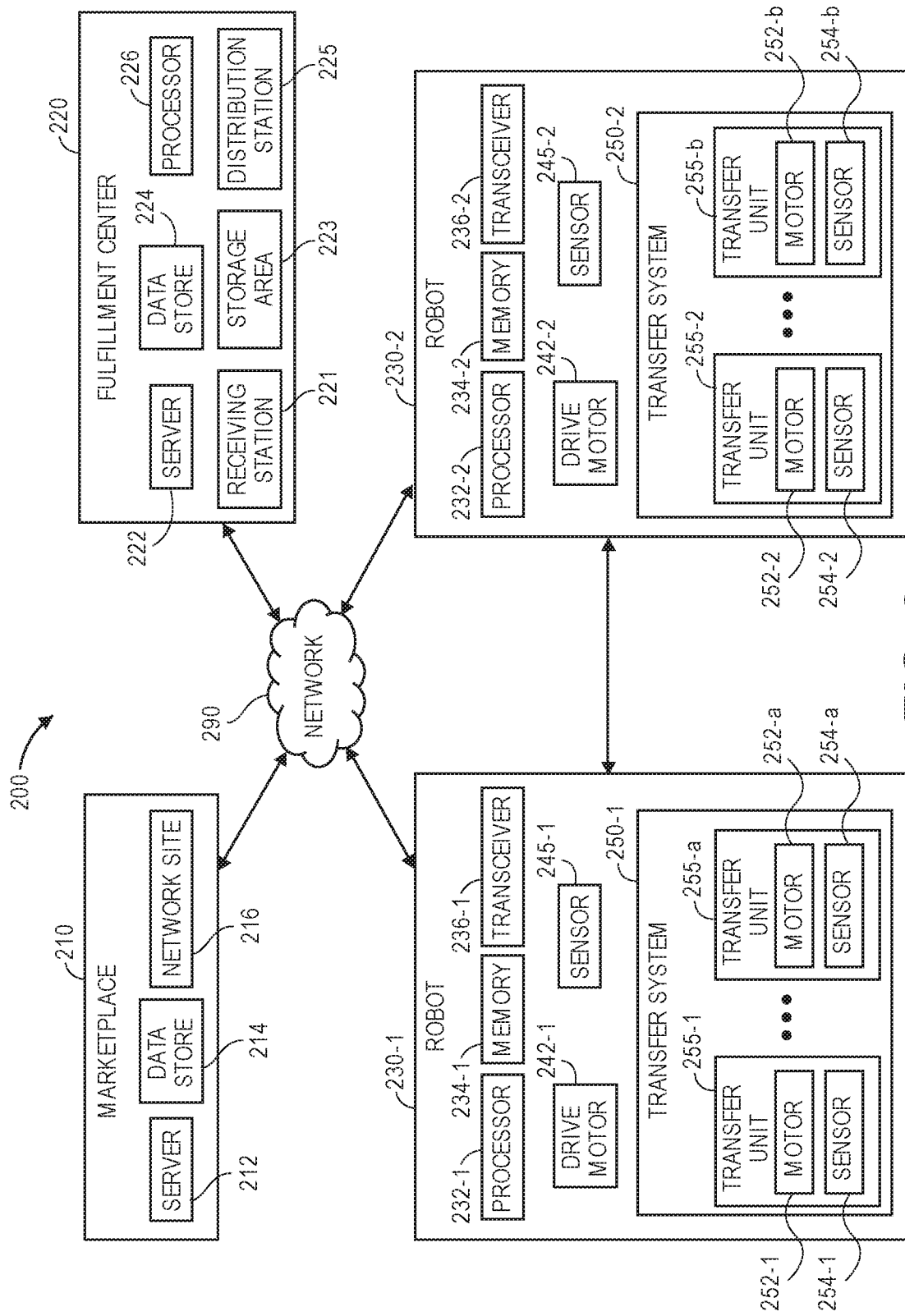
FIG. 2 is a block diagram of components of one system for mobile sortation and delivery of items in accordance with embodiments of the present disclosure.

Referring to FIG. 2, a block diagram of components of one system 200 for mobile sortation and delivery of items in accordance with embodiments of the present disclosure is shown. The system 200 includes a marketplace 210, a fulfillment center 220, and a pair of autonomous mobile robots 230-1, 230-2 that are connected to one another across a network 290, which may include the Internet in whole or in part. Except where otherwise noted, reference numerals preceded by the number "2" in FIG. 2 refer to elements that are similar to elements having reference numerals preceded by the number "1" shown in FIGS. 1A through 1I.

The marketplace 210 may be any entity or individual that wishes to make items from a variety of sources (e.g., manufacturers, merchants, sellers or vendors) available for download, purchase, rent, lease or borrowing by customers using a networked computer infrastructure, including one or more physical computer servers 212 and data stores 214 (e.g., databases) for hosting a network site 216. The marketplace 210 may be physically or virtually associated with one or more storage or distribution facilities, such as the fulfillment center 220. The network site 216 may be implemented using the one or more servers 212, which connect or otherwise communicate with the one or more data stores 214 as well as the network 290, through the sending and receiving of digital data. Moreover, the data store 214 may include any type of information regarding items that have been made available for sale through the marketplace 210, or ordered by customers from the marketplace 210, or any information or data regarding the delivery of such items to the customers or destinations selected thereby.

The fulfillment center 220 may be any facility that is adapted to receive, store, process and/or distribute items. As is shown in FIG. 2, the fulfillment center 220 includes a server 222, a data store 224, and one or more computer processors 226. The fulfillment center 220 also includes stations for receiving, storing and distributing items to customers, including but not limited to a receiving station 221, a storage area 223 and a distribution station 225.

The server 222 and/or the processors 226 may operate one or more order processing and/or communication systems and/or software applications having one or more user interfaces, or communicate with one or more other computing devices or machines that may be connected to the network 290, for transmitting or receiving information in the form of digital or analog data, or for any other purpose. For example, the server 222 and/or the processors 226 may also operate or provide access to one or more reporting systems for receiving or displaying information or data regarding orders for items received by the marketplace 210, or items transported by one or more of the robots 230-1, 230-2, and may provide one or more interfaces for receiving interactions (e.g., text, numeric entries or selections) from one or more operators, users, workers or other persons in response to such information or data. The server 222, the data store 224 and/or the processor 226 may be a general-purpose device or machine, or a dedicated device or machine that features any form of input and/or output peripherals such as scanners, readers, keyboards, keypads, touchscreens or like devices, and may further operate or provide access to one or more engines for analyzing the information or data regarding the workflow operations, or the interactions received from the one or more operators, users, workers or persons.

For example, the server 222 and/or the processors 226 may be configured to determine an optimal path or route between two locations for the execution of a given mission or task to be executed by robots 230-1, 230-2 on any basis, such as according to one or more traditional shortest path or shortest route algorithms such as Dijkstra's Algorithm, Bellman-Ford Algorithm, Floyd-Warshall Algorithm, Johnson's Algorithm or a hub labeling technique. Such optimal paths may include any number of segments extending between any number of points, e.g., a point corresponding to an origin or a source, a point corresponding to a destination or a recipient, and any number of intervening points, with segments extending between pairs of such points. For example, an optimal path or route may, in some embodiments, include one or more common locations or rendezvous points where an item or materials may be transferred between or among the robots 230-1, 230-2 or one or more humans, machines or other vehicles. An optimal path or route may, in some embodiments, also identify zones where one or more of the robots 230-1, 230-2 is permitted to operate or is restricted from operating, and may identify rendezvous points or designate routes in accordance with requirements associated with such zones.

Additionally, the server 222 and/or the processors 226 may be configured to control or direct, or to recommend or suggest, collaboration between or among one or more of the robots 230-1, 230-2 and one or more humans or other systems or machines in the performance of one or more tasks or in the execution of one or more functions. For example, the server 222 and/or the processors 226 may be configured to identify levels of inventory distributed throughout the storage area 223 or in one or more other locations, or carried aboard one or more of the robots 230-1, 230-2, or carried by humans or aboard other vehicles or in other locations, and to identify an optimal path to be traveled by the robots 230-1, 230-2 or such humans or other vehicles in order to obtain each of the items included in an order from the storage area 223 or other locations and to deliver such items to a customer or other destination. In some embodiments, the server 222 and/or the processors 226 may be configured to transmit a single instruction, or a series of instructions, identifying a source of an item, a destination for the item, and a path or route to be traveled from the source to the destination to one or more robots.

Additionally, the server 222 and/or the processor 226 may determine which of the robots 230-1, 230-2 is appropriately equipped to perform specific steps of a process, based on any amounts or types of items or materials that may be available nearby, proximity to one or more humans, robots or other systems, as well as a given destination or other location, or on any other relevant factor or basis. The server 222 and/or the processor 226 may identify appropriate locations or rendezvous points where one or more humans, robots 230-1, 230-2 or other machines may meet in order transfer inventory or materials therebetween, or for any other purpose.

The receiving station 221 may include any apparatuses that may be required in order to receive shipments of items at the fulfillment center 220 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), as well as one or more of the robots 230-1, 230-2, and preparing such items for storage or distribution to customers. The storage area 223 may include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 225 may include one or more regions or stations where items that have been retrieved from a designated storage area may be received, e.g., by one or more of the robots 230-1, 230-2, and evaluated, prepared and packed for delivery from the fulfillment center 220 to locations or destinations specified by customers, e.g., by any vehicle of any type, e.g., cars, trucks, trailers, freight cars, container ships or cargo aircraft (e.g., manned aircraft or unmanned aircraft, such as drones). Those of ordinary skill in the pertinent art will recognize that shipments of items arriving at the receiving station 221 may be processed, and the items placed into storage within the storage areas 223 or, alternatively, transferred directly to the distribution station 225, or "cross-docked," for prompt delivery to one or more customers, e.g., by one or more of the robots 230-1, 230-2.

The fulfillment center 220 may further include one or more control systems that may generate instructions for conducting operations at one or more of the receiving station 221, the storage area 223 or the distribution station 225. Such control systems may be associated with the server 222, the data store 224 and/or the processor 226, or with one or more other computing devices or machines, and may communicate with the receiving station 221, the storage area 223 or the distribution station 225 within the fulfillment center 220 by any known wired or wireless means, or with the marketplace 210, the robots 230-1, 230-2 or customers over the network 290 through the sending and receiving of digital data.

Additionally, the fulfillment center 220 may include one or more systems or devices (not shown in FIG. 2) for determining locations of one or more elements therein, such as cameras or other image recording devices. Furthermore, the fulfillment center 220 may also include one or more workers or staff members (not shown in FIG. 2), who may handle or transport items within the fulfillment center 220. Such workers may operate one or more computing devices or machines for registering the receipt, retrieval, transportation or storage of items within the fulfillment center, or a general-purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

The robots 230-1, 230-2 may be any type or form of self-powered vehicle capable of being programmed or otherwise configured for autonomous travel between two points along one or more paths or routes, in furtherance of the performance of one or more missions or tasks, such as the delivery of items from one location to another, e.g., from a first location within the storage area 223 to a second location within the storage area 223, or to the distribution station 225, based on one or more computer instructions. For example, one or more of the robots 230-1, 230-2 may be configured to determine an optimal path or route between two locations for the execution of a given mission or task on any basis, such as according to one or more traditional shortest path or shortest route algorithms such as Dijkstra's Algorithm, Bellman-Ford Algorithm, Floyd-Warshall Algorithm, Johnson's Algorithm or a hub labeling technique. Such optimal paths may include any number of segments extending between any number of points, e.g., a point corresponding to an origin or a source, a point corresponding to a destination or a recipient, and any number of intervening points, with segments extending between pairs of such points. For example, an optimal path or route may, in some embodiments, include one or more common locations or rendezvous points where an item or materials may be transferred between or among the robots 230-1, 230-2 or one or more humans, machines or other vehicles. An optimal path or route may, in some embodiments, also identify zones where one or more of the robots 230-1, 230-2 is permitted to operate or is restricted from operating, and may identify rendezvous points or designate routes in accordance with requirements associated with such zones.

As is shown in FIG. 2, each of the robots 230-1, 230-2 includes one or more computer components such as a processor 232-1, 232-2, a memory component 234-1, 234-2 and a transceiver 236-1, 236-2 in communication with one or more other computer devices that may be connected to the network 290, in order to transmit or receive information in the form of digital or analog data, or for any other purpose. For example, the robots 230-1, 230-2 may receive instructions or other information or data via the transceivers 236-1, 236-2 regarding an item that is to be delivered from the receiving station 221 to a first location within the storage area 223, or from a second location within the storage area 223 to the distribution station 225, via one or more paths or routes from the marketplace server 212 or from the fulfillment center server 222, or from any other computing device over the network 290. The transceiver 236-1, 236-2 may be configured to enable the robots 230-1, 230-2 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly.

The transceiver 236-1, 236-2 may further include or be in communication with one or more input/output (or "I/O") interfaces, network interfaces and/or input/output devices, and may be configured to allow information or data to be exchanged between one or more of the components of the robots 230-1, 230-2, or to one or more other computer devices or systems (e.g., other aerial vehicles, not shown) via the network 290. For example, in some embodiments, the transceiver 236-1, 236-2 may be configured to coordinate I/O traffic between the processor 232-1, 232-2 and one or more onboard or external computer devices or components. The transceiver 236-1, 236-2 may perform any necessary protocol, timing or other data transformations in order to convert data signals from a first format suitable for use by one component into a second format suitable for use by another component. In some embodiments, the transceiver 236-1, 236-2 may include support for devices attached through various types of peripheral buses, e.g., variants of the Peripheral Component Interconnect (PCI) bus standard or the Universal Serial Bus (USB) standard. In some other embodiments, functions of the transceiver 236-1, 236-2 may be split into two or more separate components, or incorporated directly into the processor 232-1, 232-2.

As is shown in FIG. 2, each of the robots 230-1, 230-2 includes one or more drive motors 242-1, 242-2, one or more sensors 245-1, 245-2, and a transfer system 250-1, 250-2 having any number of transfer units, including a transfer units 255-1 . . . 255-a aboard the robot 230-1 and b transfer units 255-2 . . . 255-b aboard the robot 230-2. The drive motors 242-1, 242-2 may be any type or form of motors or engines (e.g., electric, gasoline-powered or any other type of motor) that is capable of providing sufficient rotational forces to one or more axles, shafts and/or wheels for causing the robots 230-1, 230-2 and any items therein to travel in a desired direction and at a desired speed. In some embodiments, the drive motors 242-1, 242-2 may be electric motors having any number of stators, poles and/or windings, such as outrunner or an inrunner brushless direct current (DC) motors, or any other motors, having any speed rating, power rating or any other rating. In some embodiments, the drive motors 242-1, 242-2 may be integral to the transfer systems 250-1, 250-2, or one or more of the sensors 245-1, 245-2 or the transfer units 255-1 . . . 255-a or transfer units 255-2 . . . 255-b, or component parts of a discrete drive unit that is coupled to the sensors 245-1, 245-2 or the transfer units 255-1 . . . 255-a or transfer units 255-2 . . . 255-b.

The sensors 245-1, 245-2 may be any type or form of device for capturing information or data within a vicinity of the robots 230-1, 230-2. In some embodiments, the sensors 245-1, 245-2 may be an imaging device such as any form of optical recording sensor or device (e.g., digital cameras, depth sensors or range cameras, infrared cameras, radiographic cameras or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the robots 230-1, 230-2, or for any other purpose. For example, the sensors 245-1, 245-2 may be configured to capture or detect reflected light if the reflected light is within a field of view of the sensors 245-1, 245-2, which is defined as a function of a distance between an imaging sensor and a lens within the sensors 245-1, 245-2, viz., a focal length, as well as a location of the sensors 245-1, 245-2 and an angular orientation of the lens. Accordingly, where an object appears within a depth of field, or a distance within the field of view where the clarity and focus is sufficiently sharp, the sensors 245-1, 245-2 may capture light that is reflected off objects of any kind to a sufficiently high degree of resolution using one or more sensors thereof, and store information regarding the reflected light in one or more data files.

The sensors 245-1, 245-2 may also include manual or automatic features for modifying a field of view or orientation. For example, the sensors 245-1, 245-2 may be a digital camera configured in a fixed position, or with a fixed focal length (e.g., fixed-focus lenses) or angular orientation. Alternatively, the sensors 245-1, 245-2 may include one or more actuated or motorized features for adjusting a position of the sensors 245-1, 245-2, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensors 245-1, 245-2, or a change in one or more of the angles defining the angular orientation of the sensors 245-1, 245-2.

For example, the sensors 245-1, 245-2 may be an imaging device that is hard-mounted to a support or mounting that maintains the imaging device in a fixed configuration or angle with respect to one, two or three axes. Alternatively, however, the sensors 245-1, 245-2 may be provided with one or more motors and/or controllers for manually or automatically operating one or more of the components, or for reorienting the axis or direction of the sensors 245-1, 245-2, i.e., by panning or tilting the sensors 245-1, 245-2. Panning the sensors 245-1, 245-2 may cause a rotation within a horizontal plane or about a vertical axis (e.g., a yaw), while tilting the sensors 245-1, 245-2 may cause a rotation within a vertical plane or about a horizontal axis (e.g., a pitch). Additionally, the sensors 245-1, 245-2 may be rolled, or rotated about its axis of rotation, and within a plane that is perpendicular to the axis of rotation and substantially parallel to a field of view of the sensors 245-1, 245-2.

Imaging data (e.g., still or moving images, as well as associated audio data or metadata) captured using the sensors 245-1, 245-2 may be processed according to any number of recognition techniques. In some embodiments, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

In some embodiments, the sensors 245-1, 245-2 may also be a position sensor such as a GPS receiver, or any other device or component for determining geolocations (e.g., a geospatially-referenced point that defines an exact location in space with one or more geocodes), such as a set of geographic coordinates, e.g., a latitude and a longitude, and, optionally, an elevation that may be ascertained from signals (e.g., trilateration data or information) or geographic information system (or "GIS") data, of the robots 230-1, 230-2. Geolocations of the sensors 245-1, 245-2 may be associated with the robots 230-1, 230-2, where appropriate.

In some embodiments, the sensors 245-1, 245-2 may further be one or more compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), accelerometers, ranging sensors (e.g., radar or LIDAR ranging sensors) or sound sensors (e.g., microphones, piezoelectric sensors, vibration sensors or other transducers for detecting and recording acoustic energy from one or more directions).

In some embodiments, the sensors 245-1, 245-2 may also be an item identification sensor, and may include a bar code scanner, a radiofrequency identification (or RFID) reader, or other technology that is utilized to determine an identification of an item that is being retrieved or deposited, or has been retrieved or deposited, by the robots 230-1, 230-2. In some embodiments, the sensors 245-1, 245-2 may be provided within a cargo bay or other storage component of the robots 230-1, 230-2, such as a presence detection sensor and/or a motion sensor for detecting the presence or absence of one or more objects within the cargo bay or storage compartment, or movement of objects therein.

The sensors 245-1, 245-2 may be further configured to capture, record and/or analyze information or data regarding positions, velocities, accelerations or orientations of the robots 230-1, 230-2, and to analyze such data or information by one or more means, e.g., by aggregating or summing such data or information to form one or more qualitative or quantitative metrics of the movement of the sensors 245-1, 245-2. For example, a net vector indicative of any and all relevant movements of the robots 230-1, 230-2, including but not limited to physical positions, velocities, accelerations or orientations of the sensors 245-1, 245-2, may be derived. Additionally, coefficients or scalars indicative of the relative movements of the robots 230-1, 230-2 may also be defined.

The transfer systems 250-1, 250-2 may be any collection of components for receiving or discharging items, and may include the one or more transfer units 255-1 . . . 255-a and the transfer units 255-2 . . . 255-b. In some embodiments, the transfer systems 250-1, 250-2 may include one or more processors or processor units, control systems, power modules, or other systems or modules for operating the respective transfer units 255-1 . . . 255-a and the transfer units 255-2 . . . 255-b.

The transfer units 255-1 . . . 255-a and the transfer units 255-2 . . . 255-b may be any systems or components configured to be independently operated in order to enable the robots 230-1, 230-2 to receive or discharge one or more items, e.g., onto or from one or more loading surfaces (or storage surfaces) of the robots 230-1, 230-2. Each of the transfer units 255-1 . . . 255-a may have any number of motors 252-1 . . . 252-a for enabling the independent operation of such transfer units 255-1 . . . 255-a, as well as any number of sensors 254-1 . . . 254-a for detecting the presence of one or more items on such surfaces, or determining one or more attributes of such items. Likewise, each of the transfer units 255-2 . . . 255-b may have any number of motors 252-2 . . . 252-b for enabling the independent operation of such transfer units 255-2 . . . 255-b, as well as any number of sensors 254-2 . . . 254-b for detecting the presence of one or more items on such surfaces, or determining one or more attributes of such items.

For example, in some embodiments, each of the transfer units 255-1 . . . 255-a or the transfer units 255-2 . . . 255-b may be an independently addressable conveyor that is aligned in series with one another to define a loading surface (or storage surface) on the robots 230-1, 230-2. The conveyors may each have one or more motors 252-1 . . . 252-a or 252-2 . . . 252-b for operating the conveyors in one or two directions, as well as any number of actuators or other components for controlling the operation of the conveyors. Each of the motors 252-1 . . . 252-a or 252-2 . . . 252-b may be configured to operate at the same speed or in the same direction, or at different speeds or in different directions.

Additionally, each of the conveyors may include one or more sensors 254-1 . . . 254-a or 254-2 . . . 254-b for detecting the presence of one or more items thereon. For example, each of the conveyors may include one or more tension sensors within the respective belts or, alternatively, one or more load sensors associated with the belts or other components, for detecting tension within such belts or loading on such belts. Where masses or other attributes of items are known, an item may be identified as being present on one or more conveyors, or a location of the item may be determined, based on signals received from one or more of such sensors. Likewise, each of the conveyors may include one or more optical sensors, e.g., imaging devices associated with mounts, frames or other aspects of such conveyors that may be aligned and configured to detect the presence of one or more items, or to identify one or more of such items, on such conveyors.

In some embodiments, the transfer units 255-1 . . . 255-a or the transfer units 255-2 . . . 255-b may be a plurality of deployable floors disposed within a vertical receptacle or other structure having an interior cavity, or a conveyor or other system disposed beneath the receptacle. The deployable floors and the interior cavity may define one or more storage chambers within the receptacle, which may be provided above the conveyor. In such embodiments, a deployable floor may be translated in any direction, or rotated about any axis, and the conveyor may be operated in one or more directions, by the one or more motors 252-1 . . . 252-a or 252-2 . . . 252-b. For example, each of the deployable floors may have storage positions (or closed positions) within the receptacle, and release positions (or open positions) outside of the receptacle. When an item that is disposed within a chamber defined by a deployable floor above a conveyor is to be discharged, the deployable floor may be translated from a storage position to a release position, thereby enabling the item to descend onto the conveyor, which may be operated in a direction corresponding to a selected destination for the item. Additionally, each of the chambers or deployable floors, or the conveyor, may include one or more sensors 254-1 . . . 254-a or 254-2 . . . 254-b for detecting the presence of one or more items thereon, or for identifying such items. Such sensors 254-1 . . . 254-a or 254-2 . . . 254-b may be load sensors, optical sensors, or any other sensors for capturing information or data regarding an item within a chamber, as appropriate.

In some embodiments, the transfer units 255-1 . . . 255-a or the transfer units 255-2 . . . 255-b may be a plurality of diverters provided in association with a loading surface or a storage surface. Each of the diverters may have a contact surface that may be extended to selected distances across the loading surface or storage surface, e.g., by one or more of the motors 252-1 . . . 252-a or 252-2 . . . 252-b. When a plurality of items are located on the loading surface or storage surface, a selected number of the diverters may be selectively operated to extend the contact surfaces by distances sufficient to discharge a selected item from the loading surface or storage surface, while maintaining each of the other items on the loading surface or storage surface. Additionally, the diverters may include one or more sensors 254-1 . . . 254-a or 254-2 . . . 254-b for detecting the presence of items, or for identifying items, within ranges of the diverters.

In addition to the processors 232-1, 232-2, the memory components 234-1, 234-2, the transceivers 236-1, 236-2, the drive motors 242-1, 242-2, the sensors 245-1, 245-2, the transfer systems 255-1 . . . 255-a and the transfer systems 255-2 . . . 255-b, the robots 230-1, 230-2 may further include one or more control systems, power modules, navigation modules, steering systems, item engagement systems or other systems or modules. For example, the robots 230-1, 230-2 may include one or more software applications or hardware components configured for controlling or monitoring operations of the drive motors 242-1, 242-2, the sensors 245-1, 245-2 and/or the transfer units 255-1 . . . 255-a, 255-2 . . . 255-b, or any other components of the robots 230-1, 230-2, e.g., by receiving, generating, storing and/or transmitting one or more computer instructions to such components. The robots 230-1, 230-2 may include any type of power modules or power sources for providing electrical power, mechanical power or other forms of power in support of one or more electrical or mechanical loads aboard the robots 230-1, 230-2. In some embodiments, such power modules or power cells may include one or more batteries, e.g., dry cell or wet cell batteries such as lead-acid batteries, lithium ion batteries, nickel cadmium batteries or nickel metal hydride batteries, or any other type, size or form of batteries having any cell voltages, peak load currents, charge times, specific energies, internal resistances or cycle lives, or other power ratings. Such power modules or power cells may also be any type, size or form of other power source, e.g., other than a battery, including but not limited to one or more fuel cells, turbines, solar cells or nuclear reactors, or any other form of prime mover (e.g., electric, gasoline-powered or any other type of motor) capable of generating sufficient mechanical forces for the robots 230-1, 230-2.

The robots 230-1, 230-2 may also include one or more navigation modules, e.g., one or more software applications or hardware components including or having access to information or data regarding aspects of transportation systems within a given region, including the locations, dimensions, capacities, conditions, statuses or other attributes of various paths or routes in the region. Such navigation modules may receive inputs from the sensor 245-1, 245-2, e.g., from a GPS receiver, an imaging device or another sensor, and determine an optimal direction and/or an optimal speed of the robots 230-1, 230-2 for travelling on a given path or route based on such inputs. Such navigation modules may select a path or route to be traveled upon by the robots 230-1, 230-2, and may provide information or data regarding the selected path or route to the one or more control systems. The robots 230-1, 230-2 may also include one or more steering systems for controlling a direction of travel. Such steering systems may have any number of automatically operable gears (e.g., racks and pinions), gear boxes, shafts, shaft assemblies, joints, servos, hydraulic cylinders, linkages or other features for repositioning one or more wheels to cause the robots 230-1, 230-2 to travel in a desired direction. The robots 230-1, 230-2 may further have one or more engagement systems or other mechanical components, such as robotic arms, for engaging an item or for disengaging the item, as desired. For example, when one of the robots 230-1, 230-2 is tasked with delivering items or materials from an origin to a destination, an engagement system may be used to engage the items or materials at the origin and to deposit the items or materials in a chamber, a cargo bay or another storage compartment prior to departing. After the one of the robots 230-1, 230-2 arrives at the destination, the engagement system may be used to retrieve the items or materials within the chamber, the cargo bay or the storage compartment, and deposit the items or materials in a desired location at the destination.

In some embodiments, the robots 230-1, 230-2 may be programmed or configured to perform one or more missions or tasks in an integrated manner. For example, the robots 230-1, 230-2 may be programmed to travel to an origin, e.g., the fulfillment center 220, and to begin the performance of a task there, such as by retrieving an item at the origin, before proceeding to a destination, e.g., one or more humans, other robots 230-1, 230-2, or other systems or machines, along a selected route (e.g., an optimal route). Along the way, the robots 230-1, 230-2 may operate at any predetermined speed and travel in a predetermined direction or otherwise as necessary to travel along the selected route. The robots 230-1, 230-2 may further cause the sensor 245-1, 245-2 to capture information or data (including but not limited to imaging data) regarding the robots 230-1, 230-2 and/or its surroundings along the selected route. The robots 230-1, 230-2 may be programmed or configured as necessary in order to execute any actions associated with a given task, in accordance with the present disclosure.

Any combination of networks or communications protocols may be utilized in accordance with the systems and methods of the present disclosure. For example, each of the robots 230-1, 230-2 may be configured to communicate with one another or with the marketplace server 212, the fulfillment center server 222 or any other computer device via the network 290, such as is shown in FIG. 2, e.g., via an open or standard protocol such as Wi-Fi. Alternatively, each of the robots 230-1, 230-2 may be configured to communicate with one another directly outside of a centralized network, such as the network 290, e.g., by a wireless protocol such as Bluetooth, in which two or more of the robots 230-1, 230-2 may be paired with one another.

The computers, servers, devices and the like described herein have the necessary electronics, software, memory, storage, databases, firmware, logic/state machines, microprocessors, communication links, displays or other visual or audio user interfaces, printing devices, and any other input/ output interfaces to provide any of the functions or services described herein and/or achieve the results described herein.

Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "fulfillment center" a "customer," a "robot" (or "autonomous mobile robot"), or like terms, may be automated steps performed by their respective computer systems, or implemented within software modules (or computer programs) executed by one or more general purpose computers. Moreover, process steps described as being performed by a "marketplace," a "fulfillment center," a "customer," a "robot," an "autonomous mobile robot" or like terms may be typically performed by a human operator, but could, alternatively, be performed by an automated agent.

The marketplace 210, the fulfillment center 220, or the robots 230-1, 230-2 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages, social network messages, online marketplace messages, telephone calls or the like. For example, the fulfillment center 220 and/or the server 222 may be adapted to transmit information or data in the form of synchronous or asynchronous messages to the marketplace 210 and/or the server 212, or the processors 232-1, 232-2, or any other computer device in real time or in near-real time, or in one or more offline processes, via the network 290. Those of ordinary skill in the pertinent art would recognize that the marketplace 210, the fulfillment center 220, or the processors 232-1, 232-2 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

Although the system 200 is shown in the block diagram of FIG. 2 as having only two boxes corresponding to the robots 230-1, 230-2, those of ordinary skill in the pertinent arts will recognize that any number of robots may be utilized in accordance with embodiments of the present disclosure to transport any number of items from one location to another, and to receive items from or discharge items to one or more humans, other robots, or other systems or machines. Additionally, although each of the robots 230-1, 230-2 is shown in FIG. 2 as having a single box corresponding to a drive motor 242-1, 242-2, a single box corresponding to a sensor 245-1, 245-2, and a pair of boxes corresponding to the transfer units 255-1 . . . 255-a and the transfer units 255-2 . . . 255-b, each having a single box corresponding to a motor 252-1 . . . 252-a or 252-2 . . . 252-b and a single box corresponding to a sensor 254-1 . . . 254-a or 254-2 . . . 254-b, those of ordinary skill in the pertinent arts will recognize that each of the robots of the present disclosure may include any number of drive motors, sensors or transfer systems (or transfer units), and that such transfer systems (or transfer units) may have any number of motors or sensors in accordance with the present disclosure.

The data and/or computer executable instructions, programs, firmware, software and the like (also referred to herein as "computer executable" components) described herein may be stored on a computer-readable medium that is within or accessible by computers or computer components such as the servers 212, 222, the processors 232-1, 232-2 or any other computers or control systems utilized by the marketplace 210, the fulfillment center 220, or the robots 230-1, 230-2, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As is discussed above, an autonomous mobile robot may include a transfer system having a plurality of independently addressable conveyors aligned in parallel to define a loading surface or storage surface. The conveyors may be independently operated to receive or discharge one or more items at selected destinations, as desired. Referring to FIGS. 3A through 3F, views of aspects of one system for mobile sortation and delivery of items in accordance with embodiments of the present disclosure are shown. Except where otherwise noted, reference numerals preceded by the number "3" in FIGS. 3A through 3F refer to elements that are similar to elements having reference numerals preceded by the number "2" in FIG. 2 or by the number "1" shown in FIGS. 1A through 1I.

Figure 3A:
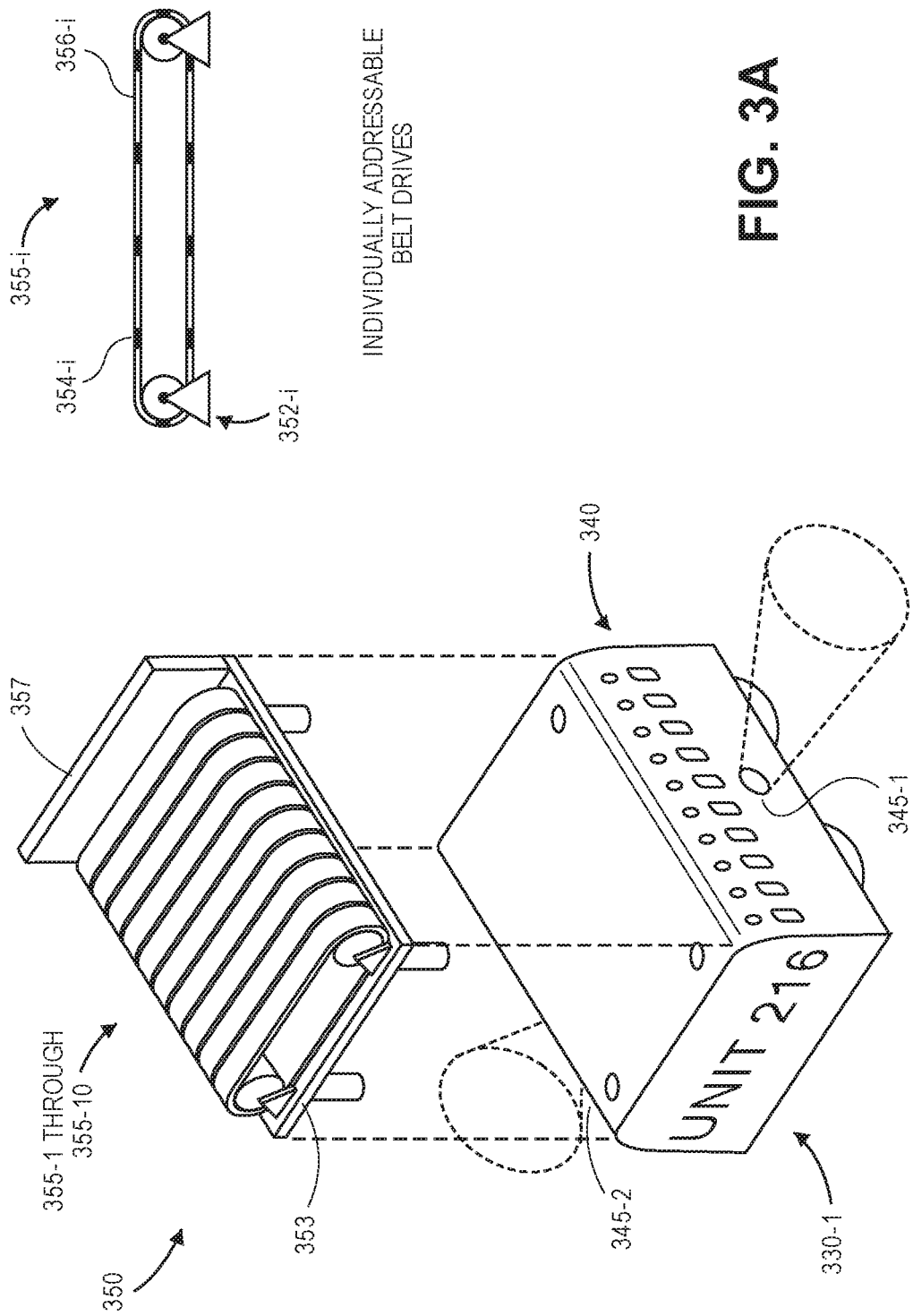
FIGS. 3A through 3F are views of aspects of one system for mobile sortation and delivery of items in accordance with embodiments of the present disclosure.

As is shown in FIG. 3A, an autonomous mobile robot 330-1 includes a transfer system 350 having a plurality of independently addressable conveyors 355-1 through 355-10 that are mounted to a base 353. Additionally, the robot 330-1 may have a frame or any other structural components, as well as a propulsion system having any number of axles and/or wheels, which may have bores or axle pads for accommodating axles of any diameter or thickness, as well as any number of spokes or other extensions for supporting a rim having any desired spacings or offsets for accommodating tires or other coverings. The axles may be joined to and configured to rotate any number of wheels, which may include tires or other coverings of any suitable material, including but not limited to rubbers and/or plastics, having any number of belts, walls, treads or other components, and may be pneumatic or solid, or take any other form. The robot 330-1 may also include any number of lights (e.g., light-emitting diodes, or "LED," or other light sources), transceivers, sensors, power modules (e.g., dry cell batteries, wet cell batteries, lead-acid batteries, lithium ion batteries, nickel cadmium batteries or nickel metal hydride batteries, fuel cells or solar panels), motors (e.g., a DC electric motor operating at twelve to forty-eight volts) that are configured to operate at any speed or have any power rating, and to cause the robot 330-1 to travel in a forward direction of travel, a reverse direction of travel or in any other direction of travel as determined by steering components (e.g., one or more racks or pinions for automatically changing a direction of travel, or an orientation of one or more axles or wheels). In some embodiments, the robot 330-1 may also have any number of item engagement systems (e.g., robotic arms or other like elements).

The robot 330-1 may be configured to select a path or route based on geospatial data regarding physical features in an area or environment, including but not limited to topographical data regarding the composition and surface features within the area or environment, as well as elevations of points within the area or environment, which may be identified or determined from satellite or ground-based imagery, GIS data, or any other information or data obtained from any other source. The robot 330-1 may be configured to operate indoors (e.g., within a fulfillment center or other like facility) or outdoors, such as in areas or environments having traditional transportation infrastructure such as roads, sidewalks, crosswalks, bicycle or walking paths, bridges or trails, or non-traditional transportation infrastructure such as parks, fields, forests, lots, clearings or other spaces. The robot 330-1 may be configured to select or define a path or route for travel or operation within an area or an environment based on attributes of prior travel through the area or environment such as one or more time stamps (e.g., times and positions of autonomous vehicles within the given area at such times), elapsed times between departures and arrivals, net speeds, courses, angles of orientation (e.g., a yaw, a pitch or a roll), levels of traffic congestion, sizes or dimensions of any payloads carried, environmental conditions or any other information or data that describes or represents instances of prior travel by autonomous vehicles within the area or environment.

In some embodiments, the robot 330-1 may further include any or all of the components described above with regard to the robots 130-1, 130-2 or the robots 230-1, 230-2, or any of the other autonomous mobile robots disclosed or referenced herein.

The base 353 is configured for releasable coupling to a drive unit 340, e.g., in a modular fashion. A barrier 357 is further coupled to the base 353, and aligned in parallel to the conveyors 355-1 through 355-10 of the transfer system 350. The drive unit 340 includes a pair of sensors 345-1, 345-2 disposed on outer surfaces of the drive unit 340. The sensors 345-1, 345-2 may be imaging devices (e.g., visual cameras or depth cameras), LIDAR sensors, RFID transceivers, Wi-Fi transceivers, Near Field Communication (or "NFC") transceivers, Bluetooth® transceivers, proximity sensors, or any other sensor or device. The base 353 and/or the drive unit 340 may further include any number of motorized components or assemblies for raising or lowering the base 353 with respect to the drive unit 340, for translating the base 353 with respect to the drive unit 340, or for varying an angle of the base 353 with respect to the drive unit 340.

As is also shown in FIG. 3A, each of the conveyors 355-1 through 355-10 of the transfer system 350, shown as a single representative conveyor 355-$i$, may include an independently addressable motor 352-$i$ and belt 356-$i$ or other carrying medium extending between two or more pulleys or drums. The motor 352-$i$ is configured to rotate one or more of the pulleys or drums, e.g., clockwise or counter-clockwise, at any speed to thereby cause the belt 356-$i$ to translate in one of two directions. The conveyor 355-$i$ may further include any number of motorized components or assemblies for raising or lowering the conveyor 355-$i$ with respect to the base 353, for translating the conveyor 355-$i$ with respect to the base 353, or for varying an angle of the conveyor 355-$i$ with respect to the base 353. In some embodiments, the motors 352-$i$ of the conveyors 355-1 through 355-10 may be configured to operate at the same speed. In some embodiments, each of the motors 352-$i$ of the conveyors 355-1 through 355-10 may be configured to operate at different speeds.

The belt 356-$i$ may be formed from any number of layers of suitable materials such as plastics (e.g., polyester, polyethylene, polyvinyl chloride, silicone), metals (e.g., belted steels), rubbers (e.g., neoprene, nitrile, styrene rubbers), fabrics or leather, which may be selected based on properties of friction, tensile strength, shear, temperature resistance, or the like. In some embodiments, the belt 356-$i$ may include one or more cleats, lugs, pegs or other features for enhancing the capacity of the belt 356-$i$ to transport one or more items thereon, e.g., by increasing friction between one or more of such items and the belt 356-$i$.

As is shown in FIG. 3A, the belt 356-$i$ further includes a plurality of tension sensors 354-$i$, each of which is configured to detect a level of tension within the belt 356-$i$, which may be a function of loading on the belt 356-$i$ by one or more items (not shown). Alternatively, one or more load sensors may be disposed in association with pulleys, drums or other apparatuses of the conveyor 355-$i$, which may sense vertical loading (e.g., weight) on the conveyor 355-$i$. Based on the tension sensed by a plurality of the tension sensors 354-$i$ of the conveyors 355-1 through 355-10, or weight sensed by one or more load sensors (not shown), an item on one or more of the conveyors 355-1 through 355-10 may be detected and/or identified. Alternatively, one or more imaging devices may include the conveyors 355-1 through 355-10 within a field of view, and an item may be detected and/or identified based on imaging data captured by the one or more imaging devices.

Figure 3B:
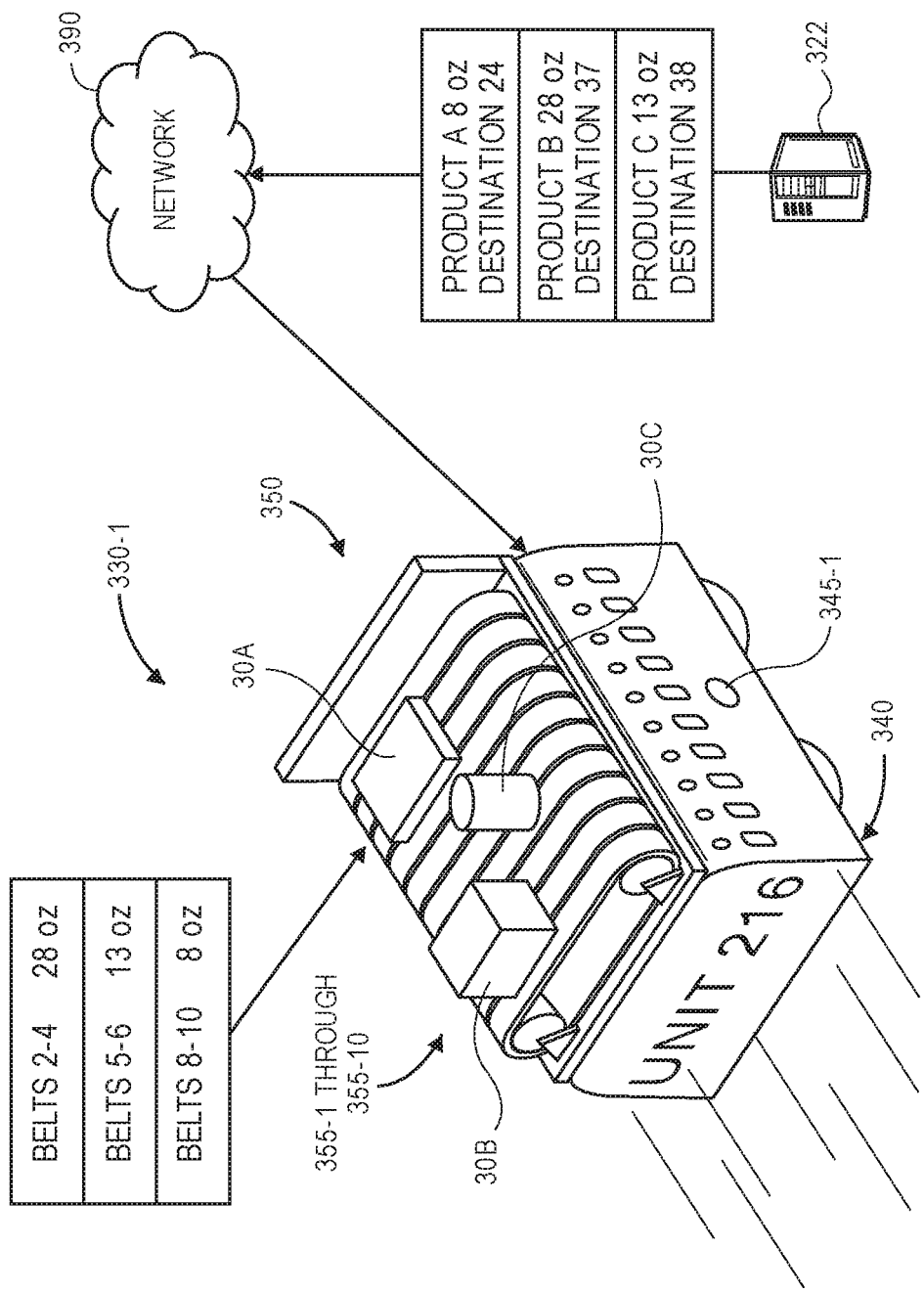

As is shown in FIG. 3B, the robot 330-1 may receive information regarding a plurality of items 30A, 30B, 30C from a server 322 over a network 390. The information received from the server 322 may identify masses of the items 30A, 30B, 30C and intended destinations for the items 30A, 30B, 30C. Accordingly, as the robot 330-1 transports the plurality of items 30A, 30B, 30C on a loading surface or storage surface defined by upper surfaces of the conveyors 355-1 through 355-10, the robot 330-1 may determine the loading on such conveyors 355-1 through 355-10, and identify the items 30A, 30B, 30C on such conveyors 355-1 through 355-10 based on the information received from the server 322. For example, as is shown in FIG. 3B, the robot 330-1 determines that the item 30A is resting on conveyors 355-2 through 355-4, that the item 30B is resting on the conveyors 355-8 through 355-10, and that the item 30C is resting on the conveyors 355-5, 355-6.

Figure 3C:
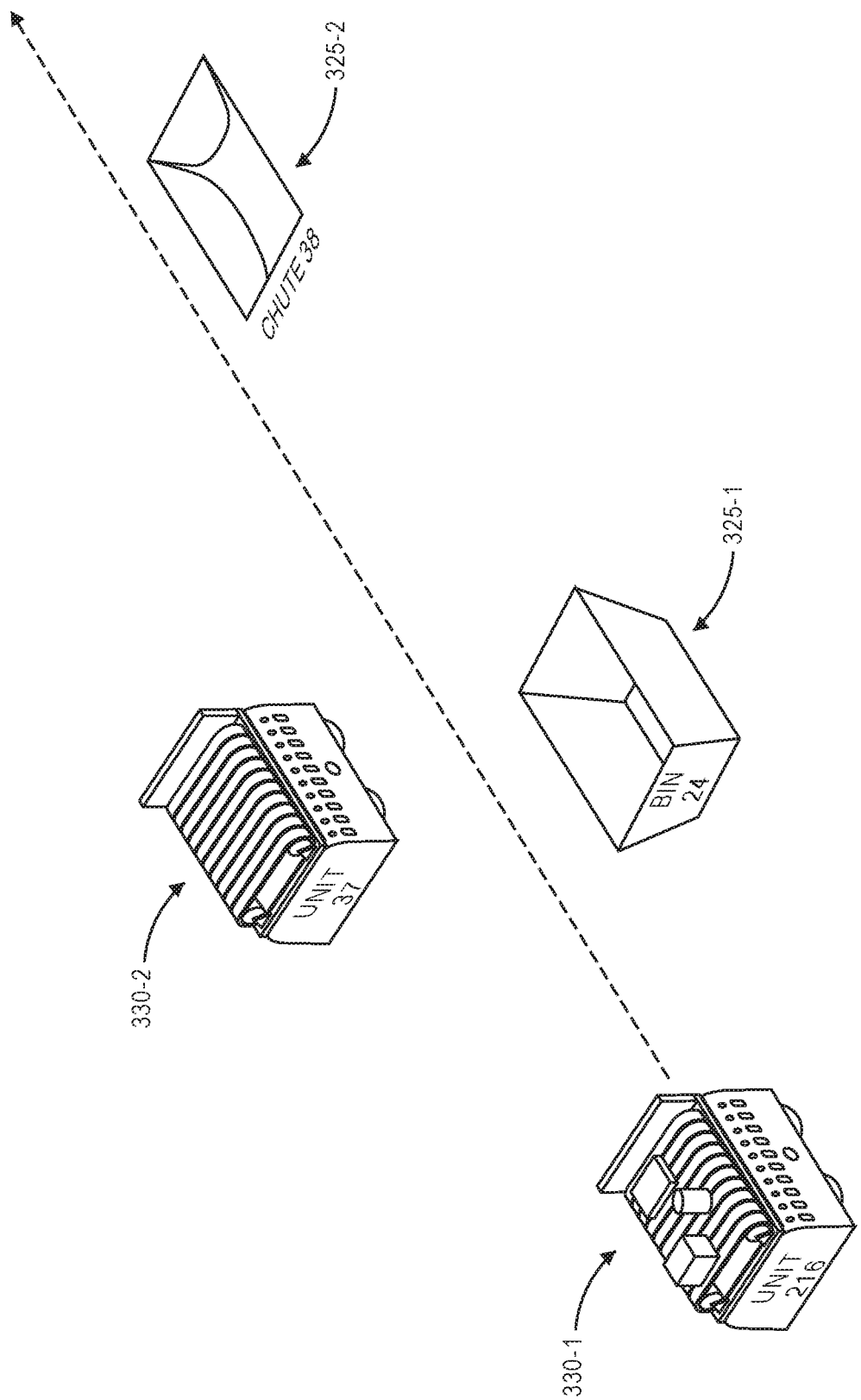
Figure 3D:
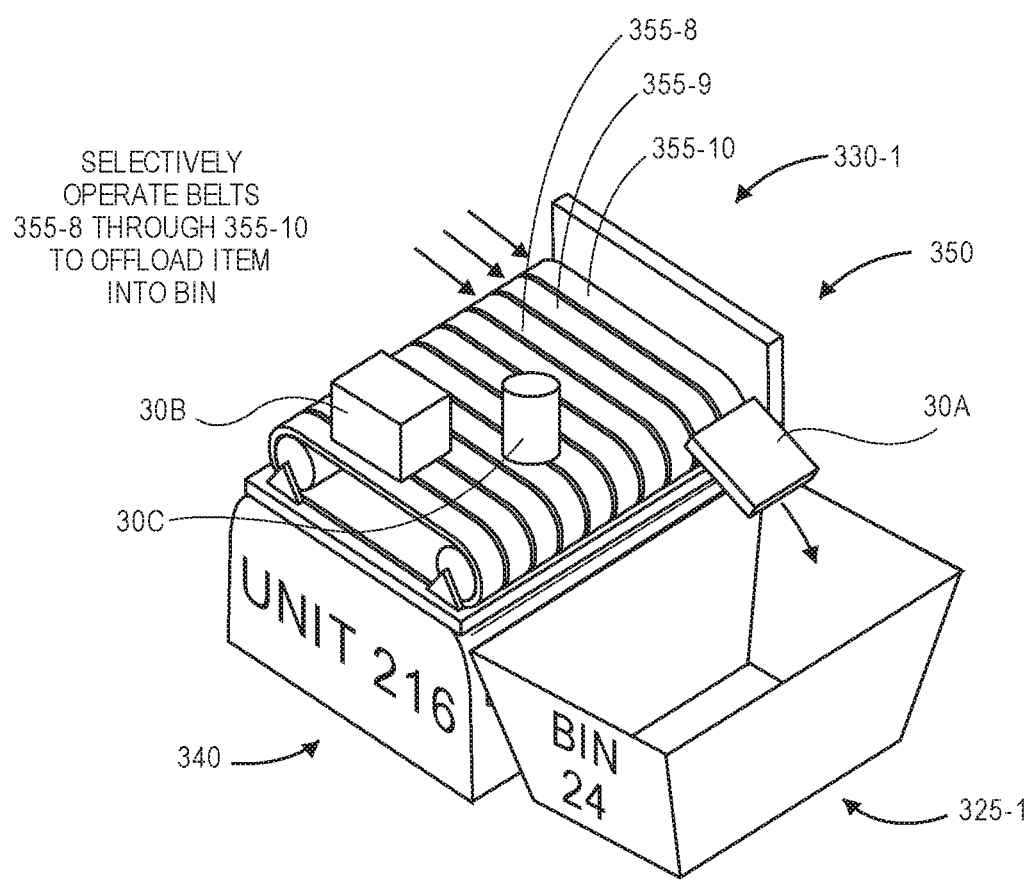

As is shown in FIG. 3C, the robot 330-1 transports the items 30A, 30B, 30C to the bin 325-1, to a robot 330-2, and to a chute 325-2 to independently deposit the items 30A, 30B, 30C therein. First, as is shown in FIG. 3D, upon arriving at the bin 325-1, the robot 330-1 may confirm its arrival or position itself with respect to the bin 325-1 based on information or data obtained by the sensors 345-1, 345-2. When the robot 330-1 is properly aligned with respect to the bin 325-1, the robot 330-1 may independently and selectively operate the conveyors 355-8 through 355-10 in a direction corresponding to the bin 325-1, in order to discharge the item 30A therein. In some embodiments, the transfer system 350 may be elevated with respect to the motor 340, or angled or translated toward the bin 325-1, to facilitate the discharge of the item 30A from the transfer system 350 into the bin 325-1.

Upon discharging the item 30A into the bin 325-1, the robot 330-1 may transmit one or more messages or other information or data to the server 322, e.g., over the network 390, or to any other computer device or system, before proceeding to a location of the robot 330-2. In some embodiments, the robot 330-2 may include any or all of the components described above with regard to the robots 130-1, 130-2, the robots 230-1, 230-2, the robot 330-1 or any of the other autonomous mobile robots disclosed or referenced herein.

Figure 3E:
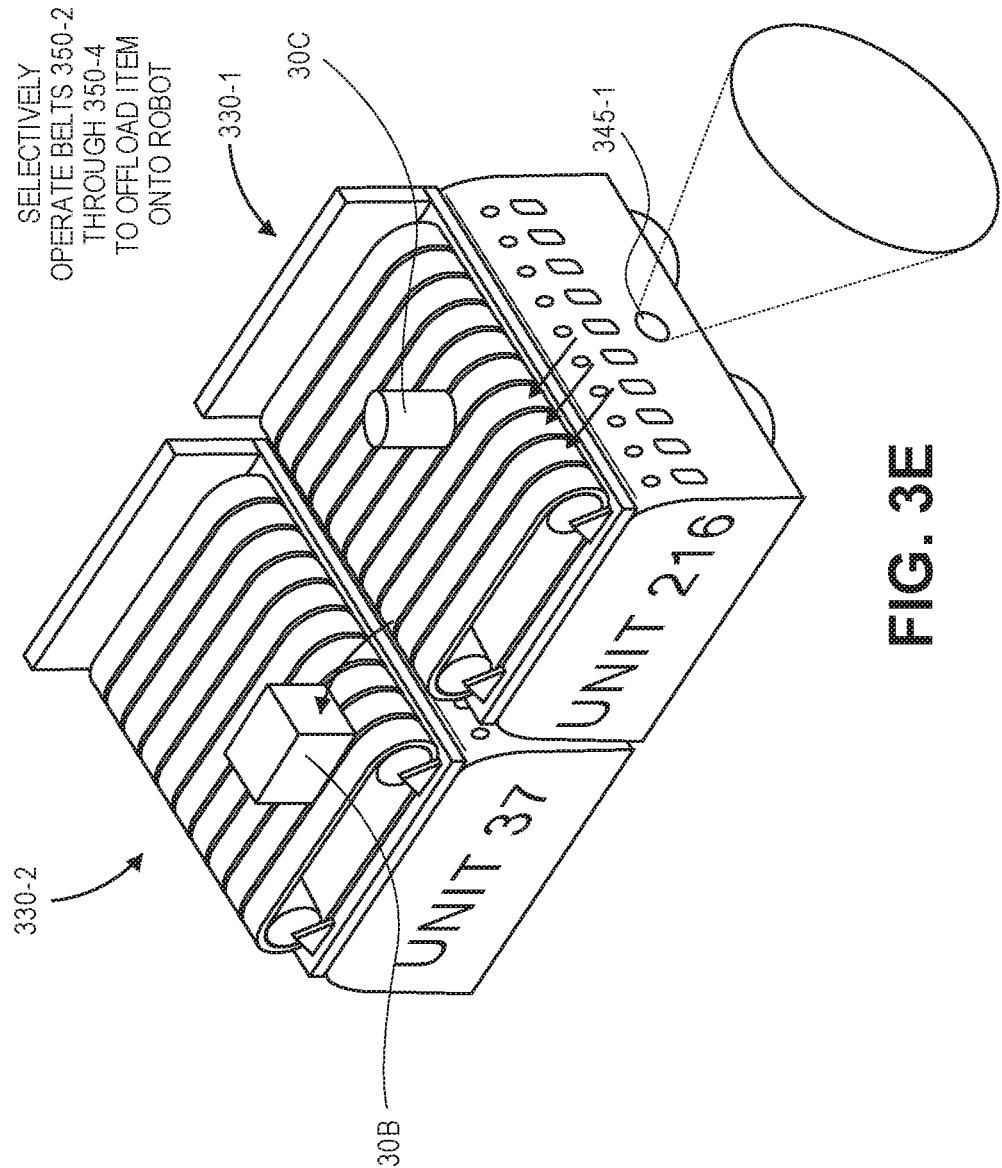

As is shown in FIG. 3E, upon arriving at the robot 330-2, the robot 330-1 may confirm its arrival or position itself with respect to the robot 330-2 based on information or data obtained by the sensors 345-1, 345-2. When the robot 330-1 and the robot 330-2 are properly aligned with respect to one another, the robot 330-1 may independently and selectively operate the conveyors 355-2 through 355-4 in a direction corresponding to the robot 330-2, in order to discharge the item 30B from the robot 330-1 to the robot 330-2. In some embodiments, the robot 330-2 may also operate one or more conveyors or any other aspect of a transfer system, where applicable, to aid in receiving the item 30B from the robot 330-1. In some embodiments, the transfer system 350 may be elevated with respect to the motor 340, or angled or translated toward the robot 330-2, or a transfer system of the robot 330-2 may be lowered, angled or translated with respect to the transfer system 350, to facilitate the discharge of the item 30A from the transfer system 350 onto the transfer system of the robot 330-2.

Upon confirming that the item 30B has been transferred to the robot 330-2, the robot 330-1 may transmit one or more messages or other information or data to the server 322 before proceeding to a location of the chute 325-2.

Figure 3F:
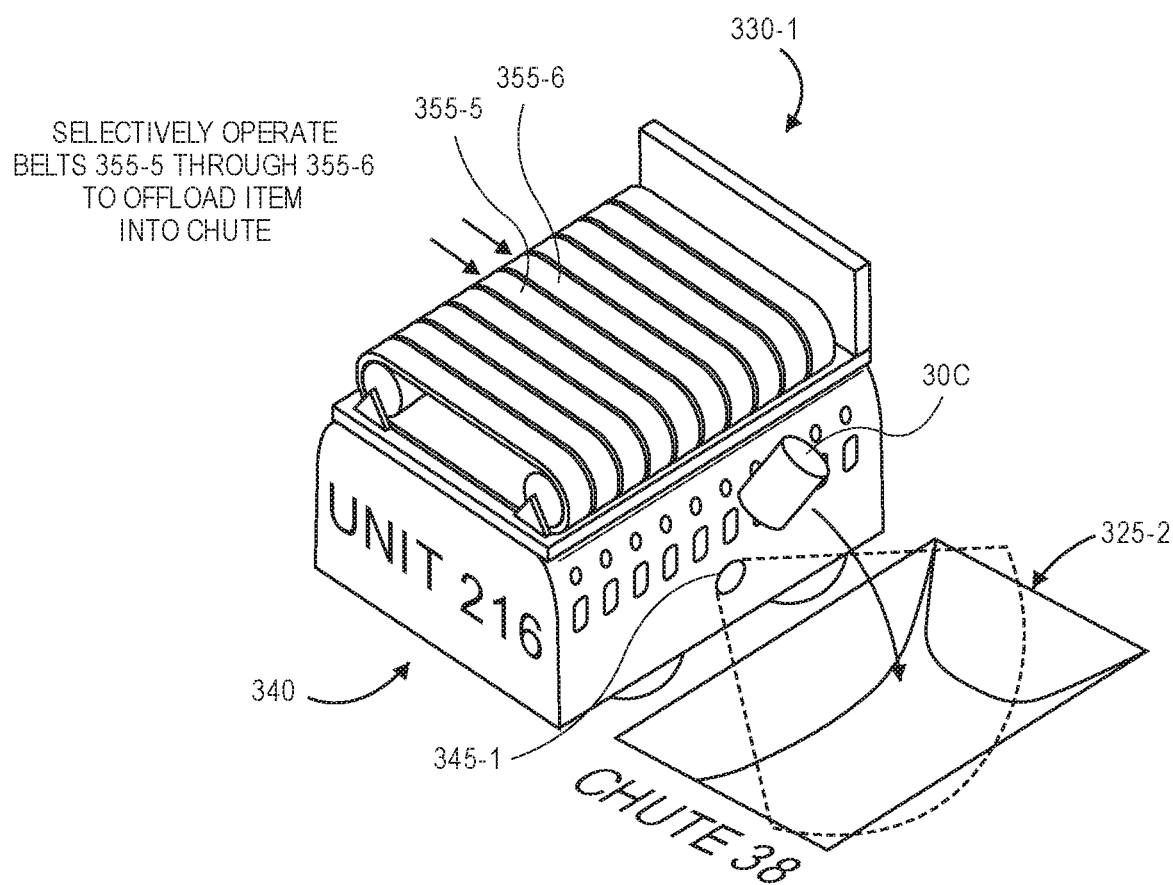

As is shown in FIG. 3F, upon arriving at the chute 325-2, the robot 330-1 may confirm its arrival or position itself with respect to the chute 325-2 based on information or data obtained by the sensors 345-1, 345-2. When the robot 330-1 is properly aligned with respect to the chute 325-2, the robot 330-1 may independently and selectively operate the conveyors 355-5 and 355-6 in a direction corresponding to the chute 325-2, in order to discharge the item 30C into the chute 325-2. In some embodiments, the chute 325-2 may lead to one or more humans, other robots, or other systems for receiving or handling items, such as the item 30B. Upon confirming that the item 30B has been deposited into the chute 325-2, the robot 330-1 may transmit one or more messages or other information or data to the server 322 before proceeding to any other location, or receiving any further tasking. In some embodiments, the transfer system 350 may be elevated with respect to the motor 340, or angled or translated toward the chute 325-2, to facilitate the discharge of the item 30C from the transfer system 350 into the chute 325-2.

As is discussed above, an autonomous mobile robot may include a transfer system having a vertical receptacle and a plurality of deployable floors therein, with each of the deployable floors being independently addressable between storage positions (or closed positions) within the receptacle and release positions (or open positions) with at least a portion of such floors outside of the receptacle. The transfer systems may enable an item to descend onto a conveyor positioned below the receptacle, and to be discharged from the robot at a selected location. Referring to FIGS. 4A through 4H, views of aspects of one system for mobile sortation and delivery of items in accordance with embodiments of the present disclosure are shown. Except where otherwise noted, reference numerals preceded by the number "4" in FIGS. 4A through 4H refer to elements that are similar to elements having reference numerals preceded by the number "3" in FIGS. 3A through 3F, by the number "2" in FIG. 2 or by the number "1" shown in FIGS. 1A through 1I.

Figure 4A:
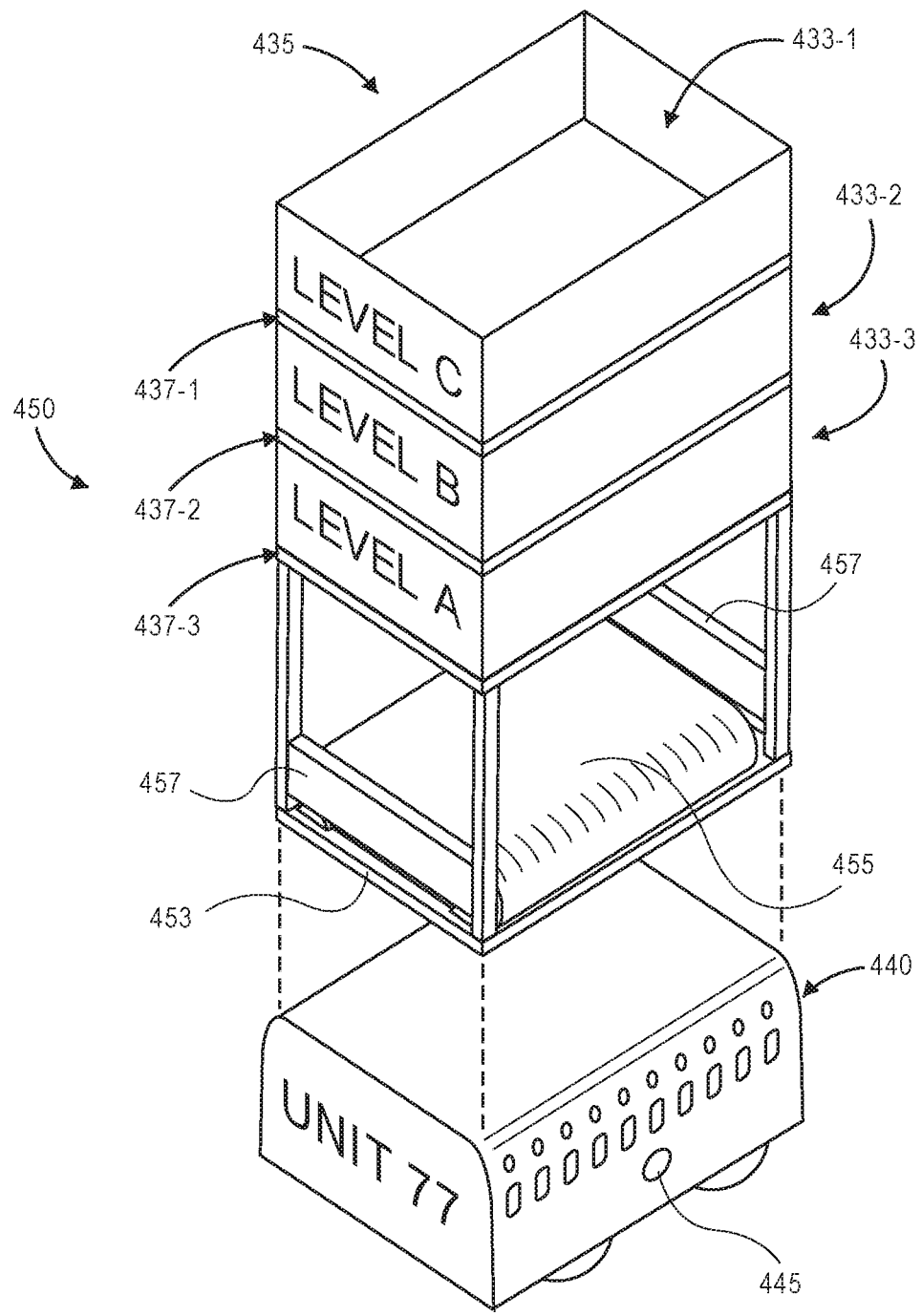
FIGS. 4A through 4H are views of aspects of one system for mobile sortation and delivery of items in accordance with embodiments of the present disclosure.

As is shown in FIG. 4A, a robot 430 includes a transfer system 450 having a vertical receptacle 435 and a conveyor 455 coupled to a base 453 that is configured for mounting to a drive unit 440. In some embodiments, the robot 430 may include any or all of the components described above with regard to the robots 130-1, 130-2, the robots 230-1, 230-2 or the robots 330-1, 330-2, or any of the other autonomous mobile robots disclosed or referenced herein.

The receptacle 435 of the transfer system 450 includes a plurality of deployable floors 437-1, 437-2, 437-3, each of which may be deployed between storage positions within the receptacle 435 and release positions outside of the receptacle 435, e.g., by one or more motors or actuators. Additionally, the receptacle 435 further defines a plurality of chambers 433-1, 433-2, 433-3 for storing items therein, including a first chamber 433-1 above an upper surface of the deployable floor 437-1, a second chamber 433-2 between a lower surface of the deployable floor 437-1 and an upper surface of the deployable floor 437-2, and a third chamber 433-3 between a lower surface of the deployable floor 437-2 and an upper surface of the deployable floor 437-3. The conveyor 455 is disposed below a lower surface of the deployable floor 437-3. The conveyor 455 is configured to translate items in either of two directions along an axis, e.g., on a belt or other carrying medium, and includes barriers 457 provided in parallel to the axis on either side of the belt or carrying medium. In some embodiments, a belt of the conveyor 455 may include one or more cleats, lugs, pegs or other features for enhancing the capacity of the belt to transport one or more items thereon, e.g., by increasing friction between one or more of such items and the belt. The transfer system 450 may further include any number of motorized components or assemblies for raising or lowering the conveyor 455 with respect to the base 453, for translating the conveyor 455 with respect to the base 453, or for varying an angle of the conveyor 455 with respect to the base 453.

Figure 4B:
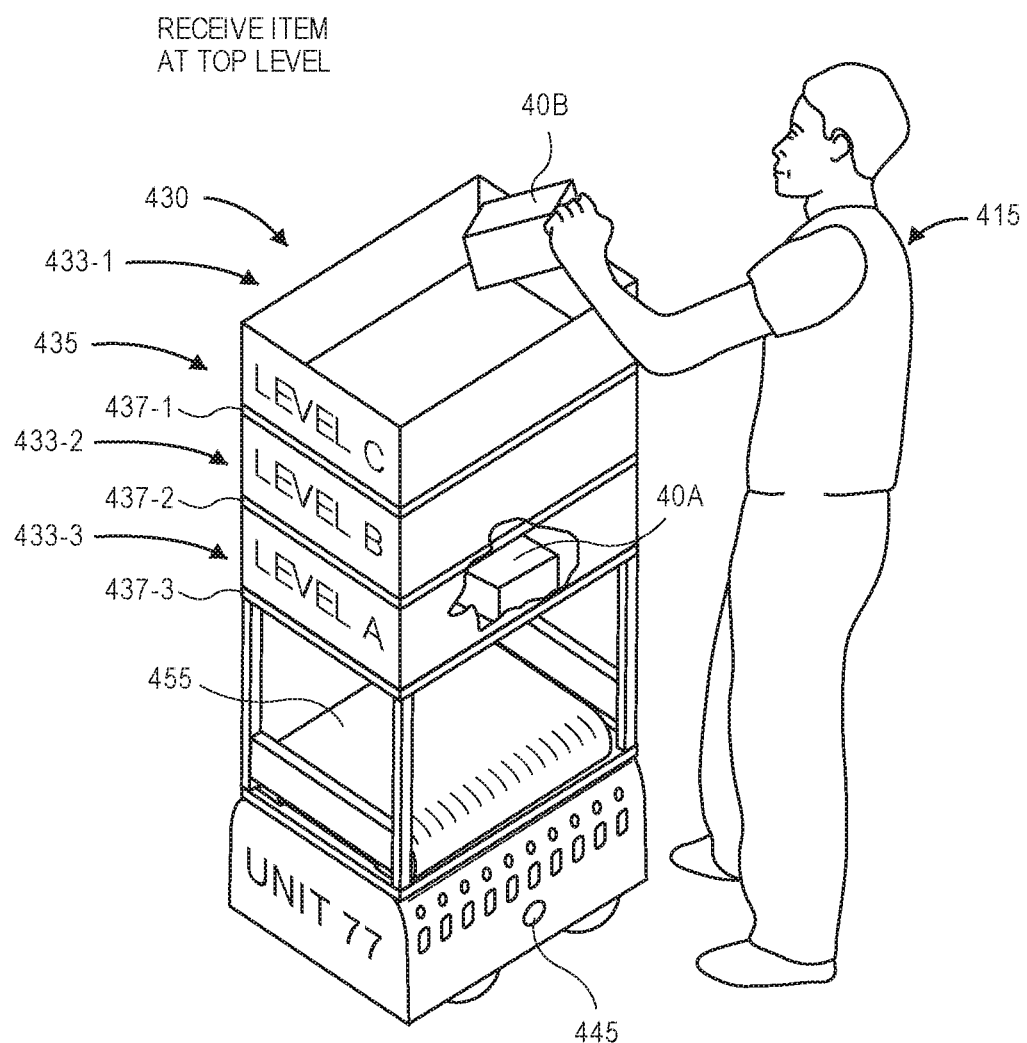
Figure 4C:
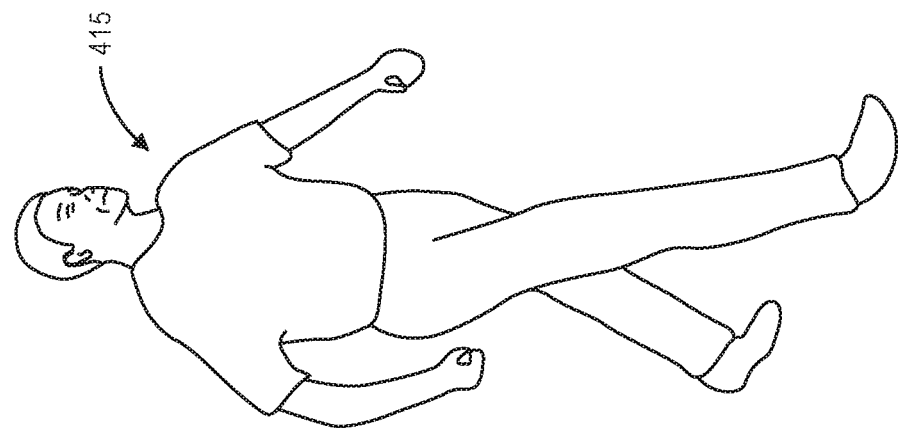
Figure 4C:
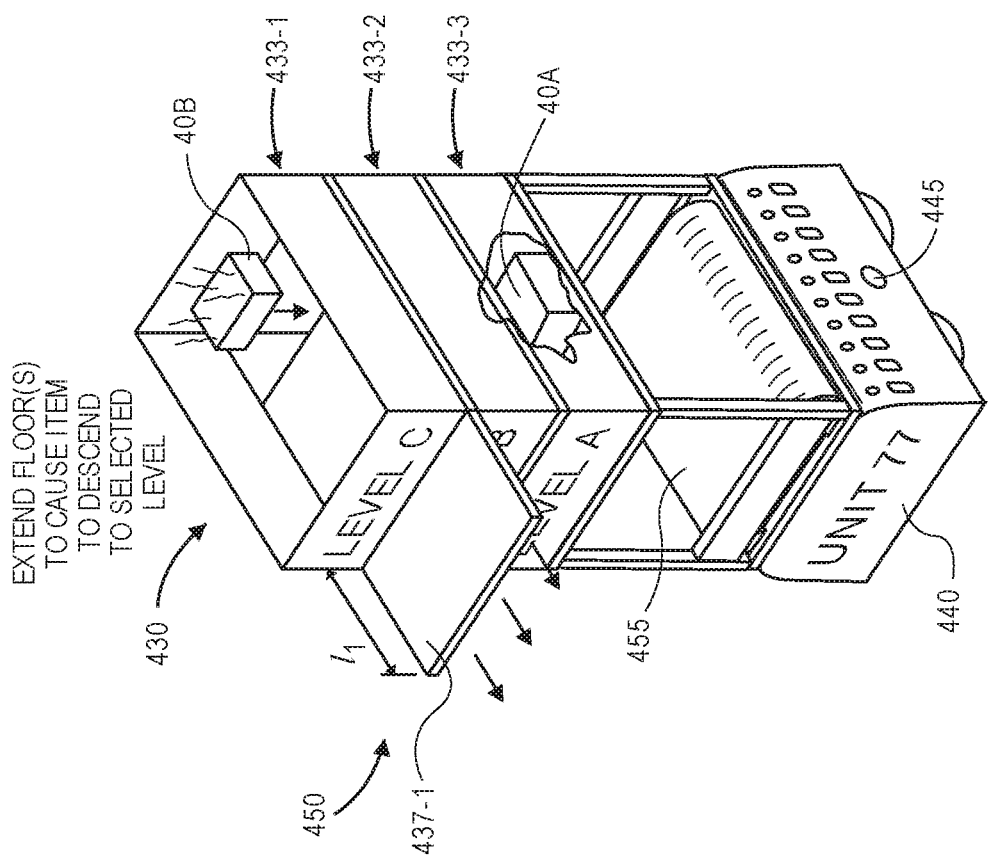

As is shown in FIG. 4B, an item 40A is disposed within the third chamber 433-3, and a worker 415 deposits an item 40B into the first chamber 433-1, e.g., atop the deployable floor 437-1, at a top level of the receptacle 435. As is shown in FIG. 4C, the item 40B may be placed in the second chamber 433-2 automatically by deploying the deployable floor 437-1 from a storage position to at least a partial release position, such as by extending the deployable floor 437-1 by a distance h that is not less than a dimension of the item 40B. The distance h by which the deployable floor 437-1 is extended may be selected on any basis, including but not limited to one or more dimensions of the item 40B, as well as any dimensions or other attributes of other items that may be present within the first chamber 433-1 (not shown). In some embodiments, the deployable floor 437-1 could be fully deployed by a maximum extent, to ensure that the item 40B passes from the first chamber 433-1 into the second chamber 433-2. Alternatively, the item 40B could be further transferred into the third chamber 433-3 by further deploying the deployable floor 437-2 by a selected extent.

Figure 4D:
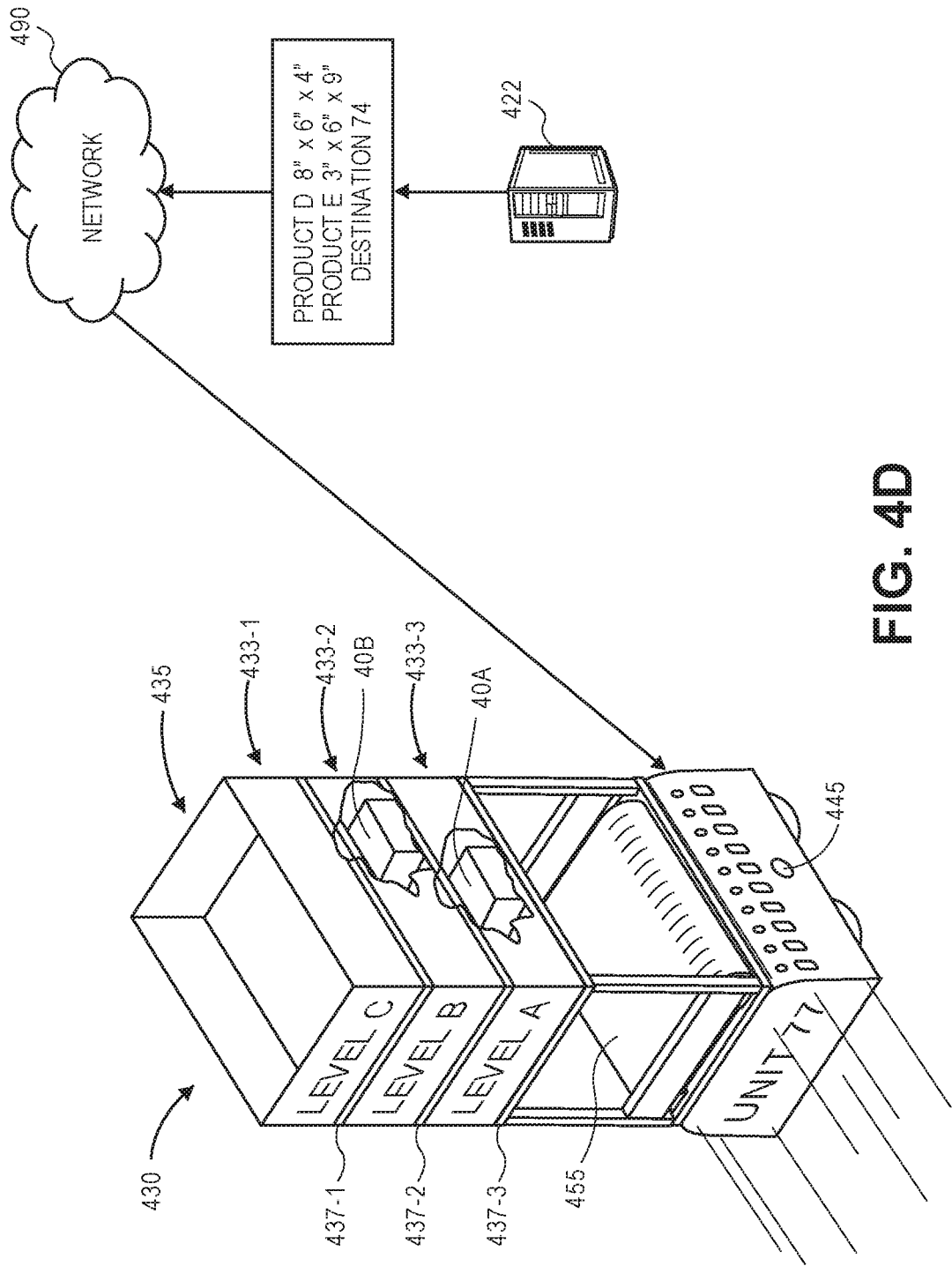
Figure 4E:
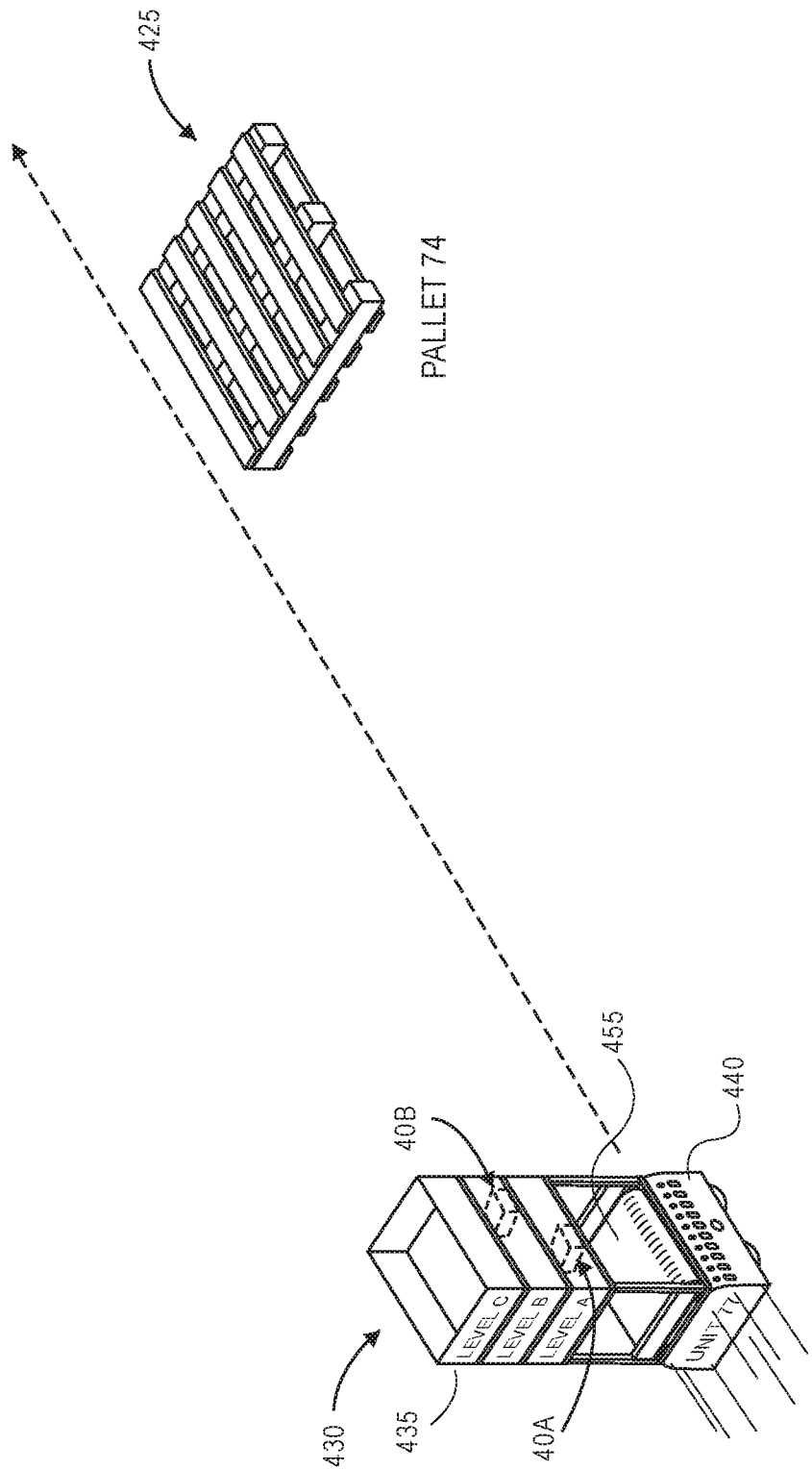

As is shown in FIG. 4D, with the item 40A housed within the third chamber 433-3, and the item 40B housed within the second chamber 433-2, the robot 430 receives an instruction to transport the items 40A, 40B to a selected destination from a server 422 over a network 490. As is shown in FIG. 4E, the robot 430 proceeds to the selected destination, viz., a pallet 425, via an optimal path or route, or any other path or route.

Figure 4F:
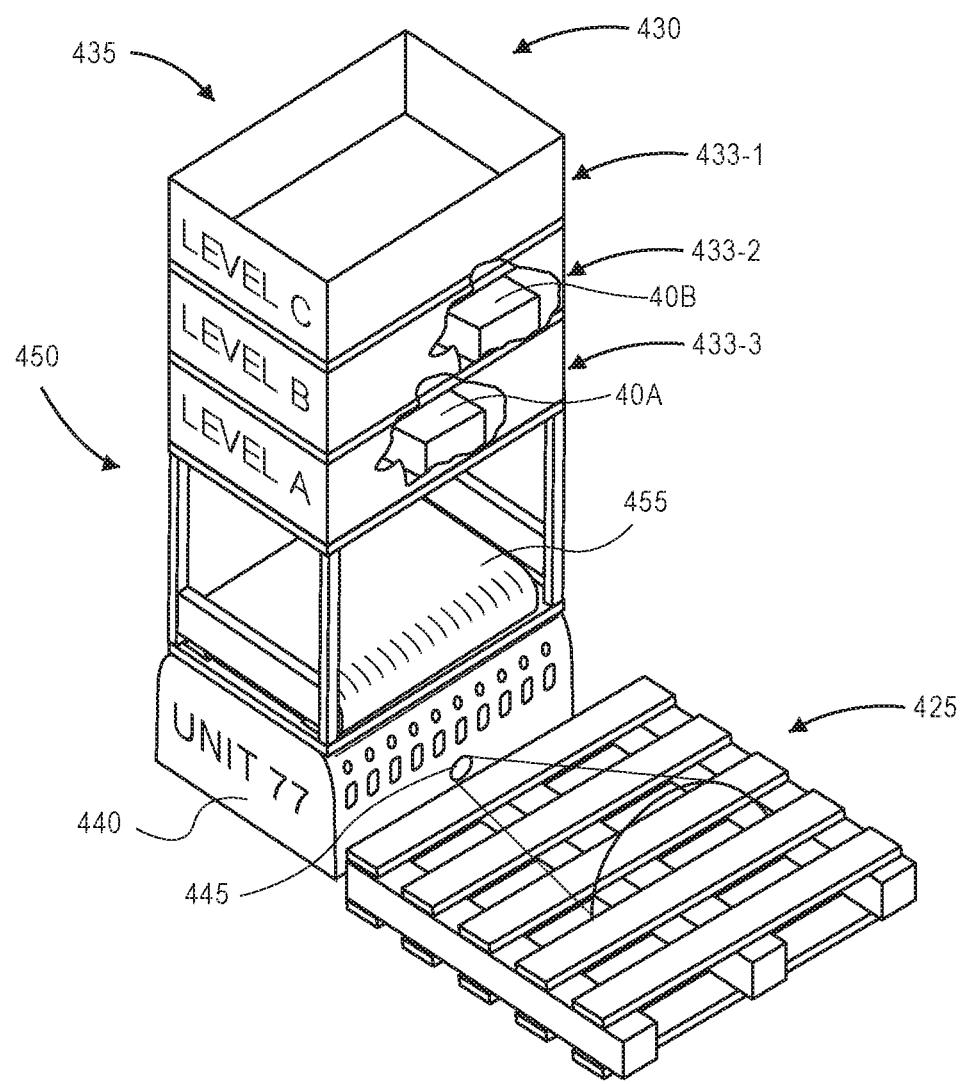
Figure 4G:
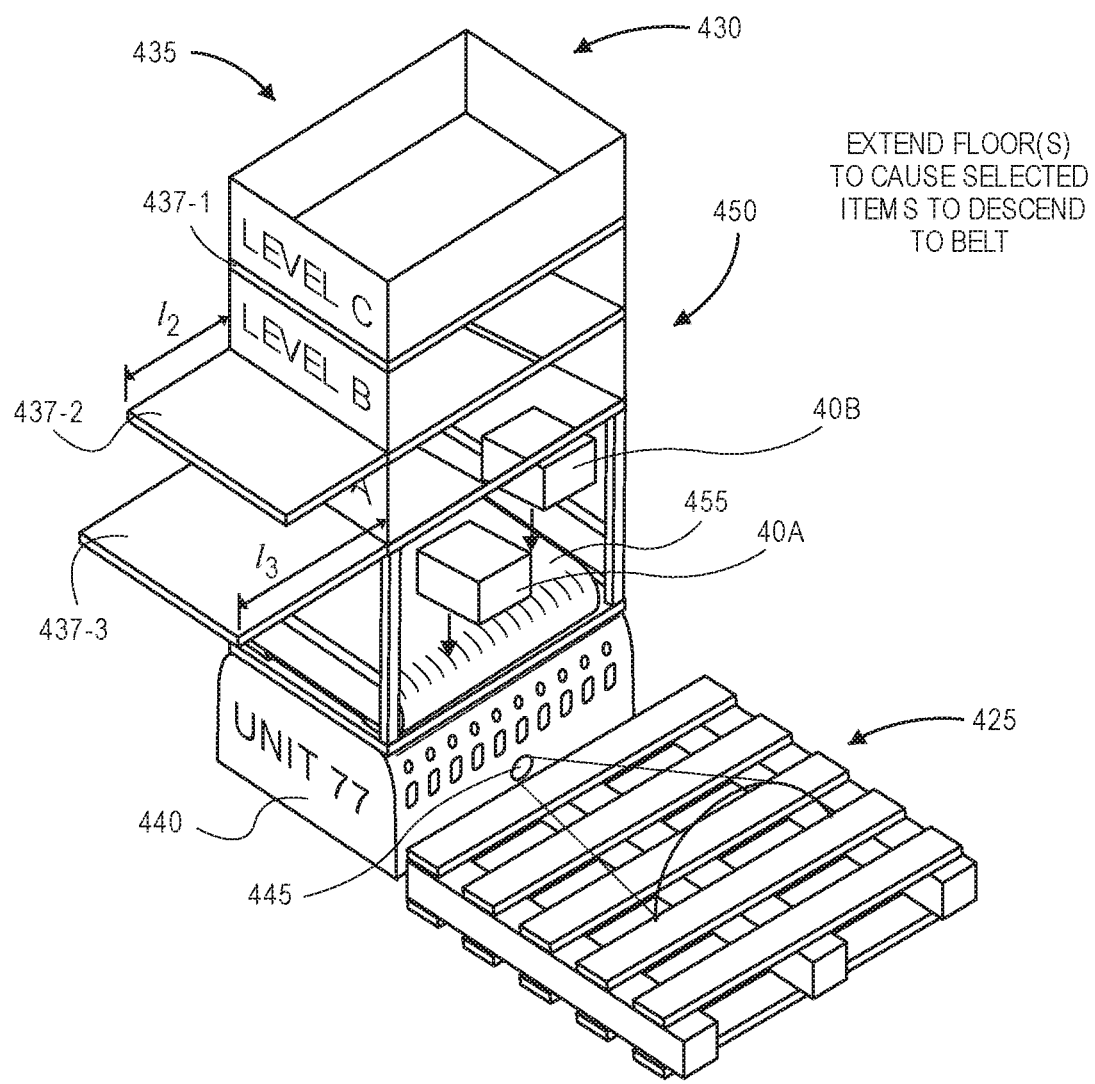

As is shown in FIG. 4F, the robot 430 arrives at the pallet 425, and may confirm its location with respect to the pallet 425 based on information or data received by one or more sensors 445, e.g., one or more imaging devices, LIDAR sensors, RFID transceivers, Wi-Fi transceivers, NFC transceivers, Bluetooth® transceivers, or any other sensor. As is shown in FIG. 4G, after confirming its location with respect to the pallet 425, the robot 430 may cause the items 40A, 40B to descend onto the conveyor 455 by extending the deployable floors 437-2, 437-3 by distances $I_2$, $I_3$, respectively. The distances $I_2$, $I_3$ may be selected on any basis, including but not limited to one or more dimensions of the items 40A, 40B, or on any other factor. Alternatively, the deployable floors 437-2, 437-3 could be fully deployed to their maximum extents, to ensure that the items 40A, 40B, and any other contents of the second chamber 433-2 and the third chamber 433-3, descend onto the conveyor 455.

Figure 4H:
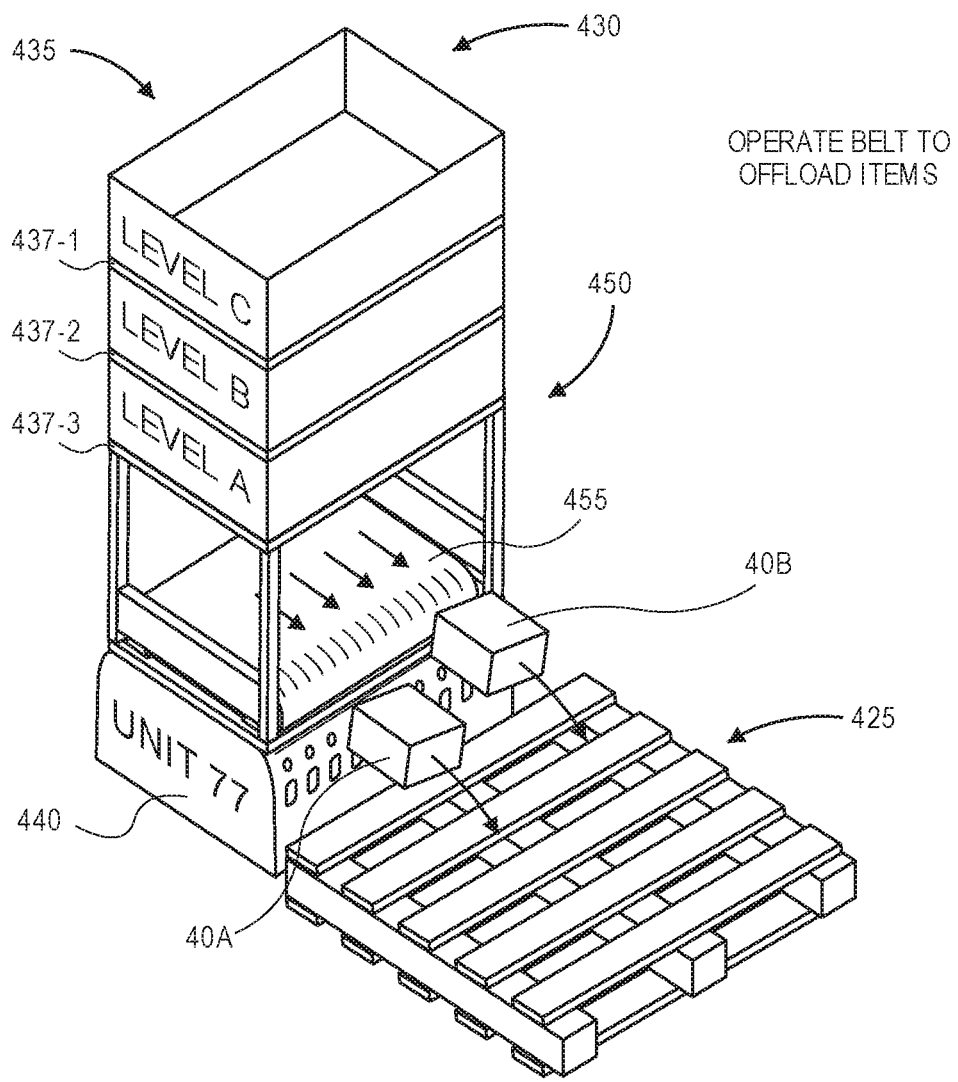

As is shown in FIG. 4H, the conveyor 455 may be operated to cause the items 40A, 40B to be discharged therefrom, e.g., in a direction of the pallet 425. The robot 430 may transmit one or more messages or other information or data to the server 422, e.g., over the network 490, or to any other computer device or system, before proceeding to further tasking, or taking any other relevant actions.

As is discussed above, an autonomous mobile robot may include a transfer system having a plurality of independently addressable diverters that are aligned in parallel and configured to extend over a loading surface or storage surface. The diverters may be independently operated to discharge one or more items from the loading surface or storage surface at selected destinations, as desired. Referring to FIGS. 5A through 5D, views of aspects of one system for mobile sortation and delivery of items in accordance with embodiments of the present disclosure are shown. Except where otherwise noted, reference numerals preceded by the number "5" in FIGS. 5A through 5D refer to elements that are similar to elements having reference numerals preceded by the number "4" in FIGS. 4A through 4H, by the number "3" in FIGS. 3A through 3F, by the number "2" in FIG. 2 or by the number "1" shown in FIGS. 1A through 1I.

Figure 5A:
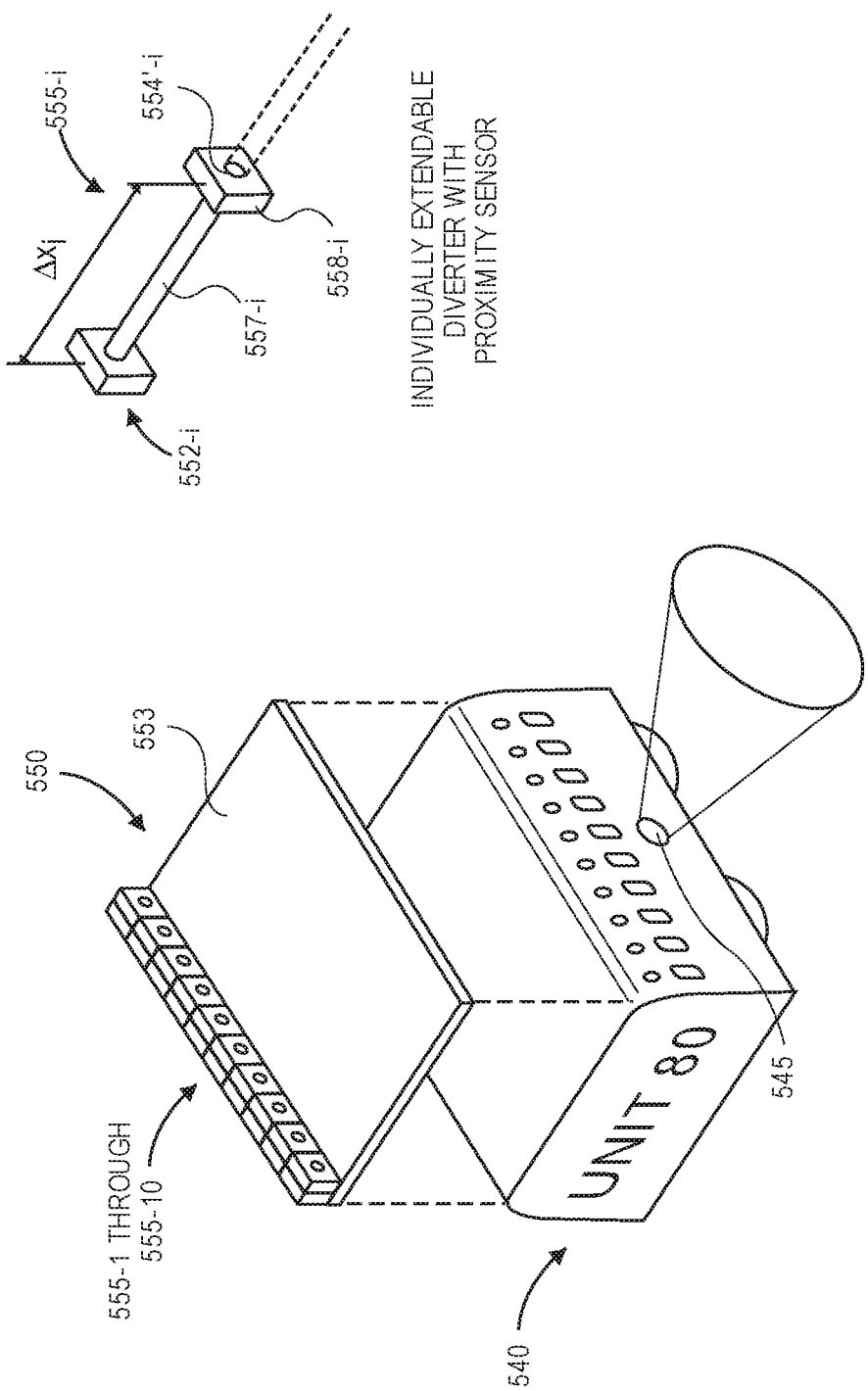
FIGS. 5A through 5D are views of aspects of one system for mobile sortation and delivery of items in accordance with embodiments of the present disclosure.

As is shown in FIG. 5A, an autonomous mobile robot 530 includes a transfer system 550 having a plurality of individually addressable diverters 555-1 through 555-10 that are mounted to a base 553, which is configured for releasable coupling to a drive unit 540, e.g., in a modular fashion. The drive unit 540 includes a sensor 545 disposed on an outer surface thereof. In some embodiments, the robot 530 may include any or all of the components described above with regard to the robots 130-1, 130-2, the robots 230-1, 230-2, the robots 330-1, 330-2, or the robot 430, or any of the other autonomous mobile robots disclosed or referenced herein. The base 553 and/or the drive unit 540 may further include any number of motorized components or assemblies for raising or lowering the base 553 with respect to the drive unit 540, for translating the base 553 with respect to the drive unit 540, or for varying an angle of the base 553 with respect to the drive unit 540.

As is also shown in FIG. 5A, each of the diverters 555-1 through 555-10, shown as a single diverter 555-$i$, may include an independently operable motor 552-$i$ configured to extend or retract a shaft 557-$i$ by a selected distance $\Delta x_i$, e.g., at the same speed, or at different speeds. The diverter 555-$i$ further includes a proximity sensor 554-$i$ (e.g., an imaging device or LIDAR sensor) disposed on a contact element 558-$i$ provided at a distal end of the shaft 557-$i$. Thus, with each of the diverters 555-1 through 555-10 aligned in parallel, any of the diverters 555-1 through 555-10 may be independently extended by selected distances $\Delta x_i$ across the base 553, in order to come into contact with any items placed thereon.

Figure 5B:
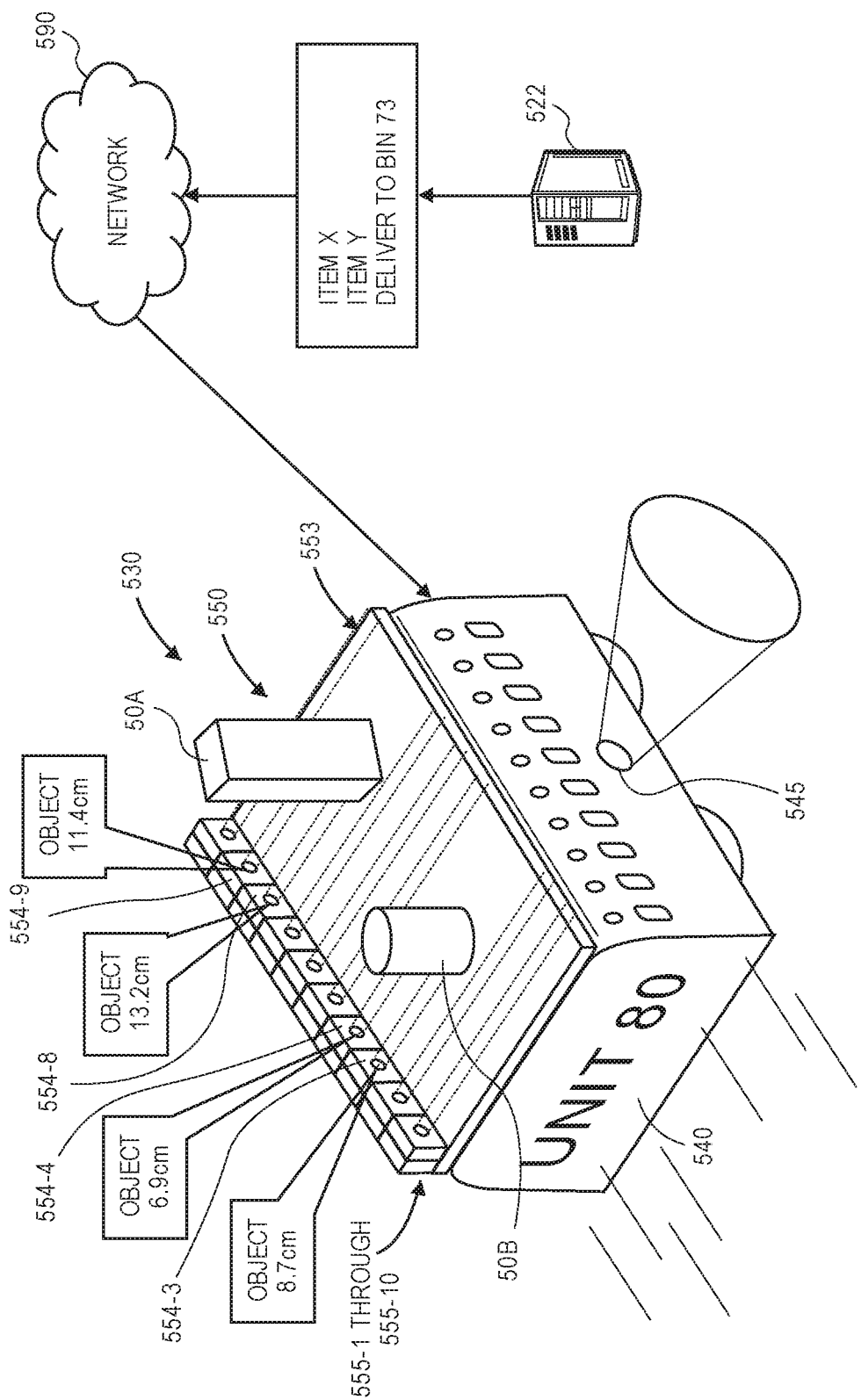

As is shown in FIG. 5B, a pair of items 50A, 50B are placed on the loading surface or storage surface defined by the base 553. The robot 530 receives an instruction to deliver the items 50A, 50B to a bin 525 from a server 522 over a network 590.

Each of the sensors 554-1 through 554-10 may independently determine ranges to any objects. For example, as is shown in FIG. 5B, the sensors 554-2, 554-3 determine ranges of 11.4 centimeters and 13.2 centimeters to surfaces of the item 50A, while the sensors 554-7, 554-8 determine ranges of 6.9 centimeters and 8.7 centimeters to surfaces of the item 50B. The sensors 554-1, 554-4, 554-5, 554-6, 554-9, 554-10 do not detect any portions of any items.

Figure 5C:
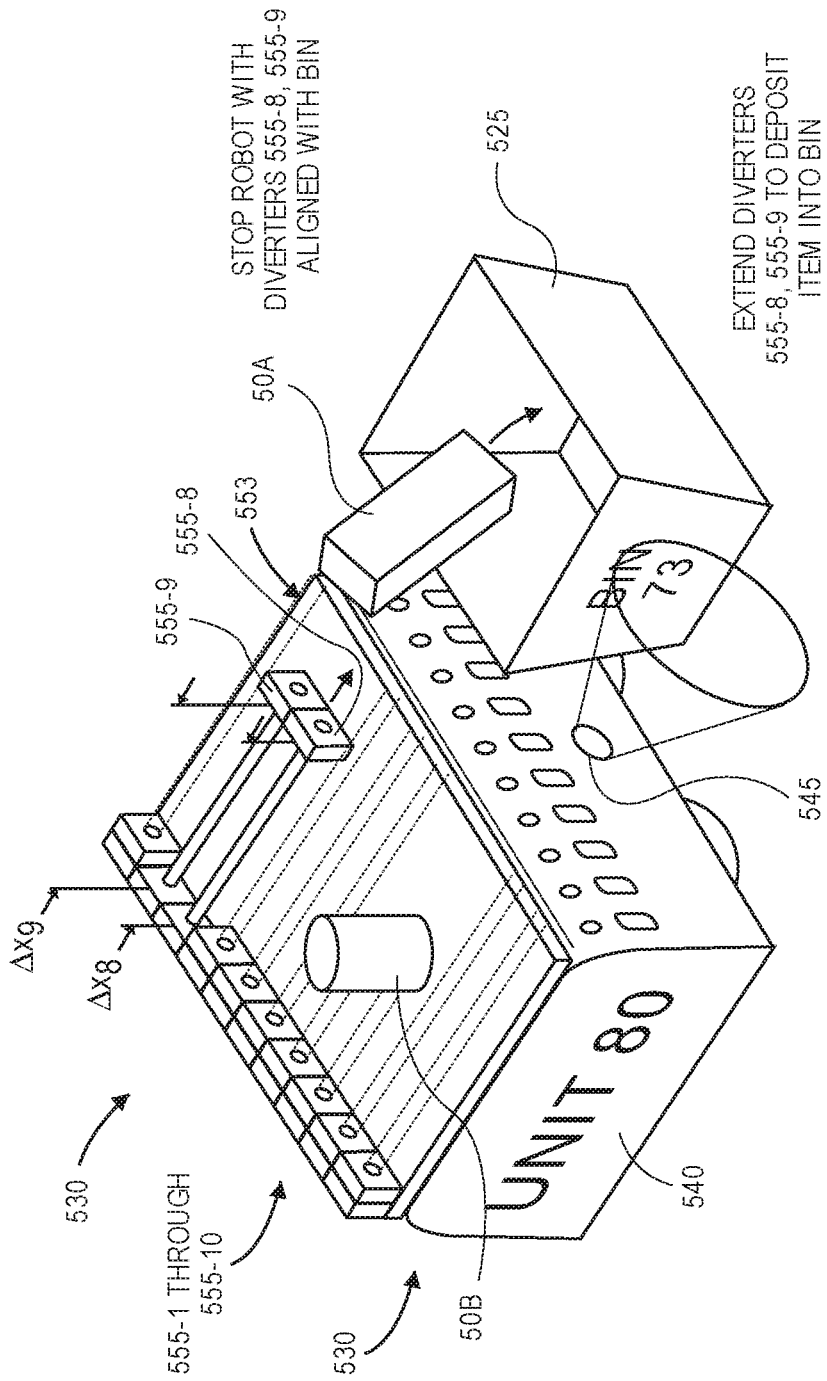

As is shown in FIG. 5C, upon arriving at the bin 525, the robot 530 may confirm its position with respect to the bin 525 based on information or data obtained by the sensor 545. Once the robot 530 is properly positioned with respect to the bin 525, the diverters 555-8, 555-9 may be extended by selected distances $\Delta x_8$, $\Delta x_9$ to come into contact with the item 50A, and to cause the item 50A to be discharged from the loading surface or storage surface on the base 553, and into the bin 525. The distances $\Delta x_8$, $\Delta x_9$ may be selected on any basis, including one or more properties of the item 50A, as well as a distance from the item 50A to the bin 525, or on any other factor.

Figure 5D:
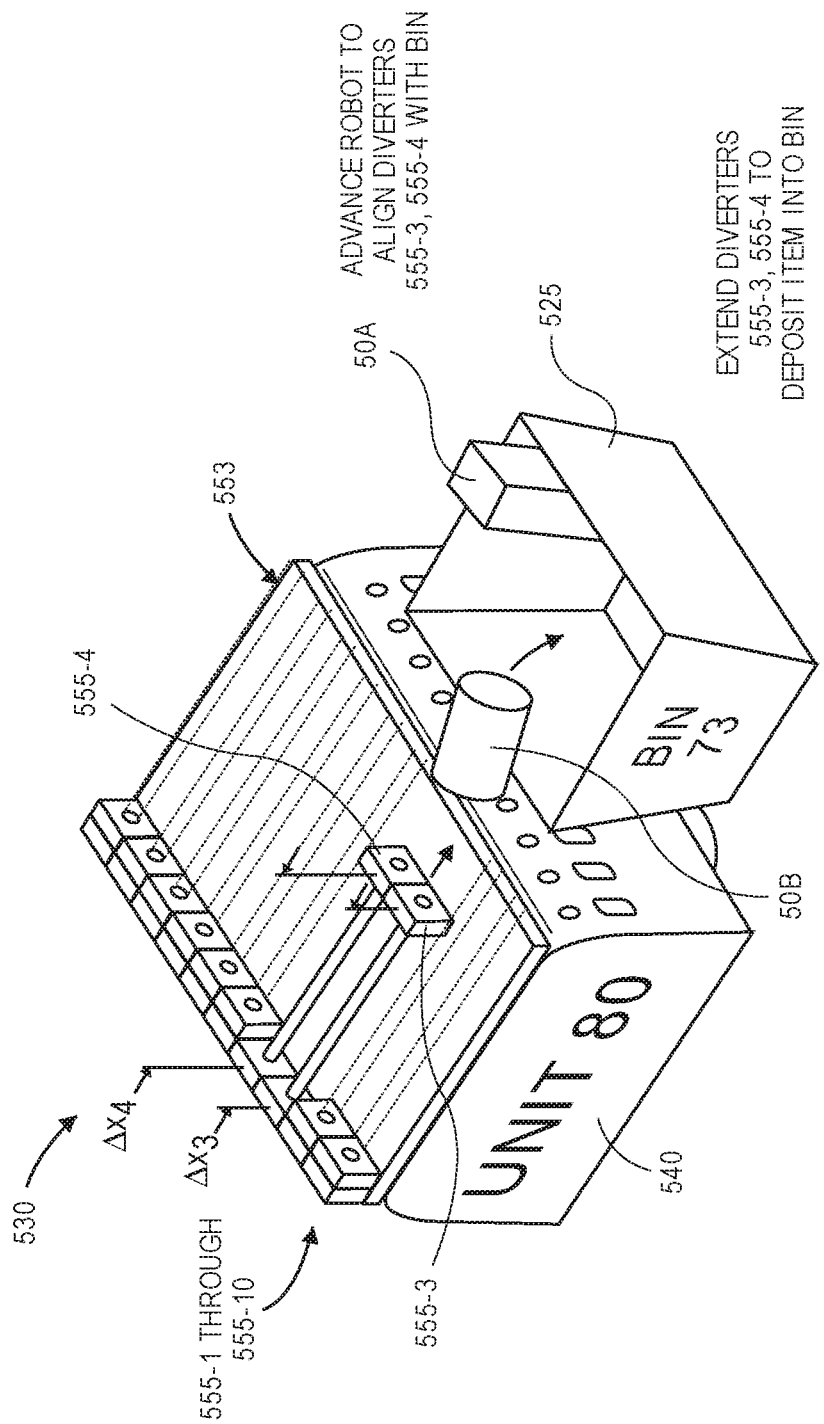

Similarly, as is shown in FIG. 5D, after discharging the item 50A from the loading surface or storage surface, the robot 530 may reposition itself with respect to the bin 525, e.g., to confirm that the diverters 555-3, 555-4 are properly aligned with respect to the bin 525. Once the robot 530 is properly positioned with respect to the bin 525, the diverters 555-3, 555-4 may be extended by selected distances $\Delta x_3$, $\Delta x_4$ to come into contact with the item 50B, and to cause the item 50B to be discharged from the loading surface or storage surface on the base 553, and into the bin 525. Like the distances $\Delta x_8$, $\Delta x_9$, the distances $\Delta x_3$, $\Delta x_4$ may be selected on any basis, including one or more properties of the item 50B, as well as a distance from the item 50B to the bin 525, or on any other factor. Upon confirming that the item 50B has been deposited into the bin 525, the robot 530 may transmit one or more messages or other information or data to one or more external computer devices or systems before proceeding to any other location, or receiving any further tasking.

Figure 6A:
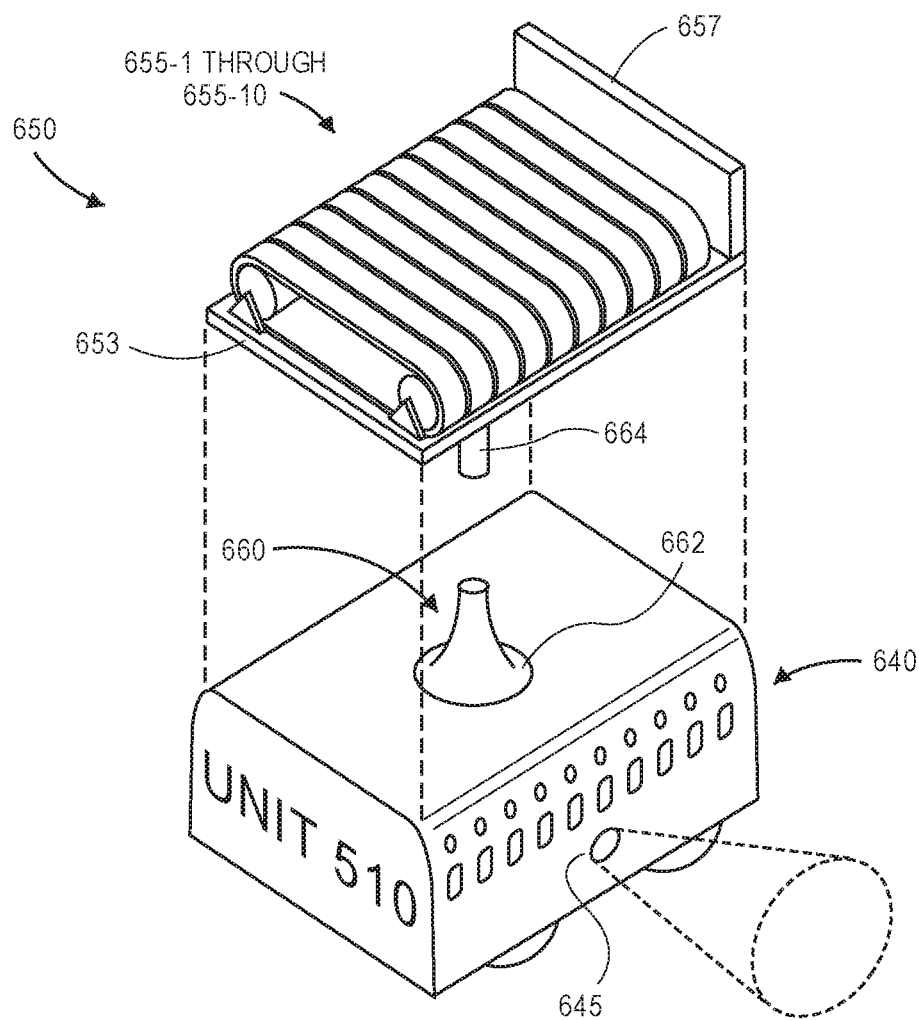
FIGS. 6A and 6B are views of aspects of one system for mobile sortation and delivery of items in accordance with embodiments of the present disclosure.
Figure 6B:
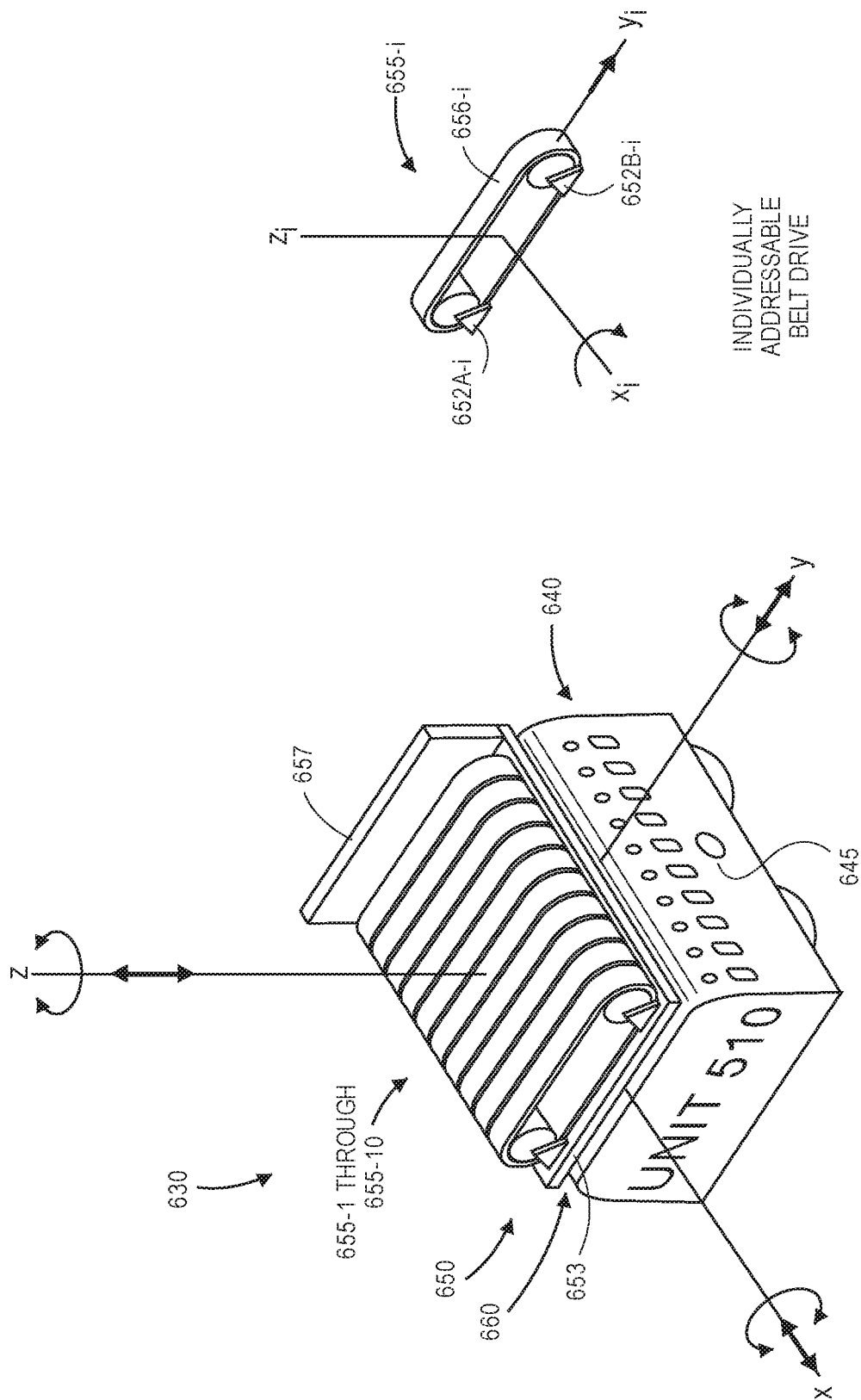

As is discussed above, the transfer systems of the present disclosure may be configured to be raised, lowered or translated with respect to a drive unit, or oriented at any selected angles. Referring to FIGS. 6A and 6B, views of aspects of one system for mobile sortation and delivery of items in accordance with embodiments of the present disclosure are shown. Except where otherwise noted, reference numerals preceded by the number "6" in FIGS. 6A and 6B refer to elements that are similar to elements having reference numerals preceded by the number "5" in FIGS. 5A through 5D, by the number "4" in FIGS. 4A through 4H, by the number "3" in FIGS. 3A through 3F, by the number "2" in FIG. 2 or by the number "1" shown in FIGS. 1A through 1I.

As is shown in FIGS. 6A and 6B, a robot 630 includes a motor unit 640 having a transfer system 650 releasably coupled thereto by way of a mount assembly 660. The motor unit 640 includes a sensor 645, which may be an imaging device (e.g., a visual camera or a depth camera), a LIDAR sensor, an RFID transceiver, a Wi-Fi transceiver, an NFC transceiver, a Bluetooth® transceiver, a proximity sensor, or any other sensor or device configured to detect the presence of one or more objects, to calculate ranges to such objects, or to identify such objects. The motor unit 640 may further include a frame or any other structural components, as well as a propulsion system having any number of axles and/or wheels, which may have bores or axle pads for accommodating axles of any diameter or thickness, as well as any number of spokes or other extensions for supporting a rim having any desired spacings or offsets for accommodating tires or other coverings. The motor unit 640 may further include any number of lights, transceivers, sensors, power modules, motors, item engagement systems or other components. The transfer system 650 includes a base 653, a plurality of independently addressable conveyors 655-1 through 655-10 that are mounted to the base 653, and a barrier 657 that is also mounted to the base 653.

The mount assembly 660 couples the transfer system 650 to a frame of the drive unit 640. In at least one embodiment, the mount assembly 660 includes a head assembly 662 integrally attached to an upper surface of the drive unit 640 and a base mount 664 integrally attached to an underside of the base 653 of the transfer system 650. The head assembly 662 is configured to mate with the base mount 664, e.g., by receiving the base mount 664 therein, by insertion into the base mount 664, or in any other manner. The head assembly 662 and/or the base mount 664 are configured to raise or lower the transfer system 650 (e.g., along a vertical axis, or z-axis), to translate the transfer system 650 side-to-side (e.g., along a lateral axis, or y-axis), or to translate the transfer system 650 forward or aft (e.g., along a longitudinal axis, or x-axis). The head assembly 662 and/or the base mount 664 are also configured to align the transfer system 650 at one or more of a roll angle, a pitch angle or a yaw angle, by rotating the transfer system 650 about the longitudinal axis (or x-axis), lateral axis (or y-axis) or vertical axis (or z-axis), respectively.

As is also shown in FIG. 6B, a single representative conveyor 655-i may include an independently addressable motorized actuators 652A-i, 652B-i and a belt 656-i or other carrying medium extending between two or more pulleys or drums. The motorized actuators 652A-i, 652B-i may be configured to rotate one or more of the pulleys or drums, e.g., clockwise or counter-clockwise, at any speed to thereby cause the belt 656-i to translate in one of two directions. The conveyor 655-i may further include any number of motorized components or assemblies for raising or lowering the conveyor 655-i with respect to the base 653, for translating the conveyor 655-i with respect to the base 653, or for varying an angle of the conveyor 655-i with respect to the base 653. In some embodiments, the motors 652-i of the conveyors 655-1 through 655-10 may be configured to operate at the same speed. In some embodiments, each of the motors 652-i of the conveyors 655-1 through 655-10 may be configured to operate at different speeds.

Thus, the mount assembly 660 may allow the robot 630 to reposition the transfer system 650, e.g., by raising or lowering the base 653 with respect to the drive unit 640, by rotating the rotating the base 653 about one or more of the x-axis, they-axis or the z-axis, or by moving the base 653 in any other manner, e.g., in directions of one or more of the x-axis, they-axis or the z-axis. To enable the movement or rotation of the transfer system 650, the mount assembly 660 may include one or more components such as linear or rotating actuators, motors (e.g., electric, pneumatic, hydraulic, etc.), shafts, gears, pulleys, wheels, racks and pinions, or the like. One or more actuators of the mount assembly 660 may include any appropriate components for moving the mount assembly 660, or for otherwise adjusting a position or orientation of the mount assembly 660. In one example, a motorized shaft may be connected to an actuator and configured to attach to a center of the mount assembly 660. The motorized shaft may be operable to raise or lower the mount assembly 660 as appropriate for mating the transfer system 650 to the drive unit 640, and also operable to move the transfer system 650 in direction of one or more axes, or to rotate the transfer system 650 about one or more axes. The mount assembly 660 may also include any appropriate combination of components, such as ribs, spikes, flanges, and/or corrugations, to further facilitate docking or attaching the transfer system 650 to the drive unit 640.

Figure 7A:
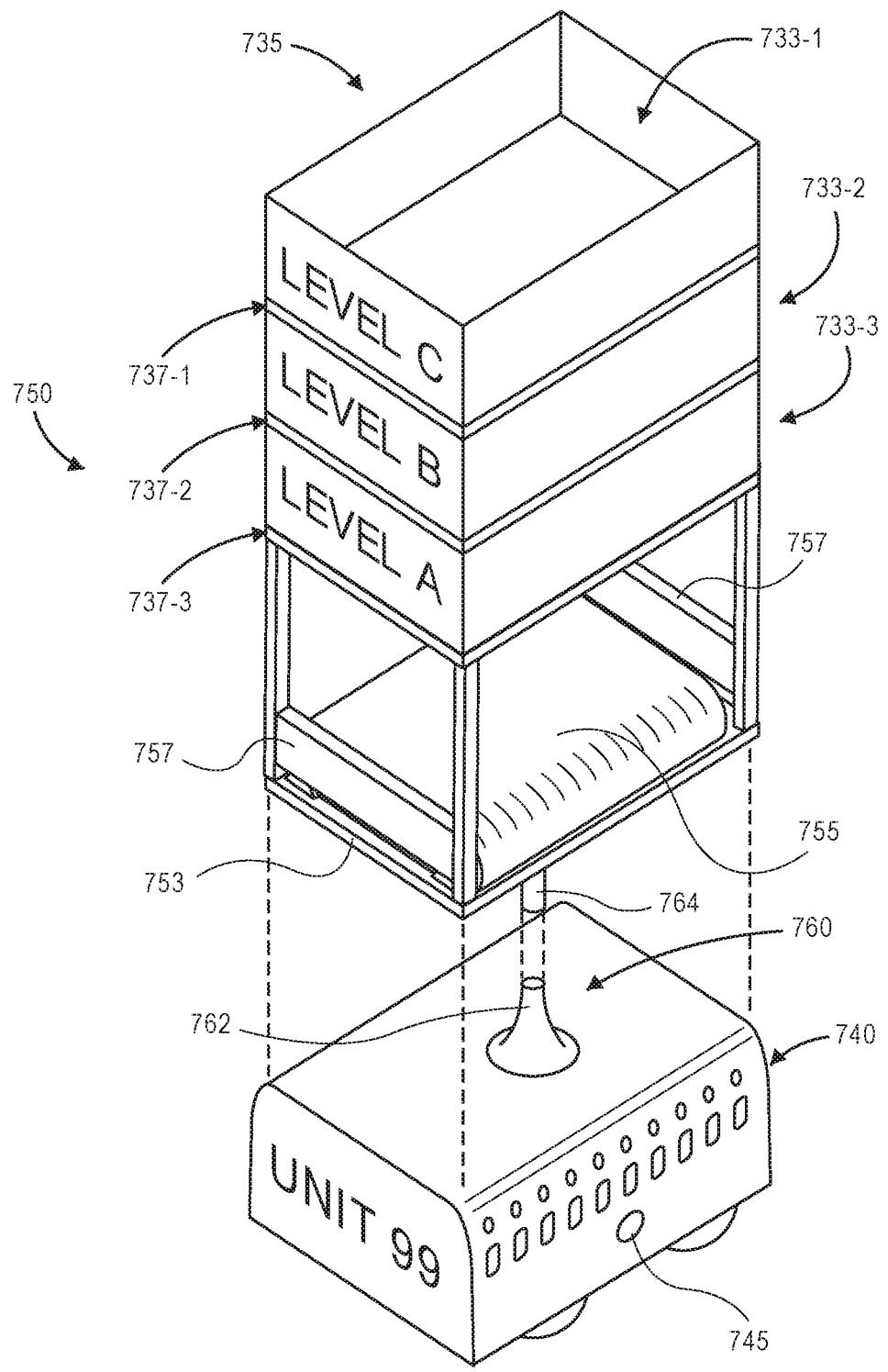
FIGS. 7A and 7B are views of aspects of one system for mobile sortation and delivery of items in accordance with embodiments of the present disclosure.
Figure 7B:
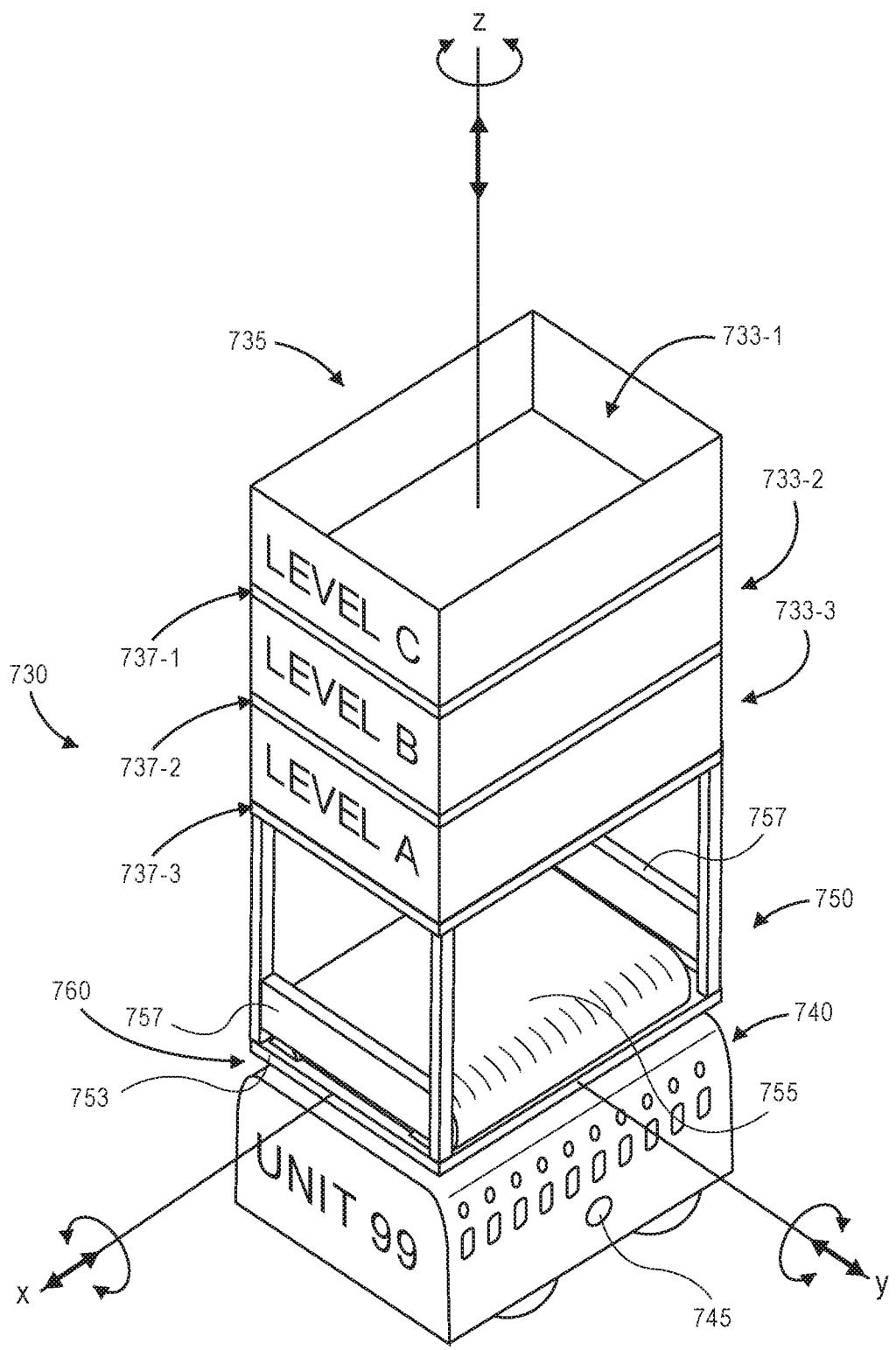

Referring to FIGS. 7A and 7B, views of aspects of one system for mobile sortation and delivery of items in accordance with embodiments of the present disclosure are shown. Except where otherwise noted, reference numerals preceded by the number "7" in FIGS. 7A through 7B refer to elements that are similar to elements having reference numerals preceded by the number "6" in FIGS. 6A and 6B, by the number "5" in FIGS. 5A through 5D, by the number "4" in FIGS. 4A through 4H, by the number "3" in FIGS. 3A through 3F, by the number "2" in FIG. 2 or by the number "1" shown in FIGS. 1A through 1I.

As is shown in FIGS. 7A and 7B, a robot 730 includes a motor unit 740 having a transfer system 750 releasably coupled thereto by way of a mount assembly 760. The transfer system 750 includes a vertical receptacle 735 defining a plurality of chambers, each separated by at least one deployable floor, and a conveyor 755 disposed beneath the receptacle 735. The mount assembly 760 couples the transfer system 750 to a frame of the drive unit 740, and includes a head assembly 762 integrally attached to an upper surface of the drive unit 740 and a base mount 764 integrally attached to an underside of the conveyor 755. The head assembly 762 is configured to mate with the base mount 764, e.g., by receiving the base mount 764 therein, by insertion into the base mount 764, or in any other manner.

The mount assembly 760 is configured to raise or lower the conveyor 755 (e.g., along a vertical axis, or z-axis), to translate the conveyor 755 side-to-side (e.g., along a lateral axis, or y-axis), or to translate the conveyor 755 forward or aft (e.g., along a longitudinal axis, or x-axis. The mount assembly 760 is also configured to align the conveyor 755 at one or more of a roll angle, a pitch angle or a yaw angle, by rotating the conveyor 755 about the longitudinal axis (or x-axis), lateral axis (or y-axis) or vertical axis (or z-axis), respectively. Thus, the mount assembly 760 may allow the robot 730 to reposition the conveyor 755, e.g., by rotating the conveyor 755 about one or more of the x-axis, the y-axis or the z-axis, or by moving the conveyor 755 in any other manner, e.g., in directions of one or more of the x-axis, they-axis or the z-axis.

Figure 8A:
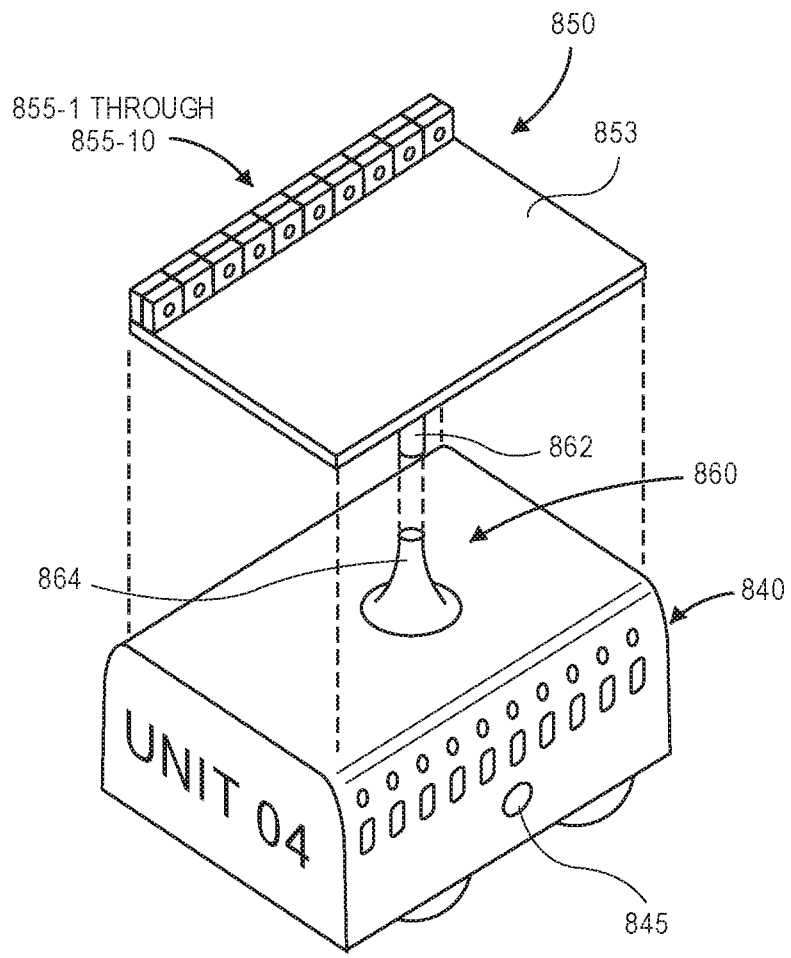
FIGS. 8A and 8B are views of aspects of one system for mobile sortation and delivery of items in accordance with embodiments of the present disclosure.
Figure 8B:
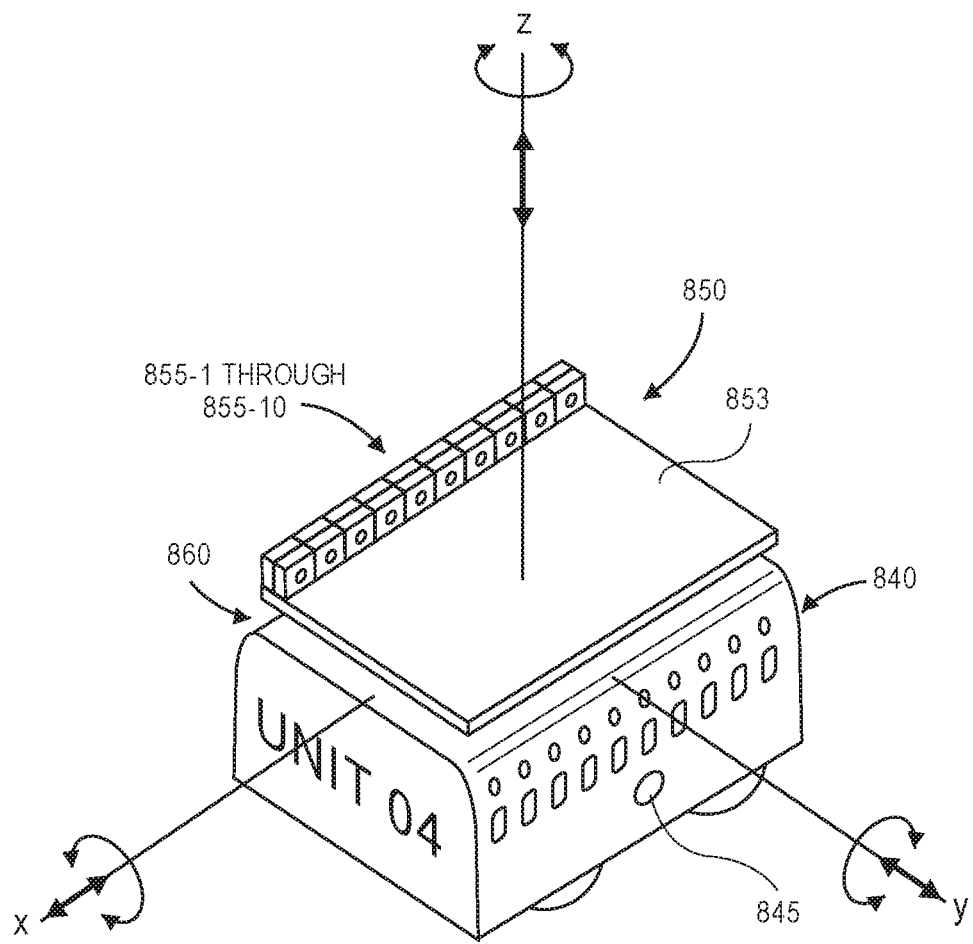

Referring to FIGS. 8A and 8B, views of aspects of one system for mobile sortation and delivery of items in accordance with embodiments of the present disclosure are shown. Except where otherwise noted, reference numerals preceded by the number "8" in FIGS. 8A and 8B refer to elements that are similar to elements having reference numerals preceded by the number "7" in FIGS. 7A and 7B, by the number "6" in FIGS. 6A and 6B, by the number "5" in FIGS. 5A through 5D, by the number "4" in FIGS. 4A through 4H, by the number "3" in FIGS. 3A through 3F, by the number "2" in FIG. 2 or by the number "1" shown in FIGS. 1A through 1I.

As is shown in FIGS. 8A and 8B, a robot 830 includes a motor unit 840 and a transfer system 850 releasably coupled thereto by way of a mount assembly 860. The motor unit 840 includes a sensor 845, which may be configured to detect the presence of one or more objects, to calculate ranges to such objects, or to identify such objects. The motor unit 840 may further include a frame or any other structural components, as well as a propulsion system, any number of lights, transceivers, sensors, power modules, motors, item engagement systems or other components.

The transfer system 850 includes a plurality of individually addressable diverters that are mounted to a base 853, which is configured for releasable coupling to a drive unit 840 by the mount assembly 860, which includes a head assembly 862 integrally attached to an upper surface of the drive unit 840 and a base mount 864 integrally attached to an underside of the base 853 of the transfer system 850. The mount assembly 860 is configured to raise or lower the transfer system 850 (e.g., along a vertical axis, or z-axis), to translate the transfer system 850 side-to-side (e.g., along a lateral axis, or y-axis), or to translate the transfer system 850 forward or aft (e.g., along a longitudinal axis, or x-axis. The mount assembly 860 is also configured to align the transfer system 850 at one or more of a roll angle, a pitch angle or a yaw angle, by rotating the transfer system 850 about the longitudinal axis (or x-axis), lateral axis (or y-axis) or vertical axis (or z-axis), respectively. Thus, the mount assembly 860 may allow the robot 830 to reposition the transfer system 850, e.g., by rotating the transfer system 850 about one or more of the x-axis, the y-axis or the z-axis, or by moving the transfer system 850 in any other manner, e.g., in directions of one or more of the x-axis, the y-axis or the z-axis.

Referring to FIGS. 9A through 9E, views of aspects of one system for mobile sortation and delivery of items in accordance with embodiments of the present disclosure are shown. Except where otherwise noted, reference numerals preceded by the number "9" in FIGS. 9A through 9E refer to elements that are similar to elements having reference numerals preceded by the number "8" in FIGS. 8A through 8B, by the number "7" in FIGS. 7A and 7B, by the number "6" in FIGS. 6A and 6B, by the number "5" in FIGS. 5A through 5D, by the number "4" in FIGS. 4A through 4H, by the number "3" in FIGS. 3A through 3F, by the number "2" in FIG. 2 or by the number "1" shown in FIGS. 1A through 1I.

Figure 9A:
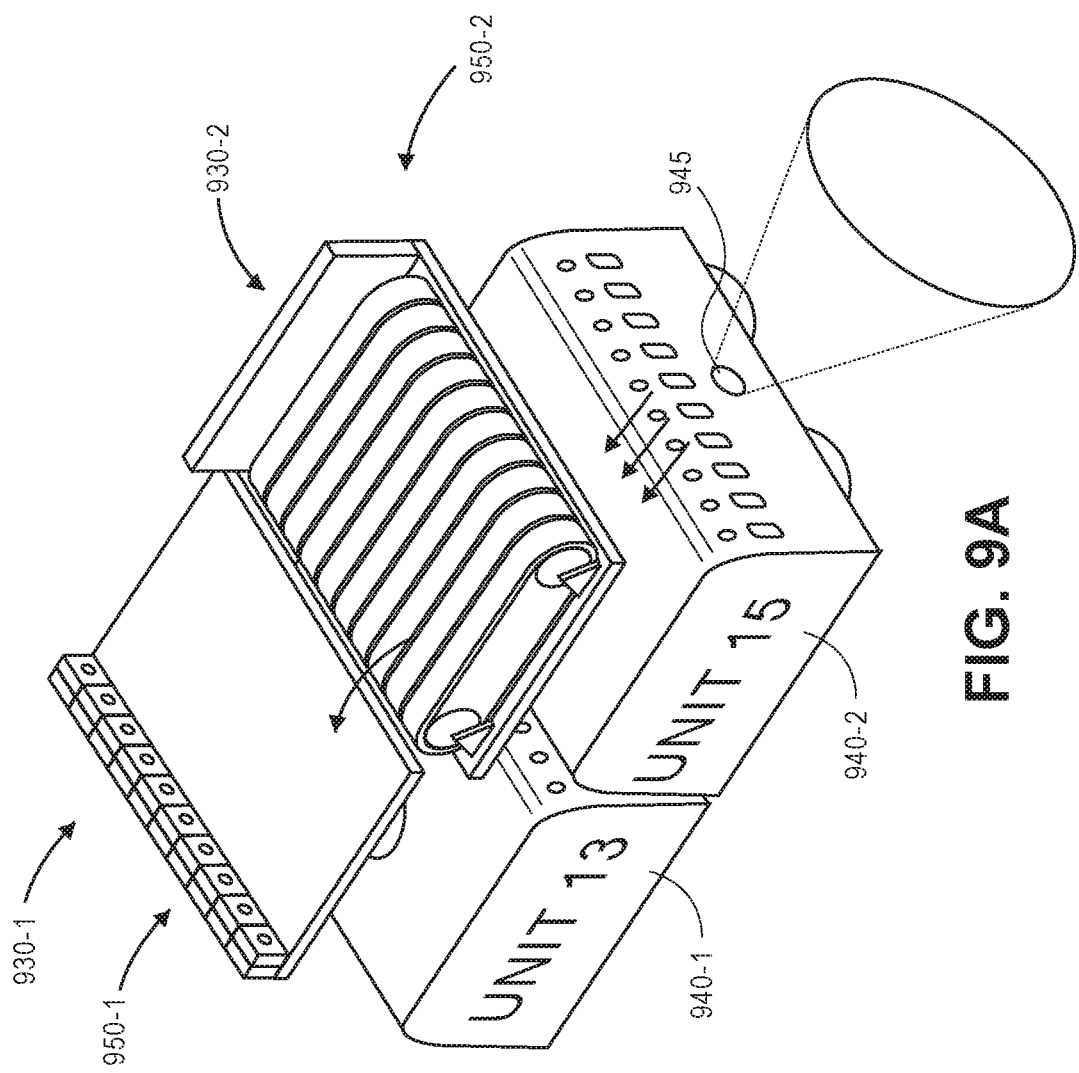
FIGS. 9A through 9E are views of aspects of one system for mobile sortation and delivery of items in accordance with embodiments of the present disclosure.

As is shown in FIG. 9A, a pair of robots 930-1, 930-2 are aligned adjacent to one another, e.g., at a rendezvous point. Each of the robots 930-1, 930-2 includes a drive unit 940-1, 940-2 having a transfer system 950-1, 950-2 releasably coupled thereto, e.g., in a modular fashion, by a mount assembly or in any other manner. In some embodiments, the robots 93-1, 930-2 may include any or all of the components described above with regard to the robots 130-1, 130-2, the robots 230-1, 230-2, the robots 330-1, 330-2, the robot 430, the robot 530, the robot 630, the robot 730 or the robot 830, or any of the other robots disclosed or referenced herein.

Figure 9B:
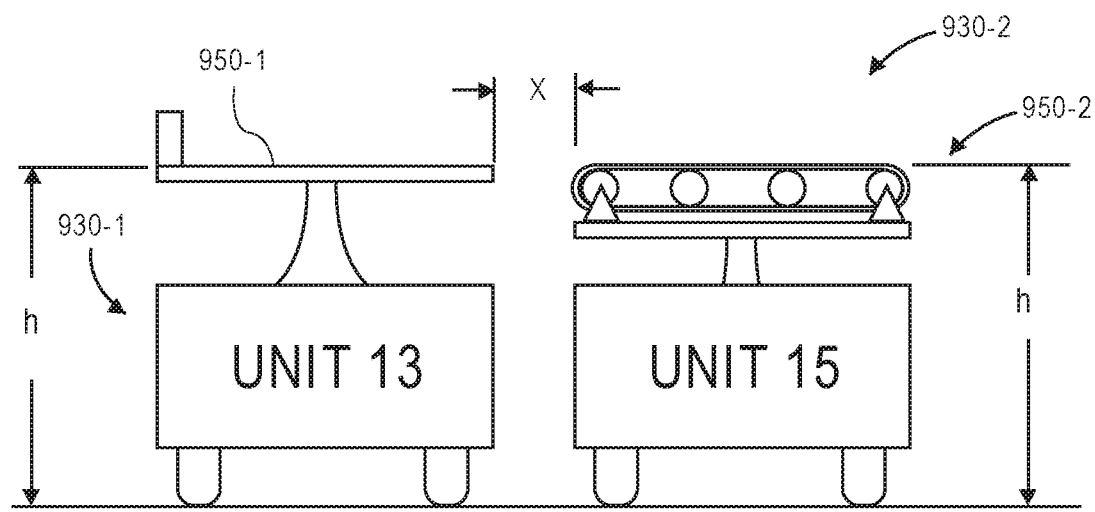
Figure 9C:
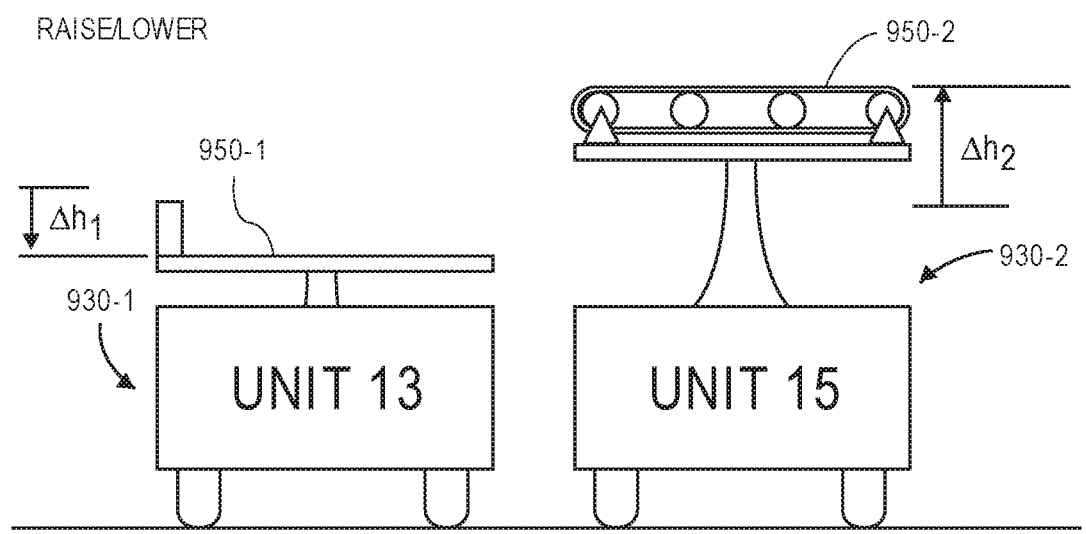

In accordance with some embodiments of the present disclosure, one or more of the transfer systems (or components thereof) disclosed herein may be specifically repositioned or rotated in order to facilitate the receipt or discharge of one or more items therefrom. As is shown in FIG. 9B, each of the robots 930-1, 930-2 may be aligned with loading surfaces or storage surface of their transfer systems 950-1, 950-2 at a common height h, and with edges of the loading surfaces or storage surfaces separated by a distance x.

Where necessary or desired to aid in the transfer of an item from one robot to another, or from a robot to a conveyor, a chute or another system, however, a loading surface or storage surface of a transfer system may be raised, lowered or translated with respect to a drive unit, or oriented at any selected angles. As is shown in FIG. 9C, vertical separation may be established between the transfer systems 950-1, 950-2 of the robots by lowering a height of the transfer system 950-1 by a selected amount $\Delta h_1$ and/or raising a height of the transfer system 950-2 by a selected amount $\Delta h_2$, or vice versa. Therefore, an item on the loading surface or storage surface of the transfer system 950-2 may be more readily transferred to the loading surface or storage surface of the transfer system 950-1, e.g., by tumbling or otherwise falling due to gravity. The amount $\Delta h_1$, $\Delta h_2$ of the changes in heights of one or both of the transfer systems 950-1, 950-2 may be selected on any basis, including one or more attributes or properties of one or more items that are to be transferred therebetween (e.g., sizes, shapes, masses, friction properties of outer surfaces), operating conditions (e.g., courses, speeds, orientations or the like) of either or both of the robots 930-1, 930-2, or any other factor.

Figure 9D:
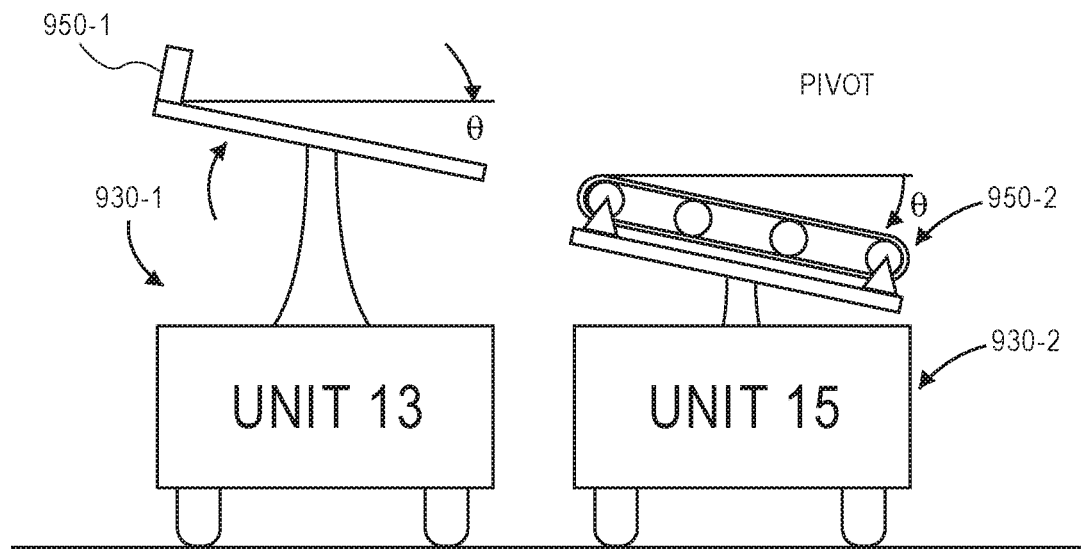

As is shown in FIG. 9D, the loading surfaces or storage surfaces of one or both of the transfer systems 950-1, 950-2 may be rotated to selected angles θ with respect to horizontal or, alternatively, vertical or any other axis or standard. Therefore, with the transfer systems 950-1, 950-2 aligned at the selected angles θ, an item disposed on the loading surface of the transfer system 950-1 may be more readily transferred to the loading surface or storage surface of the transfer system 950-2, e.g., with the assistance of gravity. In some embodiments, the heights of the transfer systems 950-1, 950-2 may be concurrently or independently varied as the transfer systems 950-1, 950-2 are aligned at the selected angles θ. The angles θ of one or both of the transfer systems 950-1, 950-2 may be selected on any basis, including one or more attributes or properties of one or more items that are to be transferred therebetween (e.g., sizes, shapes, masses, friction properties of outer surfaces), operating conditions (e.g., courses, speeds, orientations or the like) of either or both of the robots 930-1, 930-2, or any other factor. Additionally, although the transfer systems 950-1, 950-2 are shown as each being aligned at the common selected angles θ, those of ordinary skill in the pertinent arts will recognize that either or both of the transfer systems 950-1, 950-2 may be aligned at a selected angle, and the transfer systems 950-1, 950-2 may be aligned at the same angle, or different angles, in accordance with embodiments the present disclosure.

Figure 9E:
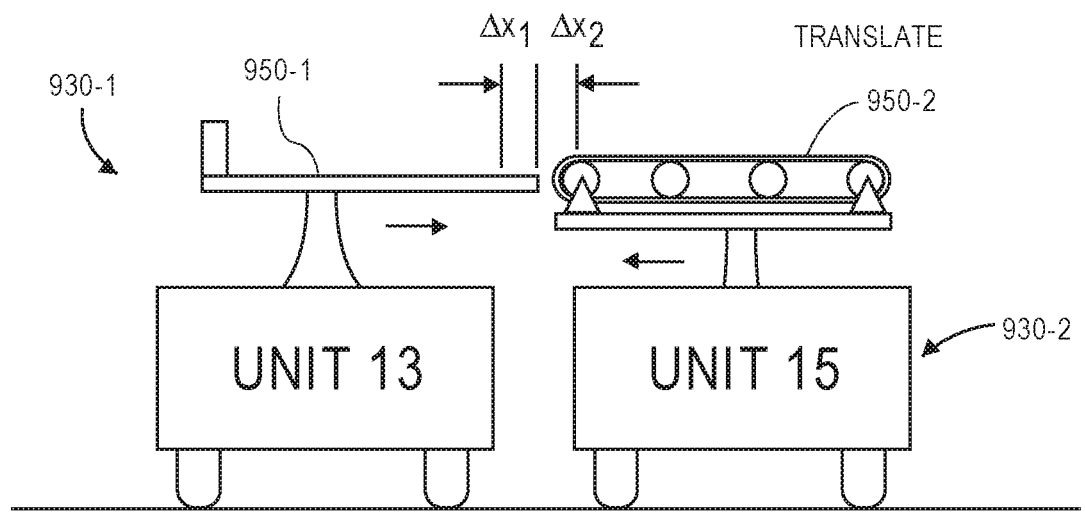

As is shown in FIG. 9E, the transfer systems 950-1, 950-2 may be laterally translated toward one another by respective distances $\Delta x_1$, $\Delta x_2$. For example, in some embodiments, where an item to be transferred from one of the robots 930-1, 930-2 to another of the robots 930-1, 930-2 is substantially small, or where the robots 930-1, 930-2 are operating at elevated speeds when the item is to be transferred therebetween, the transfer systems 950-1, 950-2 may be laterally translated toward one another in order to reduce a distance that the item must travel while being transferred between the transfer systems 950-1, 950-2, or to shorten a time that may be required in order to transfer the item. The distances $\Delta x_1$, $\Delta x_2$ may be selected on any basis, including one or more attributes or properties of one or more items that are to be transferred therebetween (e.g., sizes, shapes, masses, friction properties of outer surfaces), operating conditions (e.g., courses, speeds, orientations or the like) of either or both of the robots 930-1, 930-2, or any other factor.

The ways in which a transfer system or components thereof may be raised, lowered or translated with respect to a drive unit, or oriented at any selected angles with respect to the drive unit, are not limited to those shown in FIGS. 9C through 9E. For example, a transfer system may be rotated to a selected pitch angle about a lateral axis or to a selected yaw angle about a vertical axis, or be lowered or translated in any direction with respect to a drive unit. Furthermore, the transfer system or components thereof may concurrently be manipulated in two or more ways, and by any desired amounts or extents.

Figure 10A:
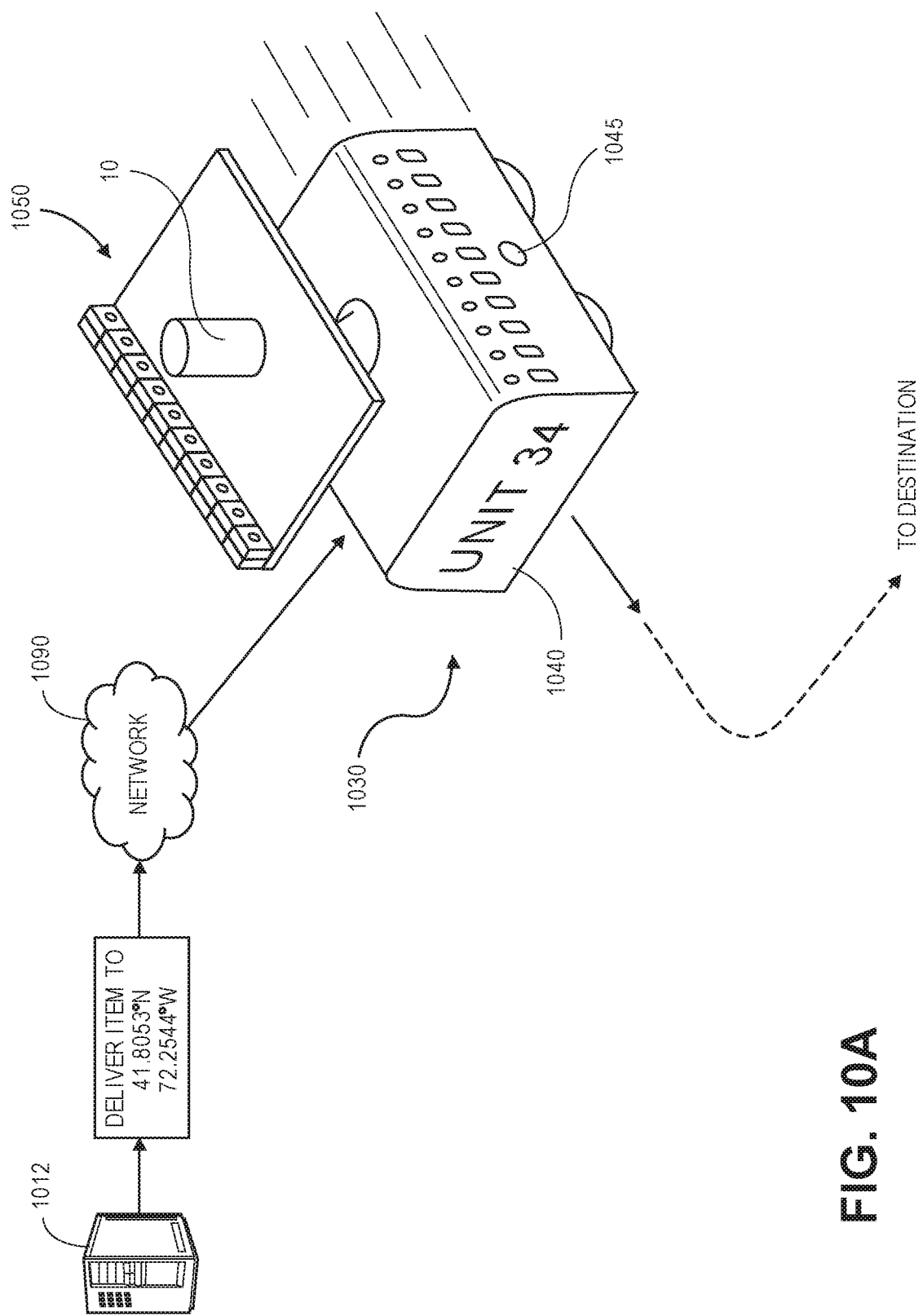
FIGS. 10A through 10C are views of aspects of one system for mobile sortation and delivery of items in accordance with embodiments of the present disclosure.
Figure 10B:
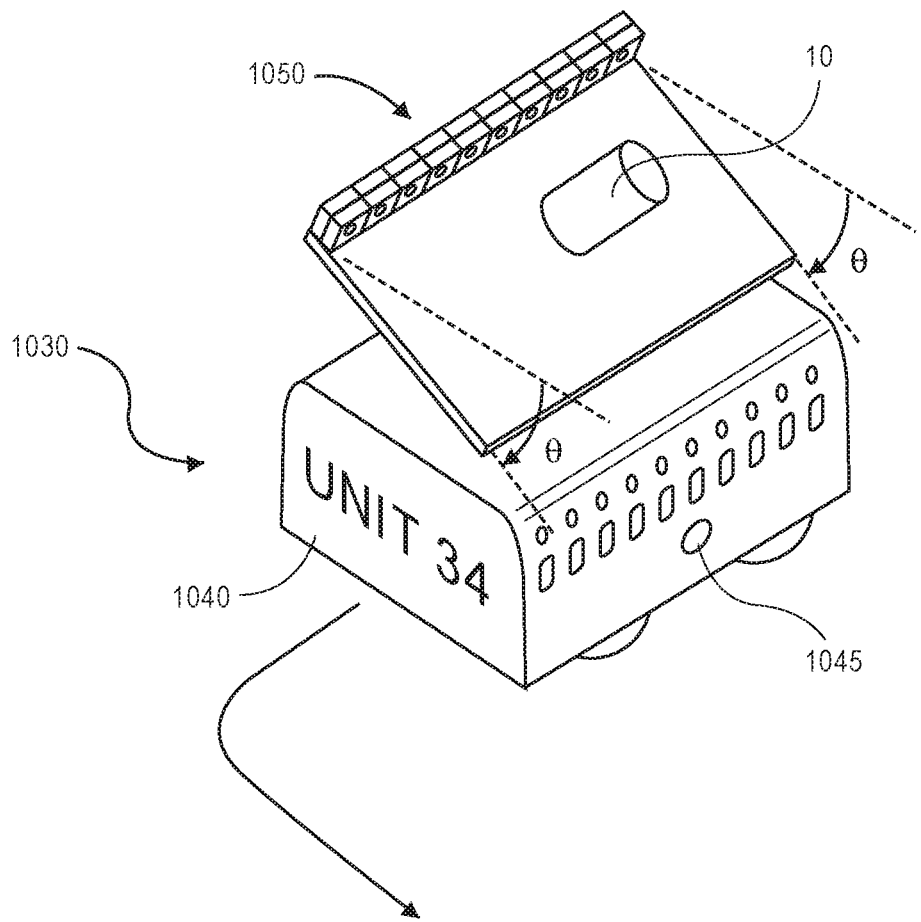
Figure 10C:
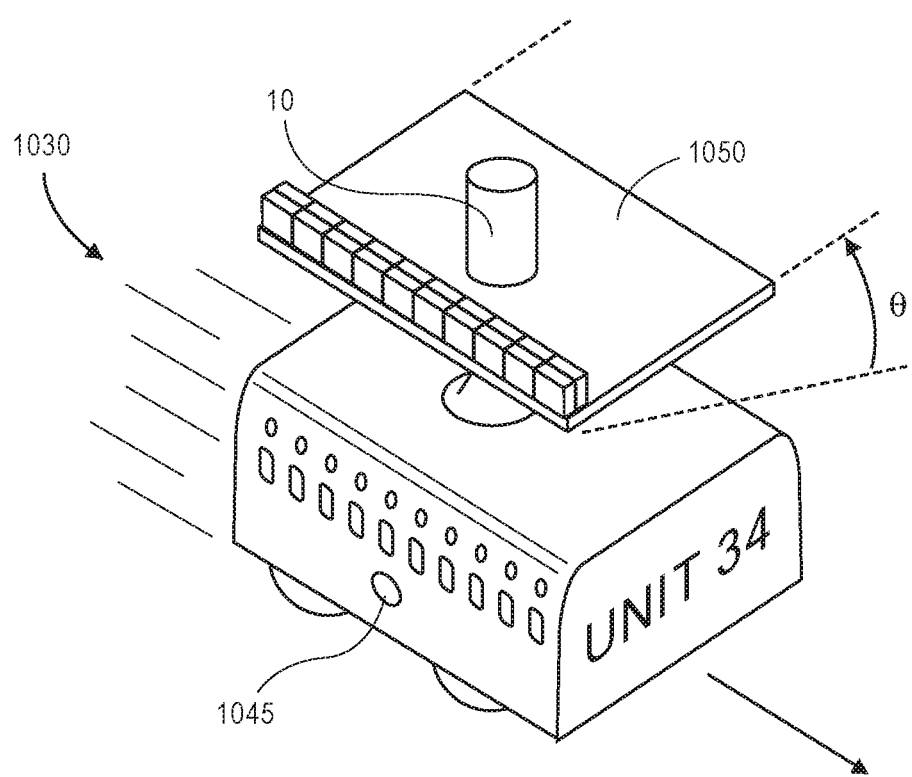

The transfer systems or components thereof may be raised, lowered or translated with respect to a drive unit, or oriented at any selected angles, for any reason and on any basis in order to enhance the receipt, transportation or discharge of items thereby. Referring to FIGS. 10A through 10C, views of aspects of one system for mobile sortation and delivery of items in accordance with embodiments of the present disclosure. Except where otherwise noted, reference numerals preceded by the number "10" in FIGS. 10A through 10C refer to elements that are similar to elements having reference numerals preceded by the number "9" in FIGS. 9A through 9E, by the number "8" in FIGS. 8A and 8B, by the number "7" in FIGS. 7A and 7B, by the number "6" in FIGS. 6A and 6B, by the number "5" in FIGS. 5A through 5D, by the number "4" in FIGS. 4A through 4H, by the number "3" in FIGS. 3A through 3F, by the number "2" in FIG. 2 or by the number "1" shown in FIGS. 1A through 1I.

As is shown in FIG. 10A, an autonomous mobile robot 1030 having a drive unit 1040 and a transfer system 1050 coupled thereto is carrying an item 10. The robot 1030 receives an instruction from a server 1012 over a network 1090 to deliver the item 10 to a selected location.

Upon receiving the instruction, one or more processors or processor units aboard the robot 1030 may calculate a course and a speed to the destination specified in the instruction. As is shown in FIG. 10B, when the robot 1030 is required to execute one or more turns or other angular variations or course changes, the processors or processor units aboard the robot 1030 may also calculate an angle $\theta$ at which the transfer system 1050 is to be oriented in order to ensure that the item 10 remains thereon despite the presence of centripetal forces or any other factors. The angle $\theta$ may be selected with respect to horizontal, vertical or any other standard and on any basis, including but not limited to a speed of the robot 1030, an extent of a turn that may be required in order to reach the destination, a duration of the turn, a radius of the turn, friction between the item 10 and the transfer system 1050, or any other factor.

As is shown in FIG. 10C, when the robot 1030 has completed a turn, and reached its desired course, the one or more processors or processor units aboard the robot 1030 may cause the transfer system 1050 to return to a horizontal angle, or calculate a new angle at which the transfer system 1050 is to be aligned. Where the robot 1030 is to execute other turns or other angular variations in course, however, the one or more processors or processor units aboard the robot 1030 may calculate another course and speed for the robot 1030 and, alternatively or additionally, any angles at which the transfer system 1050 is to be preferably aligned on any basis.

Figure 11:
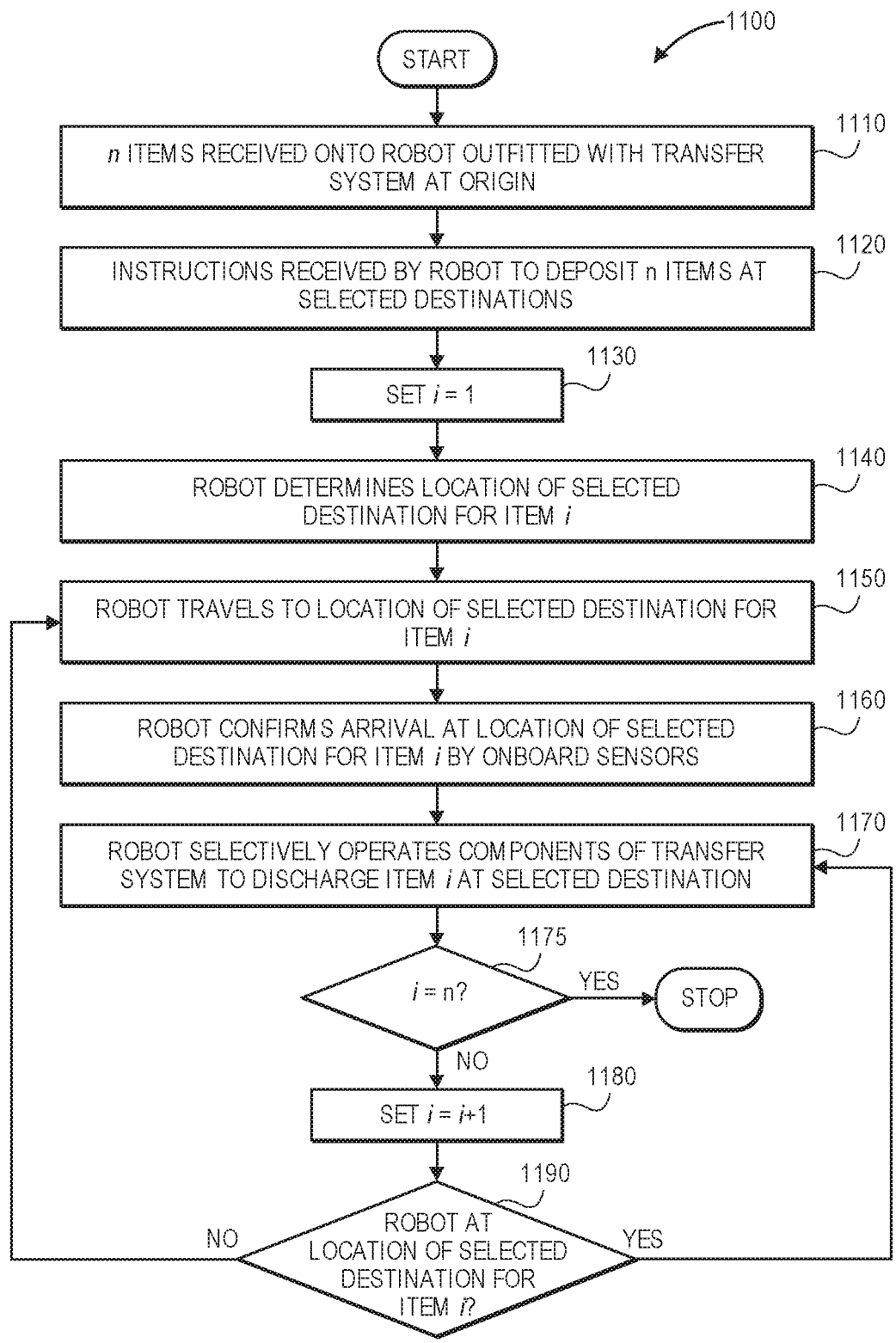
FIG. 11 is a flow chart of one process for mobile sortation and delivery of items in accordance with embodiments of the present disclosure.

As is discussed above, autonomous mobile robots that are outfitted with one or more transfer systems of the present disclosure may be used to selectively deliver multiple items to multiple destinations without further involvement or interaction by one or more humans. Referring to FIG. 11, a flow chart 1100 of one process for mobile sortation and delivery of items in accordance with embodiments of the present disclosure is shown.

At box 1110, n items are received onto a robot outfitted with a transfer system of the present disclosure at an origin. For example, the items may be received from a human, such as is shown in FIG. 1A or 1B, or from another robot, such as is shown in FIG. 1D or 1E, or from any other machine or system, e.g., a conveyor, a chute, or any other system. At box 1120, the robot receives instructions to deposit the n items at selected destinations. Each of the destinations may be located within a fulfillment center or a like facility, or in any other indoor or outdoor environment, and may be stationary (e.g., a workstation having a conveyor, a chute or another fixed system) or mobile (e.g., a mobile human or robot). The instructions may identify the respective destinations by static coordinates, e.g., latitudes and longitudes, and optionally altitudes, or any other physical or logical identifiers of such destinations, or as functions of time, such as by vectors corresponding to velocities and/or accelerations of the destinations.

At box 1130, a value of a step variable i is set to equal one, or i=1. At box 1140, the robot determines a location of the destination for item i, e.g., by resort to a look-up table or other record. Alternatively, the robot may receive one or more sets of coordinates or other physical or logical identifiers of the location, e.g., from an external computer system or device aboard another robot, or provided in one or more alternate or virtual locations, e.g., in a "cloud"-based environment.

At box 1150, the robot travels to the location of the selected destination for item i, e.g., directly, or according to an optimal path or route. For example, upon receiving the instructions to deposit the n items at their selected destinations at box 1120, one or more processors aboard the robot may determine an optimal path or route for delivering the n items to their selected destinations that takes into account locations of the selected destinations, any attributes of the items (e.g., special handling restrictions or conditions such as size, weight, fragility or temperatures), or any other factor. Alternatively, the instruction received at box 1120, e.g., from an external server, may be accompanied by an optimal path or route.

At box 1160, the robot confirms that it has arrived at the location of the selected destination for the item i by one or more onboard sensors. For example, the robot may be outfitted with a position sensor, e.g., a GPS receiver, and may determine that it has arrived at the selected destination based on one or more position signals. Alternatively, the onboard sensors may determine that it has arrived at the location based on imaging data (e.g., visual images and/or depth images), LIDAR signals and/or RFID signals captured by such sensors.

At box 1170, the robot selectively operates one or more components of the transfer system to discharge item i at the selected destination. For example, where the transfer system comprises a plurality of conveyor belts aligned in series, and a storage surface defined by upper surfaces of the conveyor belts, the transfer system may identify the specific conveyor belts upon which item i rests, e.g., using tension sensors provided within such belts, optical sensors including such belts within their respective fields of view, or any other sensors. Upon identifying the specific conveyor belts upon which item i rests, the transfer system may cause the specific conveyor belts to translate in a direction toward the selected destination.

Where the transfer system comprises a receptacle or another vertically aligned storage unit having one or more deployable floors defining one or more chambers within the receptacle, and item i is disposed within one of the chambers, the deployable floors may be selectively operated to cause item i to descend onto a conveyor belt, which may be translated in a direction toward the selected destination. Where the transfer system comprises a plurality of diverters aligned in series along one side of a storage surface, and each is configured to be independently extended in specific paths across the storage surface toward another side, the diverters that are determined to have item i within their respective paths, e.g., using optical sensors within contact surfaces of the diverters, may be extended by sufficient distances to cause item i to be discharged from the storage surface.

Alternatively, the transfer system may be configured to discharge item i from the storage surface in any other manner. Furthermore, in some embodiments, the transfer system may be raised, lowered or translated with respect to a drive unit, or oriented at any selected angles, as desired, in preparing to discharge item i.

At box 1175, whether the value of the step variable i is equal to the number of items n received onto the robot at box 1110 is determined. If the value of the step variable i is equal to the number n, then each of then items received onto the robot at box 1110 has been discharged at a selected destination at box 1170, and the process ends.

If the value of the value of the step variable i is not equal to n, however, then one or more of the n items received onto the robot at box 1110 remains. The process then advances to box 1180, where the value of the step variable i is incremented by one, or where i is set to equal i+1. At box 1190, whether the robot is at the location of the selected destination for the item i is determined. If the robot is at the location of the selected destination for the item i, then the process returns to box 1170, where the robot selectively operates components of the transfer system to discharge the item i at the selected destination. For example, where two or more of the n items received onto the robot at box 1110 are intended for delivery to a common destination, the robot may remain at the common destination and selectively discharge each of the items there without having to relocate to another destination. If the robot is not at the selected destination for item i, however, then the process returns to box 1150, where the robot travels to the location of the selected destination for item i.

The autonomous mobile robots of the present disclosure may also be assigned or programmed to operate within specific zones (e.g., two-dimensional areas or environments), or restricted from operating in specific zones. Where an item is to be delivered from an origin to a destination, and the destination or one or more segments or waypoints of a path or route from the origin to the destination lie within a zone that is restricted to one or more robots, a plurality of robots may transfer the item between one another at boundaries of such zones using one or more of the transfer systems of the present disclosure.

Figure 12:
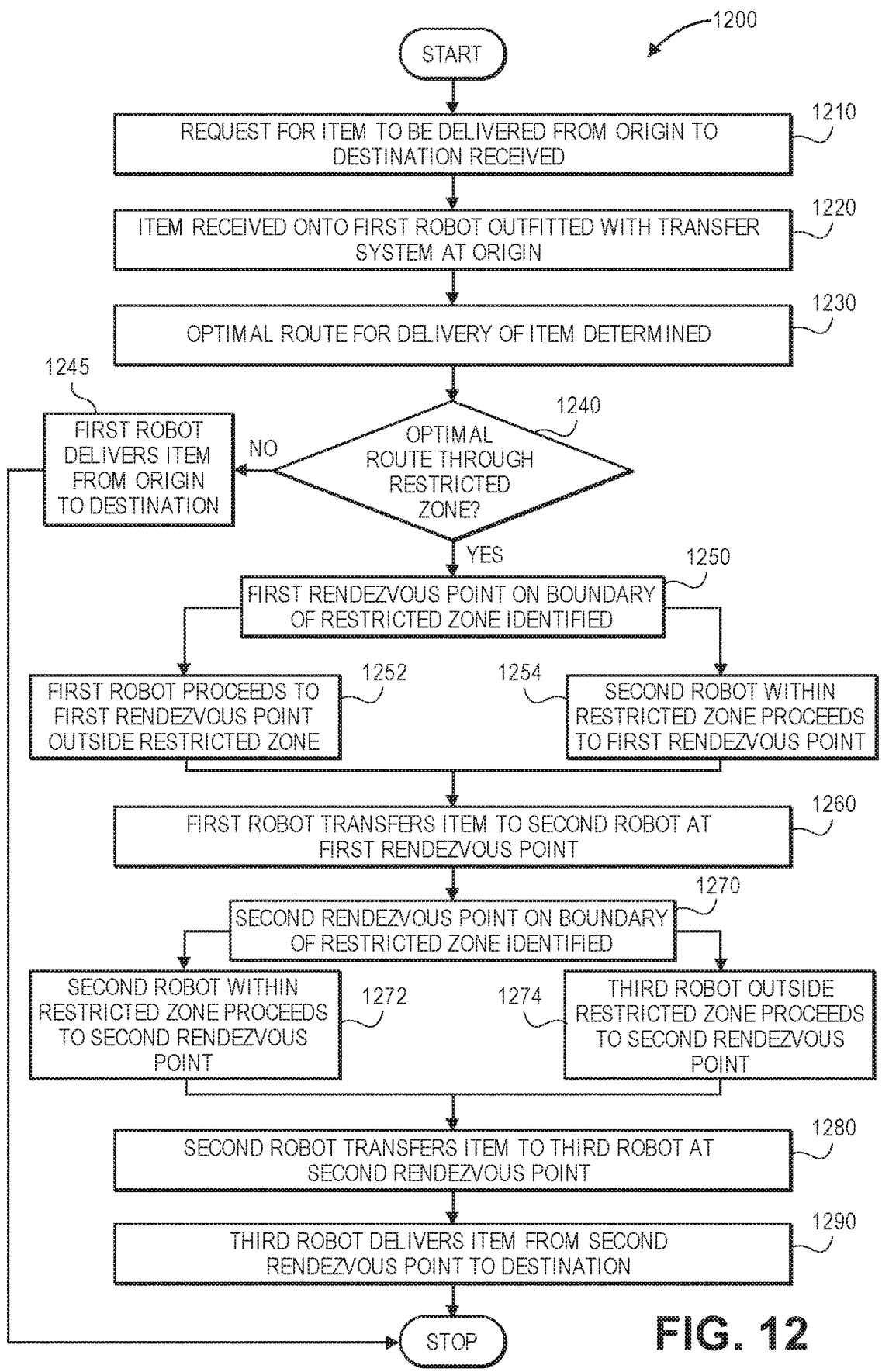
FIG. 12 is a flow chart of one process for mobile sortation and delivery of items in accordance with embodiments of the present disclosure.

Referring to FIG. 12, a flow chart of one process for mobile sortation and delivery of items in accordance with embodiments of the present disclosure is shown. At box 1210, a request for a delivery of one or more items from an origin to a destination is received. For example, where the origin and the destination are both within a fulfillment center, the request may be associated with an order for one or more items received from a customer. Alternatively, the delivery of the one or more items may be requested for any other reason or purpose.

At box 1220, the item is received onto a first robot at the origin. For example, the first robot may be outfitted with a transfer system in accordance with the present disclosure, and the item may be received from a human, from another robot, or from any other machine or system, e.g., a conveyor, a chute, or any other system. In some embodiments, the transfer system may be raised, lowered or translated with respect to a drive unit, or oriented at any selected angles, as desired, in receiving the item.

At box 1230, an optimal route for the delivery of the item from the origin to the destination is determined. For example, upon receiving the request to deliver the item at box 1210, one or more processors aboard the robot may determine an optimal route for delivering the item to the destination that takes into the location of the selected destination, any attributes of the item, or any other factor. Alternatively, in some embodiments, the request may be accompanied by an optimal path or route for the delivery of the item.

At box 1240, whether the optimal zone passes through a restricted zone, e.g., an area of a fulfillment center or other environment where a number of robots and/or humans that are authorized to travel and/or operate is limited, and does not include the first robot, is determined. If the optimal route does not pass through a restricted zone, then the process advances to box 1245, where the first robot delivers the item from the origin to the destination, and the process ends.

If the optimal route passes through a restricted zone, however, then the process advances to box 1250, where a first rendezvous point on a boundary of the restricted zone is identified. The first rendezvous point may be identified by one or more sets of coordinates or other physical or logical identifiers, or in any other manner. The restricted zone may have any shape or size, and may have any number of straight or curvilinear boundaries. At box 1252, the first robot proceeds to the first rendezvous point, e.g., by a shortest or optimal path or route, or by any other path or route. In parallel, at box 1254, a second robot within the restricted zone also proceeds to the first rendezvous point, e.g., by a shortest or optimal path or route, or by any other path or route. For example, the second robot may also be outfitted with a transfer system in accordance with the present disclosure, and either or both of the first robot or the second robot may proceed to the first rendezvous point prior to, concurrent with or following the performance of one or more other tasks.

At box 1260, the first robot transfers the item to the second robot at the first rendezvous point. For example, in some embodiments, the first robot may operate one or more deployable floors to cause the item to descend through a vertical receptacle or another like storage system onto a conveyor, and the conveyor may be operated to transfer the item in a direction of the second robot. Alternatively, in some embodiments, the first robot may include a plurality of individually controllable conveyors. The first robot may determine which of the conveyors includes the item thereon, and may selectively operate such conveyors to transfer the item in a direction of the second robot. Alternatively, in some embodiments, the first robot may include a plurality of individually controllable diverters that are configured to travel over a storage surface. The first robot may determine which of the diverters is aligned with an item on the storage surface, and may selectively operate such diverters to transfer the item in a direction of the second robot. In some embodiments, the second robot may be outfitted with a transfer system having one or more of the same characteristics as a transfer system of the first robot, or one or more different characteristics, and may operate concurrently with a transfer system of the first robot to receive the item therefrom. Furthermore, in some embodiments, the transfer systems of either the first robot or the second robot, or both the first robot and the second robot, may be raised, lowered or translated with respect to a drive unit, or oriented at any selected angles, as desired, in preparing to transfer the item therebetween.

At box 1270, a second rendezvous point on a boundary of the restricted zone is identified. Like the first rendezvous point, the second rendezvous point may be identified by one or more sets of coordinates or other physical or logical identifiers, or in any other manner. At box 1272, the second robot proceeds to the second rendezvous point, e.g., by a shortest or optimal path or route, or by any other path or route. In parallel, at box 1274, a third robot within the restricted zone also proceeds to the second rendezvous point, e.g., by a shortest or optimal path or route, or by any other path or route. For example, the third robot may also be outfitted with a transfer system in accordance with the present disclosure, and either or both of the second robot or the third robot may proceed to the second rendezvous point prior to, concurrent with or following the performance of one or more other tasks.

At box 1280, the second robot transfers the item to the third robot at the second rendezvous point. For example, in some embodiments, the second robot may operate one or more deployable floors to cause the item to descend through a vertical receptacle or another like storage system onto a conveyor, and the conveyor may be operated to transfer the item in a direction of the third robot. Alternatively, in some embodiments, the second robot may include a plurality of individually controllable conveyors. The second robot may determine which of the conveyors includes the item thereon, and may selectively operate such conveyors to transfer the item in a direction of the third robot. Alternatively, in some embodiments, the second robot may include a plurality of individually controllable diverters that are configured to travel over a storage surface. The second robot may determine which of the diverters is aligned with an item on the storage surface, and may selectively operate such diverters to transfer the item in a direction of the third robot. In some embodiments, the third robot may be outfitted with a transfer system having one or more of the same characteristics as a transfer system of the second robot, or one or more different characteristics, and may operate concurrently with a transfer system of the second robot to receive the item therefrom. In some embodiments, the transfer systems of either the second robot or the third robot, or both the second robot and the third robot, may be raised, lowered or translated with respect to a drive unit, or oriented at any selected angles, as desired, in preparing to transfer the item therebetween.

At box 1290, the third robot delivers the item from the second rendezvous point to the destination, e.g., by a shortest or optimal path or route, or by any other path or route, and the process ends.

Referring to FIGS. 13A through 13H, views of aspects of one system for mobile sortation and delivery of items in accordance with embodiments of the present disclosure are shown. Except where otherwise noted, reference numerals preceded by the number "13" in FIGS. 13A through 13H refer to elements that are similar to elements having reference numerals preceded by the number "10" in FIGS. 10A through 10C, by the number "9" in FIGS. 9A through 9E, by the number "8" in FIGS. 8A and 8B, by the number "7" in FIGS. 7A and 7B, by the number "6" in FIGS. 6A and 6B, by the number "5" in FIGS. 5A through 5D, by the number "4" in FIGS. 4A through 4H, by the number "3" in FIGS. 3A through 3F, by the number "2" in FIG. 2 or by the number "1" shown in FIGS. 1A through 1I.

Figure 13A:
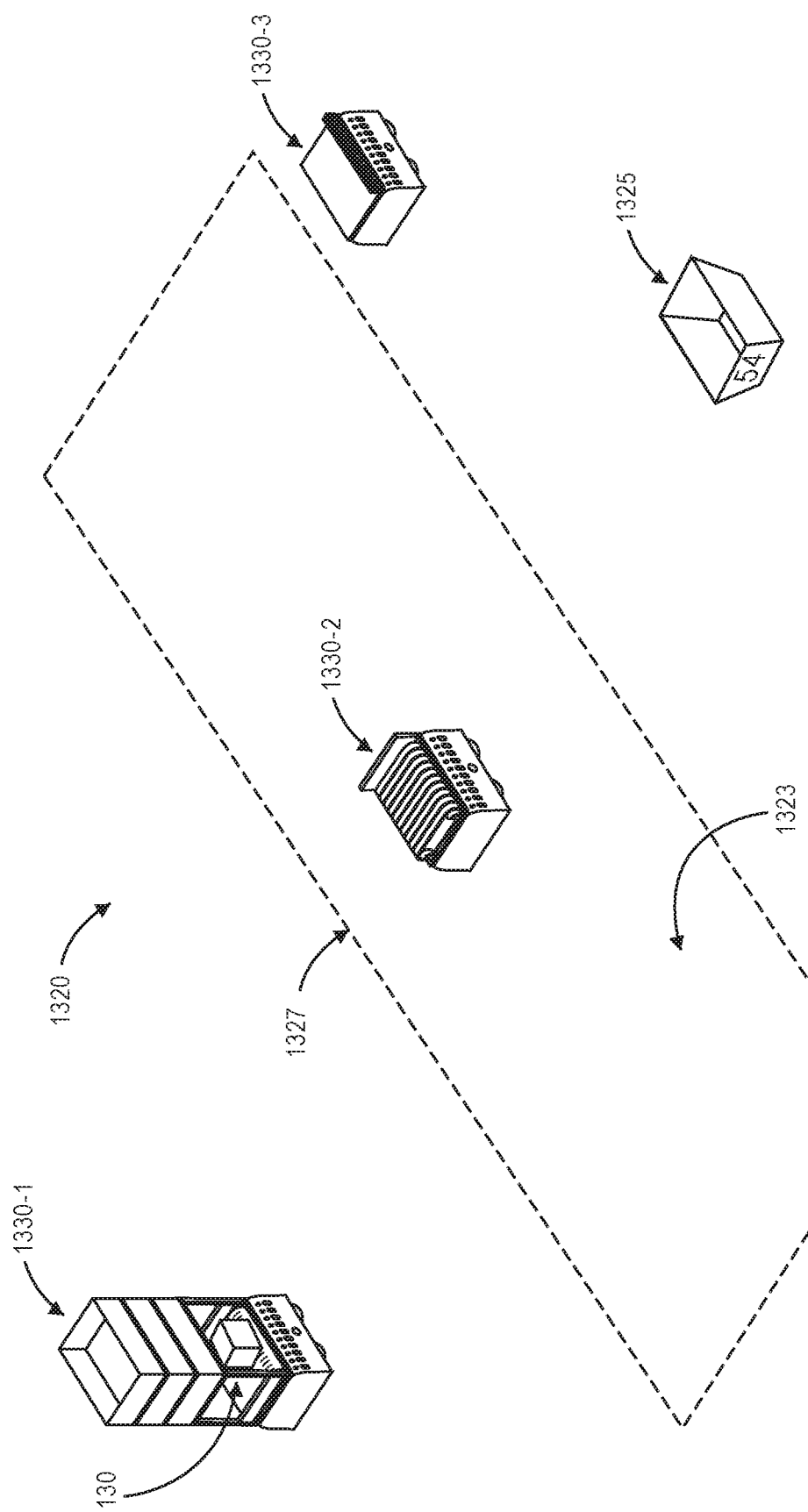

As is shown in FIG. 13A, the system includes a robot 1330-1, a robot 1330-2, a robot 1330-3 and a bin 1325 (or other receptacle or destination) within a fulfillment center 1320 or other facility. The robot 1330-1 is carrying an item 130. The robot 1330-2 is authorized to operate within a restricted zone 1323 defined by a boundary 1327, while the robots 1330-1, 1330-3 are barred from operating within the restricted zone 1323. The bin 1325 lies outside of the restricted zone 1323.

As is shown in FIG. 13A, the robot 1330-1 may include one or more of the attributes, characteristics or features of the robot 430 shown in FIGS. 4A through 4H. As is also shown in FIG. 13A, the robot 1330-2 may include one or more of the attributes, characteristics or features of the robot 330-1 shown in FIGS. 3A through 3F. As is further shown in FIG. 13A, the robot 1330-3 may include one or more of the attributes, characteristics or features of the robot 530 shown in FIGS. 5A through 5D. Those of ordinary skill in the pertinent arts will recognize that the robots 1330-1, 1330-2, 1330-3 may include any or all of the components described above with regard to the robots 130-1, 130-2, the robots 230-1, 230-2, the robots 330-1, 330-2, the robot 430, or the robot 530, or any of the other autonomous mobile robots disclosed or referenced herein, including but not limited to the robots 630, 730, 830, 930, 1030 of FIG. 6A, 6B, 7A, 7B, 8A or 8B, 9A through 9E or 10A through 10C.

Figure 13B:
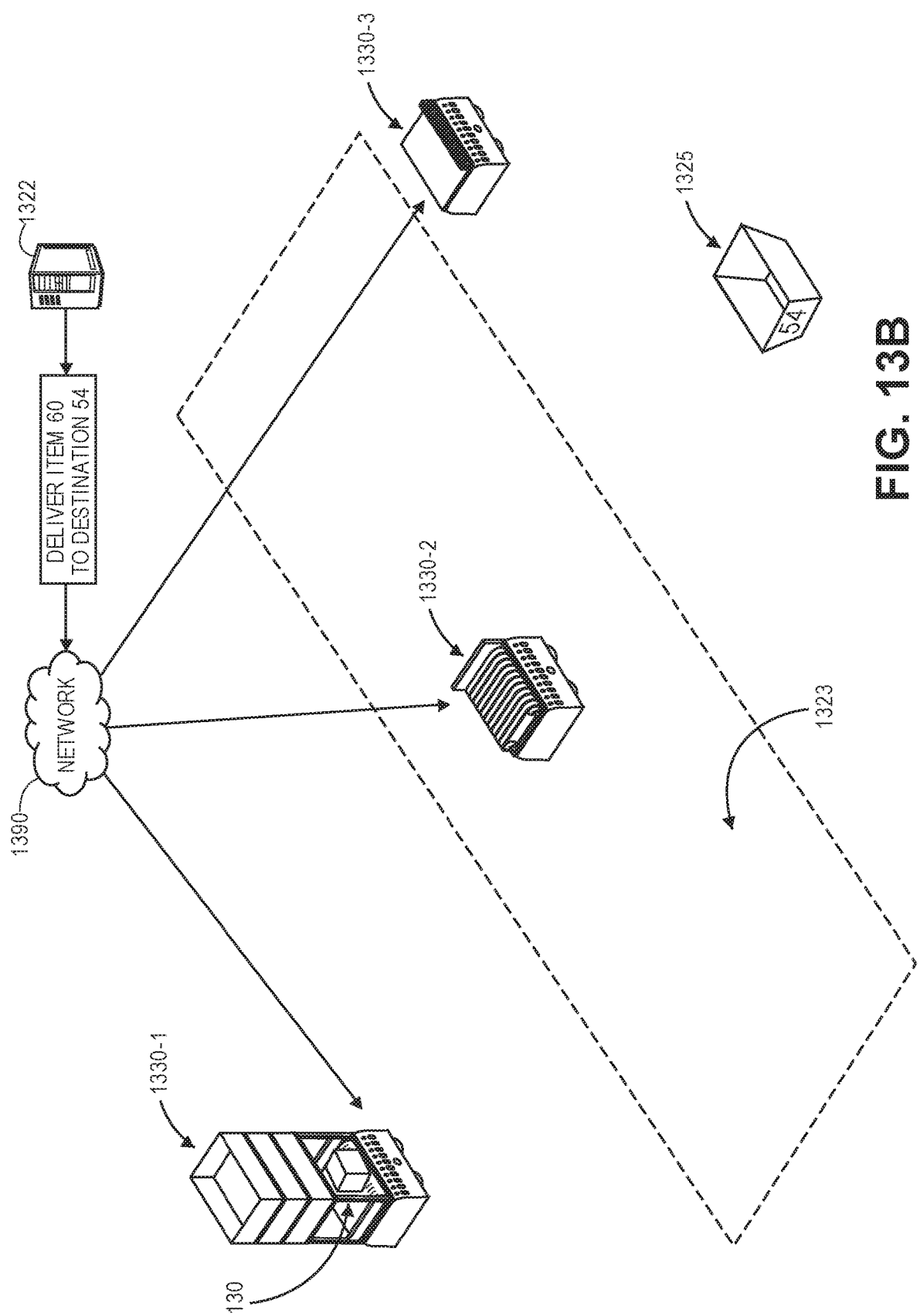

As is shown in FIG. 13B, the robot 1330-1, the robot 1330-2 and the robot 1330-3 may operate in a coordinated fashion to transport the item 130 to the bin 1325, particularly where an optimal path or route for the delivery of the item 130 passes through the restricted zone 1323, in whole or in part. For example, as is shown in FIG. 13B, the robot 1330-1, the robot 1330-2 and the robot 1330-3 may receive an instruction to deliver the item 130 to the bin 1325 from a server 1322 over a network 1390. The instruction may identify or select a path or route (e.g., an optimal path or route) from a location of the robot 1330-1, e.g., a location of the item 130, to the location of the bin 1325.

Figure 13C:
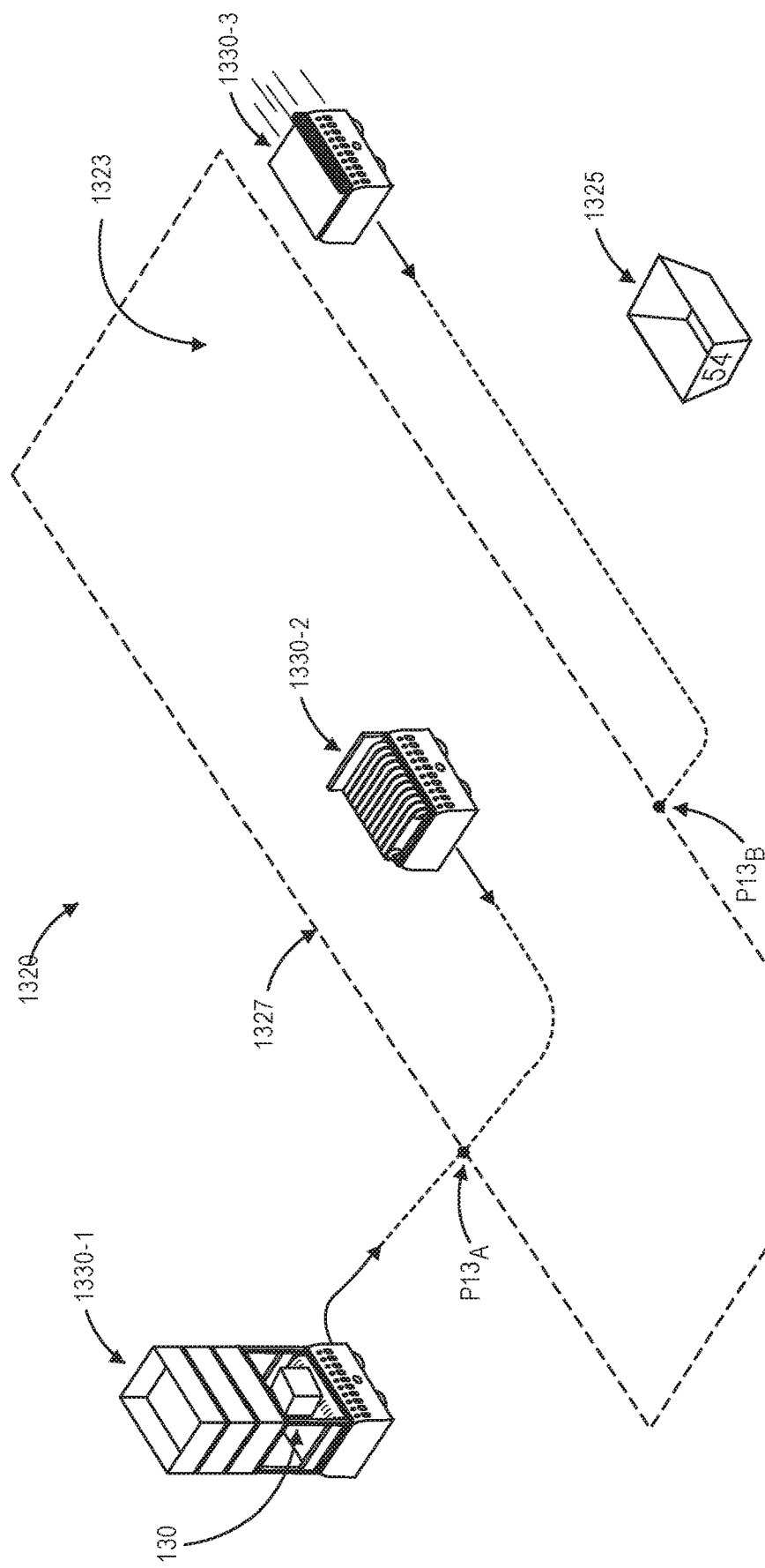

As is shown in FIGS. 13C-13H, where the path or route for transporting the item 130 passes through the restricted zone 1323, a pair of rendezvous points $P_{13A}$, $P_{13B}$ for the transfer of the item 130 may be selected at points on the boundary 1327, e.g., based on coordinates or other physical or logical identifiers. As is shown in FIG. 13C, the robot 1330-1 may then determine a path or route to the rendezvous point $P_{13A}$ from outside of the restricted zone 1323, while the robot 1330-2 may then determine a path or route to the rendezvous point $P_{13A}$ from within the restricted zone 1323. Concurrently, or at a later time, the robot 1330-3 may determine a path or route to the rendezvous point $P_{13B}$ from outside of the restricted zone 1323.

Figure 13D:
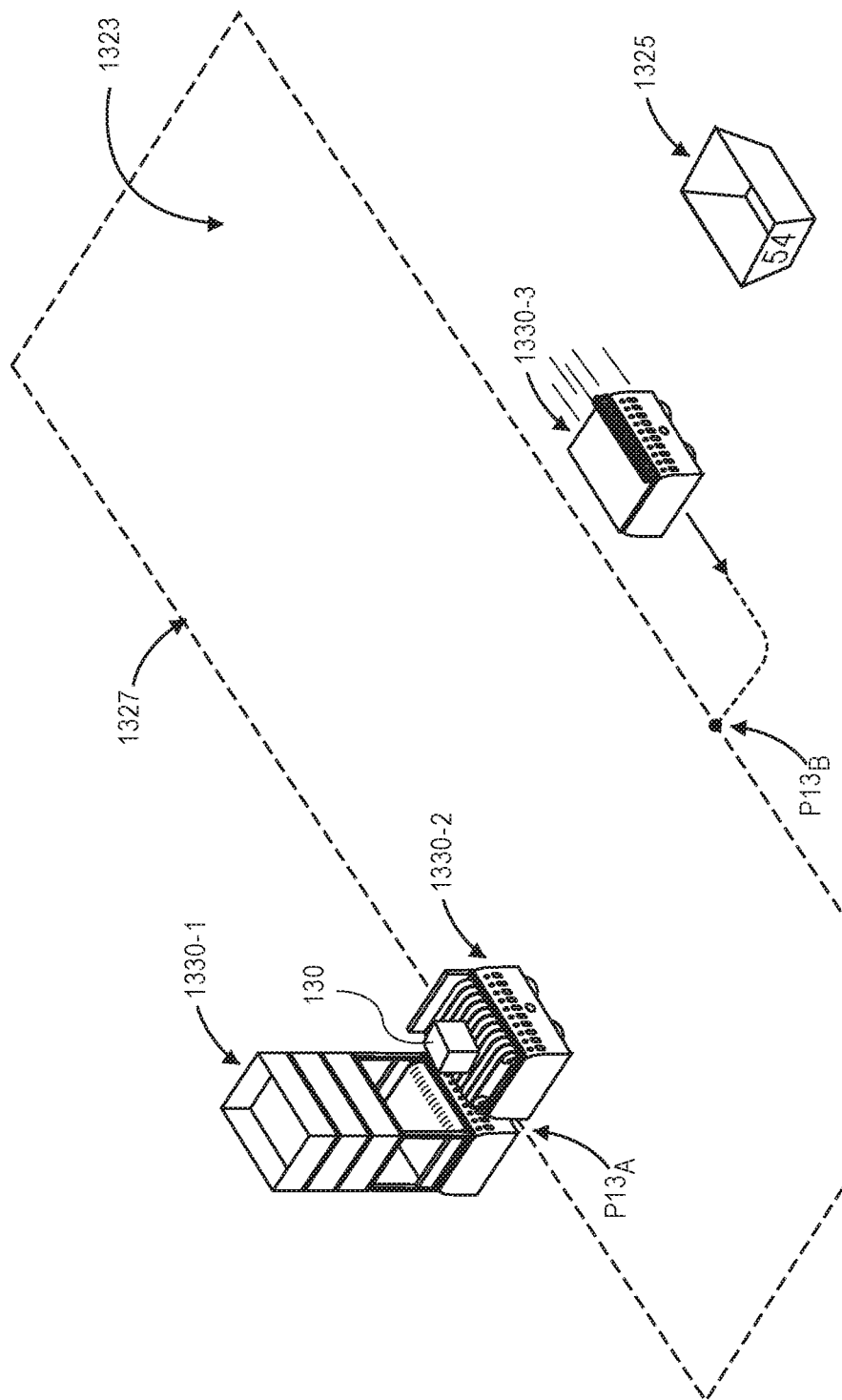

As is shown in FIG. 13D, when the robot 1330-1 has arrived at the rendezvous point $P_{13A}$ outside of the restricted zone 1323, and the robot 1330-2 has arrived at the rendezvous point $P_{13A}$ within the restricted zone 1323, each of the robots 1330-1, 1330-2 may confirm their respective positions and/or alignments with respect to one another, e.g., using one or more sensors. The robot 1330-1 may then transfer the item 130 to the robot 1330-2 by one or more transfer systems, e.g., by operating one or more individually deployable floors, addressable conveyors or addressable diverters. Either the robot 1330-1 or the robot 1330-2, or both the robot 1330-1 and the robot 1330-2, may raise, lower or translate one or more transfer systems or components thereof with respect to a drive unit, or orient the transfer systems or components at any selected angles, as desired, in preparing to transfer the item therebetween.

Figure 13E:
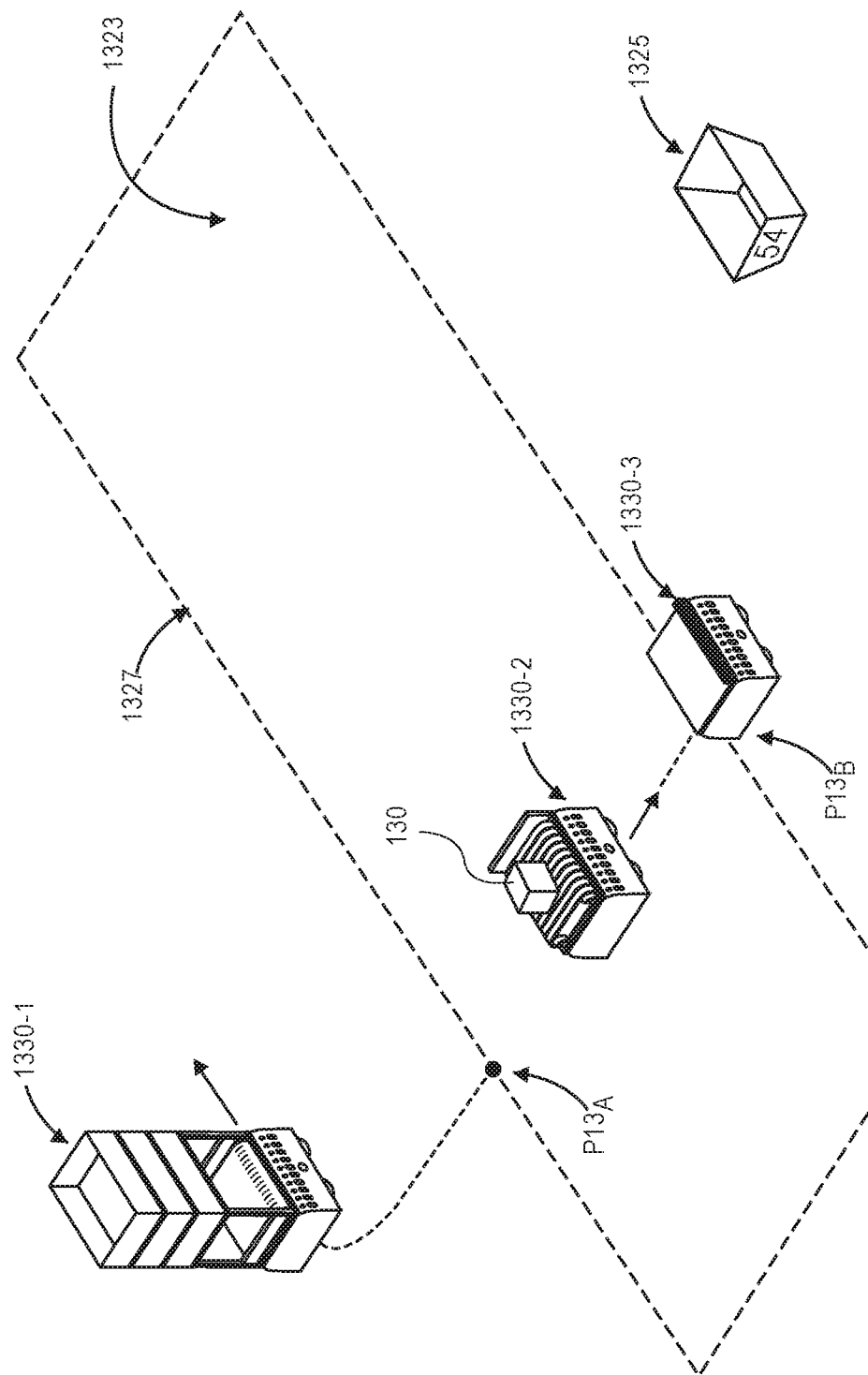

As is shown in FIG. 13E, after the item 130 has been transferred from the robot 1330-1 to the robot 1330-2 at the rendezvous point $P_{13A}$, the robot 1330-1 may receive further tasking outside of the restricted zone 1323. The robot 1330-2 may then determine a path or route from the rendezvous point $P_{13A}$ to the rendezvous point $P_{13B}$ within the restricted zone 1323. The robot 1330-3 may, upon arriving at the rendezvous point $P_{13B}$, confirm its position at the rendezvous point $P_{13B}$ and align itself to receive the item 130 from the robot 1330-2, e.g., based on information or data captured by one or more sensors or received over the network 1390. Alternatively, where the bin 1325 is located within the restricted zone 1323, the robot 1330-2 may determine a part or route from the rendezvous point $P_{13A}$ to the bin 1325 within the restricted zone 1323, and transfer the item 130 into the bin 1325 within the restricted zone 1323 without having to transfer the item 130 to any human, another robot or another system.

Figure 13F:
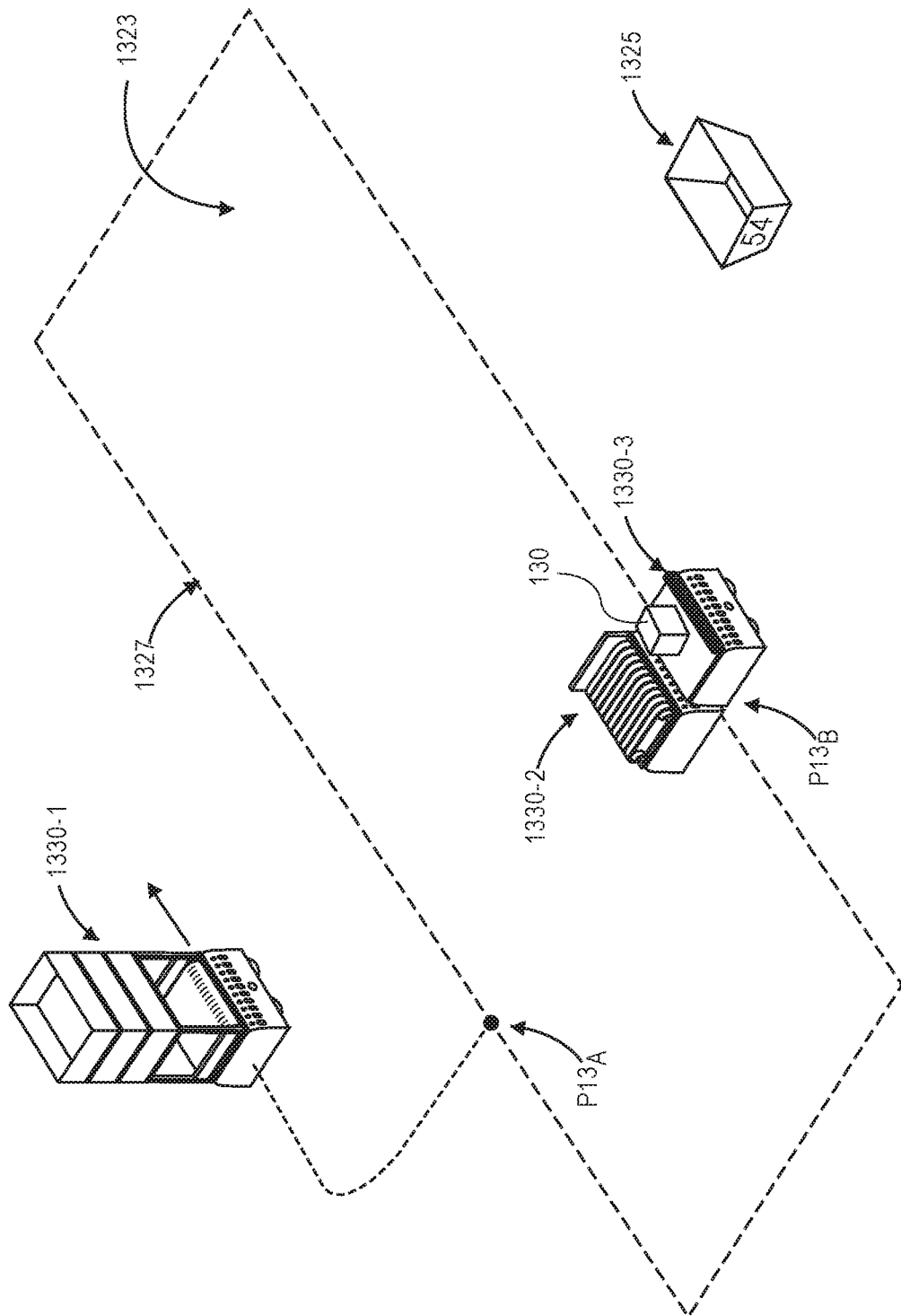

As is shown in FIG. 13F, upon the arrival of the robot 1330-2 at the rendezvous point $P_{13B}$, each of the robots 1330-2, 1330-3 may confirm their respective positions and/or alignments with respect to one another, e.g., using one or more sensors. The robot 1330-2 may then transfer the item 130 to the robot 1330-3 by one or more transfer systems, e.g., by operating one or more individually deployable floors, addressable conveyors or addressable diverters. Either the robot 1330-2 or the robot 1330-3, or both the robot 1330-2 and the robot 1330-3, may raise, lower or translate one or more transfer systems or components thereof with respect to a drive unit, or orient the transfer systems or components at any selected angles, as desired, in preparing to transfer the item therebetween.

Figure 13H:
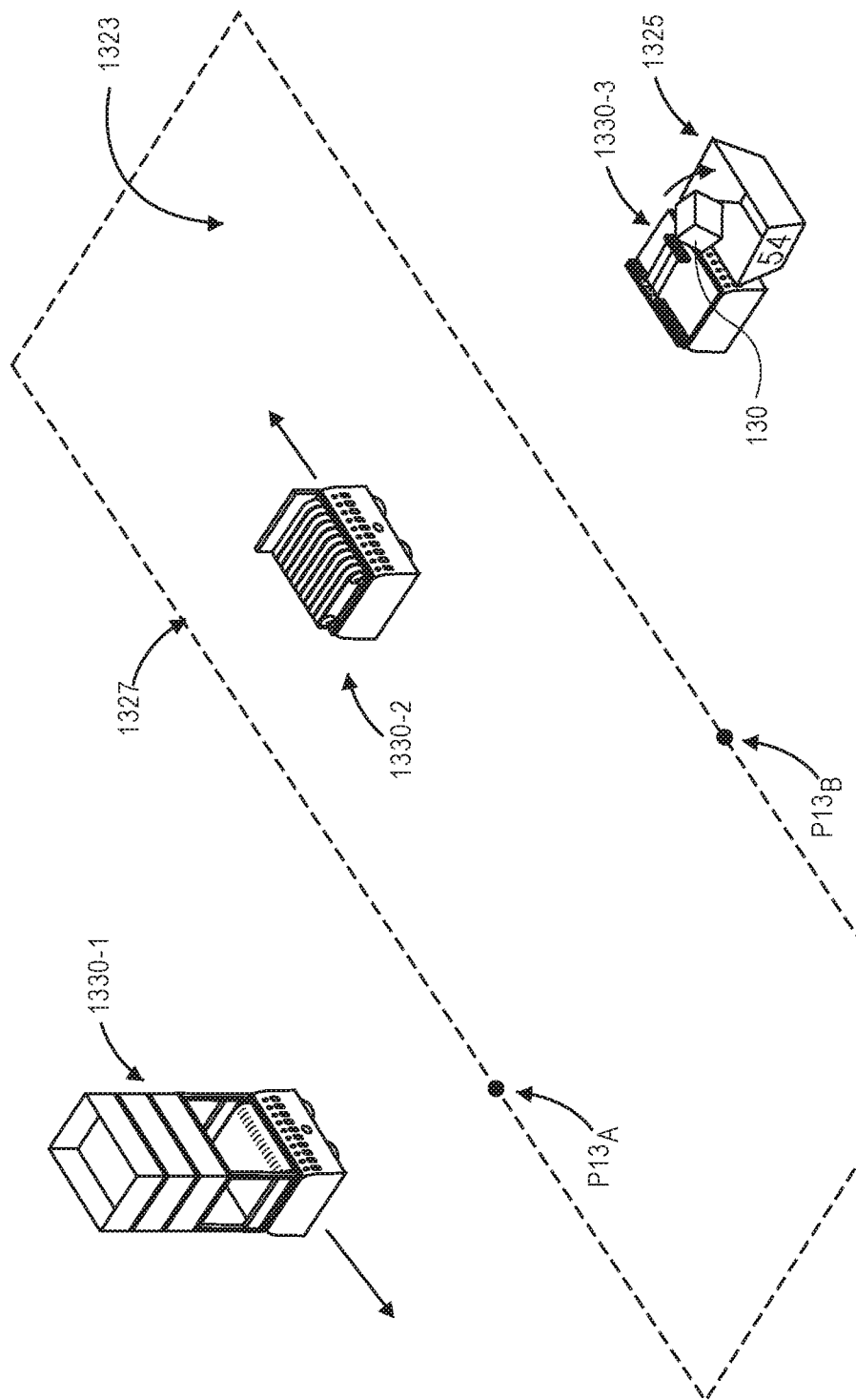

As is shown in FIG. 13G, after the item has been transferred from the robot 1330-2 to the robot 1330-3 at the rendezvous point $P_{13B}$, the robot 1330-2 may receive further tasking within the restricted zone 1323. The robot 1330-3 may then determine a path or route from the rendezvous point $P_{13B}$ to the bin 1325. As is shown in FIG. 13H, when the robot 1330-3 has arrived at the bin 1325, the robot 1330-3 may confirm its position and/or alignment with respect to the bin 1325, e.g., using one or more sensors, and transfer the item 130 into the bin 1325. The robot 1330-3 may then receive further tasking outside of the restricted zone 1323.

Although some of the embodiments shown herein describe the use of autonomous mobile robots to receive items from one or more sources (e.g., one or more humans, robots or other systems) within a fulfillment center environment, to transport the items to one or more destinations at the fulfillment center environment, and to discharge the items to one or more recipients (e.g., one or more humans, robots or other systems), those of ordinary skill in the pertinent arts will recognize that the systems and methods disclosed herein are not so limited. Rather, the autonomous mobile robots and the transfer systems disclosed herein may be used to receive multiple items from multiple sources and to discharge the multiple items at multiple destinations, in any application or for any purpose, and need not be limited to operations in fulfillment center environments.

Furthermore, any of the systems and components of the autonomous mobile robots and/or transfer systems disclosed herein may be utilized with or incorporated into one another, even if such systems or components are not expressly shown or disclosed together within the present disclosure. For example, where a transfer system includes a plurality of addressable conveyors defining a loading surface or a storage surface, the transfer system may include one or more proximity sensors, load sensors or any other sensors for detecting or identifying items on the loading surface or storage surface, in addition to or as alternatives for tension sensors within belts or other carrying media of such conveyors. Where a transfer system includes a receptacle having a plurality of deployable floors defining one or more storage chambers therein, and a conveyor disposed beneath or otherwise in association with the receptacle, the transfer system may further include one or more imaging devices or other sensors for detecting or identifying items on loading surfaces or storage surfaces defined by the deployable floors. Additionally, references to a "vertical receptacle" herein may also describe receptacles that are not aligned vertically per se, viz., with one or more axes that are normal or perpendicular to a horizontal plane. For example, in some embodiments, one or more of the receptacles disclosed herein may be aligned at either vertical or non-vertical angles, and may include an opening or other discharge port that is positioned above a conveyor, or is otherwise configured to discharge items onto the conveyor. Moreover, the receptacles disclosed herein may have any dimensions or shapes, and may have any cross-sectional areas, heights, capacities or other attributes in accordance with the present disclosure.

Where a transfer system includes a plurality of addressable diverters configured to be extended or retracted across a loading surface or storage surface, the transfer system may include one or more tension sensors, load sensors, imaging devices or other sensors for detecting or identifying items on the loading surface or storage surface, in addition to or as alternatives for proximity sensors provided within contact surfaces of such diverters. For example, in some embodiments, a transfer system may comprise a plurality of independently addressable conveyors, such as the conveyors 355-$i$ shown in FIG. 3A, along with a plurality of proximity sensors, such as the proximity sensors 554-$i$ shown in FIG. 5A, disposed at one edge or end of a loading surface or storage surface.

Moreover, any of the processes disclosed herein may be utilized with or incorporated into one another, even if such processes are not expressly shown or disclosed together within the present disclosure. For example, a first robot may be programmed or instructed to receive a plurality of items from one or more sources and to discharge the items at a plurality of recipients or destinations, one of which may be a second robot that is configured and/or authorized to transport an item into or through a zone or other two-dimensional area where the first robot is not authorized to operate.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 11 or 12, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An autonomous mobile robot comprising:
   a transfer system comprising at least one storage surface, wherein the transfer system is configured to receive a plurality of items on the at least one storage surface and to independently discharge one or more of the plurality of items from the at least one storage surface;
   a mobile drive unit comprising:
      an electric motor coupled to at least one of a plurality of wheels, wherein the electric motor is configured to cause the at least one of a plurality of wheels to rotate at a selected speed;
      a steering system for selecting an orientation of at least one of the plurality of wheels;
      a position sensor;
      at least one wireless transceiver;
      at least one power source for providing electrical power to each of the electric motor, the steering system, the position sensor, the at least one wireless transceiver and the transfer system;
      at least one computer processor in communication with each of the electric motor, the steering system, the position sensor, the at least one wireless transceiver and the transfer system,
   wherein the transfer system is releasably coupled to the mobile drive unit, and
   wherein the at least one computer processor is configured to cause the autonomous mobile robot to perform a method comprising:

receiving a first item and a second item on the at least one storage surface at a first location within a fulfillment center, wherein at least one of the first item or the second item is received from one of a human or a machine;

receiving an instruction to transport the first item to a second location within the fulfillment center and the second item to a third location within the fulfillment center over a network;

determining an optimal route for transporting the first item to the second location and the second item to the third location, wherein the optimal route comprises a first segment between the first location and the second location and a second segment between the second location and the third location;

causing the autonomous mobile robot to travel on an operating surface at the fulfillment center from the first location to the second location along at least a portion of the first segment;

determining that the autonomous mobile robot has arrived at the second location;

in response to determining that the autonomous mobile robot has arrived at the second location, causing the first item to be discharged into a first chute at the second location, wherein the first chute extends from the second location to a fourth location below the operating surface, and wherein discharging comprises maintaining the second item on the at least one storage surface;

causing the autonomous mobile robot to travel on the operating surface from the second location to the third location along at least a portion of the second segment;

determining that the autonomous mobile robot has arrived at the third location; and in response to determining that the autonomous mobile robot has arrived at the third location, causing the second item to be discharged into a second chute at the third location, wherein the second chute extends through the operating surface from the third location to a fifth location below the operating surface.

2. The autonomous mobile robot of claim 1, wherein the transfer system further comprises:

a plurality of conveyor belts, wherein the at least one storage surface is defined by upper surfaces of at least some of the plurality of conveyor belts;

a plurality of tension sensors, wherein each of the tension sensors is disposed within one of the plurality of conveyor belts, and wherein each of the tension sensors is in communication with the at least one computer processor; and a plurality of actuators, wherein each of the plurality of actuators is configured to independently translate one of the conveyor belts in a first direction or a second direction, and wherein each of the plurality of actuators is in communication with the at least one computer processor, and wherein causing the first item to be discharged into the first chute at the second location comprises:

receiving signals from each of the tension sensors;

identifying, based at least in part on the signals, a subset of the plurality of conveyor belts on which the first item rests;

selecting one of the first direction or the second direction corresponding to the first chute; and operating a subset of the plurality of actuators to cause each of the subset of conveyor belts to translate in the selected one of the first direction or the second direction, wherein each of the subset of the plurality of actuators is configured to independently translate one of the subset of the plurality of conveyor belts.

3. The autonomous mobile robot of claim 1, wherein the transfer system further comprises:

a receptacle having an internal cavity;

a first deployable floor configured to translate between a first storage position within the internal cavity of the receptacle and a first release position at least partially outside of the internal cavity of the receptacle, and wherein the first deployable floor comprises a first actuator in communication with the at least one computer processor;

a second deployable floor above the first deployable floor, wherein the second deployable floor is configured to translate between a second storage position within the internal cavity of the receptacle and a second release position at least partially outside of the internal cavity of the receptacle, and wherein the second deployable floor comprises a second actuator in communication with the at least one computer processor;

a first storage chamber defined by the internal cavity of the receptacle, an upper surface of the first deployable floor and a lower surface of the second deployable floor;

a second storage chamber defined by the internal cavity of the receptacle and an upper surface of the second deployable floor, wherein the second storage chamber is disposed above the first storage chamber, wherein the at least one storage surface is defined by the upper surface of the first deployable floor and the upper surface of the second deployable floor; and a conveyor having a conveyor belt and a third actuator, wherein the third actuator is configured to translate the conveyor belt in a first direction or a second direction, and wherein the third actuator is in communication with the at least one computer processor, and wherein causing the first item to be discharged into the first chute at the second location comprises:

determining that the first item is disposed within the first storage chamber;

causing the first deployable floor to translate from the first storage position to the first release position;

selecting one of the first direction or the second direction corresponding to the first chute; and operating the third actuator to cause the conveyor belt to translate in the selected one of the first direction or the second direction.

4. The autonomous mobile robot of claim 1, wherein the transfer system further comprises:

a plurality of diverters, wherein each of the plurality of diverters comprises:

a contact element coupled to a shaft;

a motor coupled to the shaft, wherein the motor is configured to extend or retract the shaft over the at least one storage surface, and wherein the motor is in communication with the at least one computer processor;

an actuator configured to operate the motor, wherein the actuator is in communication with the at least one computer processor; and a proximity sensor disposed within the contact element, wherein each of the proximity sensors is configured to calculate a distance between the contact element and an item in a direction normal to the contact element, and wherein each of the proximity sensors is in communication with the at least one computer processor, and wherein causing the first item to be discharged into the first chute at the first location comprises:
receiving signals from each of the proximity sensors;
calculating, based at least in part on the signals, distances between contact elements of a subset of the diverters and portions of the first item;
selecting distances for extending shafts of each of the subset of the diverters based at least in part on the distances between the contact elements of the subset of the diverters and the portions of the first item; and
causing actuators of the motors of the subset of the plurality of diverters to extend the shafts by at least the selected distances.

5. A method comprising:
determining, by at least one computer processor aboard a first autonomous mobile robot, that a first item is disposed on at least one storage surface of a first transfer system releasably coupled to a first drive unit of the first autonomous mobile robot and a second item is disposed on the at least one storage surface of the first transfer system, wherein the first transfer system comprises:
a plurality of conveyor belts, wherein the at least one storage surface is defined by upper surfaces of at least some of the plurality of conveyor belts;
a plurality of tension sensors, wherein each of the plurality of conveyor belts comprises at least one of the plurality of tension sensors disposed therein; and
a plurality of actuators, wherein each of the plurality of actuators is configured to independently translate one of the conveyor belts in at least one of a first direction or a second direction, and
wherein the first item is disposed at a first position on the at least one storage surface and wherein the second item is disposed at a second position on the at least one surface;
receiving, by a transceiver aboard the first autonomous mobile robot, an instruction to transport the first item to a first location;
causing, by at least a first motor of the first drive unit, the first autonomous mobile robot to travel to the first location;
determining, by at least one sensor associated with the first autonomous mobile robot, that the first autonomous mobile robot is within a vicinity of the first location; and
discharging the first item from the at least one storage surface by the first transfer system, wherein discharging the first item from the at least one storage surface comprises:
identifying, based at least in part on first signals received from at least some of the plurality of tension sensors, at least a first one of the plurality of conveyor belts on which the first item rests; and
causing at least a first one of the plurality of actuators to translate at least the first one of the plurality of conveyor belts in one of the first direction or the second direction,
wherein the second item remains in the second position on the at least one storage surface as the first item is discharged.

6. The method of claim 5, further comprising:
causing, by at least the first motor, the first autonomous mobile robot to travel to a second location;
determining, by the at least one sensor, that the first autonomous mobile robot is within a vicinity of the second location; and
discharging the second item from the at least one storage surface by the first transfer system.

7. The method of claim 6, wherein discharging the second item from the at least one storage surface by the first transfer system comprises:
identifying, based at least in part on second signals received from at least some of the plurality of tension sensors, at least a second one of the plurality of conveyor belts on which the second item rests; and
causing at least a second one of the plurality of actuators to translate at least the second one of the plurality of conveyor belts in one of the first direction or the second direction,
wherein the second item is discharged from the at least one storage surface by the translation of at least the second one of the plurality of conveyor belts in the one of the first direction or the second direction.

8. The method of claim 5, further comprising:
receiving at least the first item and the second item from at least a first source,
wherein the first source is one of a first conveyor or a second autonomous mobile robot.

9. The method of claim 5, wherein the first location is associated with at least one of a first conveyor, a first chute or a second autonomous mobile robot, and
wherein discharging the first item from the at least one storage surface comprises:
discharging at least the first item to the at least one of the first conveyor, the first chute or the second autonomous mobile robot.

10. The method of claim 5, further comprising:
receiving, by a transceiver aboard a second autonomous mobile robot, an instruction to receive the first item from the first autonomous mobile robot at the first location, wherein the second autonomous mobile robot comprises a second transfer system releasably coupled to a second drive unit;
causing, by at least a second motor aboard the second drive unit, the second autonomous mobile robot to travel to the first location;
determining, by at least one sensor associated with the second autonomous mobile robot, that the second autonomous mobile robot is within a vicinity of the first location; and
receiving, by the second transfer system, the first item from the first transfer system.

11. The method of claim 5, further comprising:
selecting at least one of an angle or a height of at least a portion of the at least one storage surface for discharging the first item,
wherein the at least one of the angle or the height is selected based at least in part on at least one of a size of the first item, a shape of the first item, a mass of the first item or a friction property of at least one outer surface of the first item, and
wherein the portion of the at least one storage surface comprises the first position; and
causing, by the first transfer system, at least the portion of the at least one storage surface to be aligned at the angle or provided at the height, wherein the first item is discharged with the at least one storage surface aligned at the angle or provided at the height.

12. A method comprising:
   determining, by at least one computer processor aboard a first autonomous mobile robot, that a first item is disposed on at least one storage surface of a first transfer system releasably coupled to a first drive unit of the first autonomous mobile robot and a second item is disposed on the at least one storage surface of the first transfer system, wherein the first item is disposed at a first position on the at least one storage surface and wherein the second item is disposed at a second position on the at least one surface, and wherein the first transfer system comprises:
   a receptacle having an internal cavity;
   a first deployable floor configured to translate between a first storage position within the internal cavity of the receptacle and a first release position at least partially outside of the internal cavity of the receptacle;
   a second deployable floor above the first deployable floor, wherein the second deployable floor is configured to translate between a second storage position within the internal cavity of the receptacle and a second release position at least partially outside of the internal cavity of the receptacle;
   a first storage chamber defined by the internal cavity of the receptacle, an upper surface of the first deployable floor and a lower surface of the second deployable floor;
   a second storage chamber defined by the internal cavity of the receptacle and an upper surface of the second deployable floor, wherein the second storage chamber is disposed above the first storage chamber, wherein the at least one storage surface comprises the upper surface of the first deployable floor and the upper surface of the second deployable floor; and
   a conveyor configured to translate a belt in at least one of a first direction or a second direction, wherein the belt is disposed beneath a lower surface of the first deployable floor;
   receiving, by a transceiver aboard the first autonomous mobile robot, an instruction to transport the first item to a first location;
   determining that the first item is disposed within the first storage chamber;
   causing, by at least a first motor of the first drive unit, the first autonomous mobile robot to travel to the first location;
   determining, by at least one sensor associated with the first autonomous mobile robot, that the first autonomous mobile robot is within a vicinity of the first location; and
   discharging the first item from the at least one storage surface by the first transfer system, wherein the second item remains in the second position on the at least one storage surface as the first item is discharged,
   wherein discharging the first item from the at least one storage surface comprises:
      translating the first deployable floor from the first storage position to the first release position; and
      operating the conveyor to translate the belt in one of the first direction or the second direction.

13. The method of claim 12, further comprising:
   causing, by at least the first motor, the first autonomous mobile robot to travel to a second location;
   determining, by the at least one sensor, that the first autonomous mobile robot is within a vicinity of the second location;
   determining that the second item is disposed within the second storage chamber; and
   discharging the second item from the at least one storage surface by the first transfer system,
   wherein discharging the second item from the at least one storage surface comprises:
      translating, with the first deployable floor in the first release position, the second deployable floor from the second storage position to the second release position; and
      operating the conveyor to translate the belt in one of the first direction or the second direction.

14. A method comprising:
   determining, by at least one computer processor aboard a first autonomous mobile robot, that a first item is disposed on at least one storage surface of a first transfer system releasably coupled to a first drive unit of the first autonomous mobile robot and a second item is disposed on the at least one storage surface of the first transfer system, wherein the first item is disposed at a first position on the at least one storage surface and wherein the second item is disposed at a second position on the at least one surface, and wherein the first transfer system further comprises:
   a plurality of diverters associated with the at least one storage surface, wherein each of the plurality of diverters comprises:
      a contact element;
      a motor configured to extend or retract the contact element over the at least one storage surface; and
      a proximity sensor disposed within the contact element, wherein each of the proximity sensors is configured to calculate a distance between the contact element and an item in a direction normal to the contact element;
   receiving, by a transceiver aboard the first autonomous mobile robot, an instruction to transport the first item to a first location;
   causing, by at least a first motor of the first drive unit, the first autonomous mobile robot to travel to the first location;
   determining, by at least one sensor associated with the first autonomous mobile robot, that the first autonomous mobile robot is within a vicinity of the first location; and
   discharging the first item from the at least one storage surface by the first transfer system, wherein the second item remains in the second position on the at least one storage surface as the first item is discharged,
   wherein discharging the first item from the at least one storage surface comprises:
      calculating, based at least in part on first signals received from proximity sensors of a first subset of the diverters, first distances between contact elements of the first subset of the diverters and portions of the first item; and
      extending the contact elements of the first subset of the diverters by at least the first distances.

15. The method of claim 14, further comprising:
   causing, by at least the first motor, the first autonomous mobile robot to travel to a second location;
   determining, by the at least one sensor, that the first autonomous mobile robot is within a vicinity of the second location; and discharging the second item from the at least one storage surface by the first transfer system,
wherein discharging the second item from the at least one storage surface comprises:
calculating, based at least in part on second signals received from proximity sensors of a second subset of the diverters, second distances between contact elements of the second subset of the diverters and portions of the second item; and
extending the contact elements of the second subset of the diverters by at least the second distances.

16. The method of claim 14, wherein the first location is associated with at least one of a first conveyor, a first chute or a second autonomous mobile robot, and
wherein at least the first item is discharged to the at least one of the first conveyor, the first chute or the second autonomous mobile robot.

17. A method comprising:
identifying a plurality of autonomous mobile robots at a fulfillment center, wherein a first autonomous mobile robot is one of the plurality of autonomous mobile robots, wherein the first autonomous mobile robot comprises a first transer system and a first drive unit, and wherein the first transfer system is releasably coupled to the first drive unit;
determining at least one of a first time or a first cost required for each of the plurality of autonomous mobile robots to receive the first item and the second item from at least a first source, wherein at least the first source and a first location are within the fulfillment center;
determining at least one of a second time or a second cost required for each of the plurality of autonomous mobile robots to transport at least the first item from the first source to the first location;
selecting one of the plurality of autonomous mobile robots based at least in part on the at least one of the first time or the first cost determined for the selected one of the plurality of autonomous mobile robots and the at least one of the second time and the second cost determined for the selected ne of the plurality of autonomous mobile robots, wherein the first autonomous mobile robot is the selected one of the plurality of autonomous mobile robots;
causing the first autonomous mobile robot to receive the first item and the second item from at least the first source;
determining, by at least one computer processor aboard the first autonomous mobile robot, that the first item is disposed at a first position on at least one storage surface of the first transfer system and that the second item is disposed at a second position on the at least one surface;
receiving, by a transceiver aboard the first autonomous mobile robot, an instruction to transport at least the first item to the first location;
causing, by at least a first motor of the first drive unit, the first autonomous mobile robot to travel to the first location in response to the instruction;
determining, by at least one sensor associated with the first autonomous mobile robot, that the first autonomous mobile robot is within a vicinity of the first location; and
discharging the first item from the at least one storage surface by the first transfer system, wherein the second item remains in the second position on the at least one storage surface as the first item is discharged.

18. A method comprising:
determining, by at least one computer processor aboard a first autonomous mobile robot, that a first item is disposed on at least one storage surface of a first transfer system releasably coupled to a first drive unit of the first autonomous mobile robot and a second item is disposed on the at least one storage surface of the first transfer system, wherein the first item is disposed at a first position on the at least one storage surface and wherein the second item is disposed at a second position on the at least one surface, wherein the first autonomous mobile robot is authorized to operate within a first zone, wherein the first autonomous mobile robot is not authorized to operate in a second zone, and wherein the second zone abuts the first zone at a first boundary;
receiving, by a transceiver aboard the first autonomous mobile robot, an instruction to transfer the first item to a second autonomous mobile robot at the first location, wherein the second autonomous mobile robot is authorized to operate in the second zone, and wherein the first location is on the first boundary;
receiving, by a transceiver aboard the second autonomous mobile robot, an instruction to receive the first item from the first autonomous mobile robot at the first location, wherein the second autonomous mobile robot comprises a second transfer system releasably coupled to a second drive unit;
causing, by at least a first motor of the first drive unit, the autonomous mobile robot to travel to the first location;
causing, by at least a second motor of the second drive unit, the second autonomous mobile robot to travel to the first location;
determining, by at least one sensor associated with the second autonomous mobile robot, that the second autonomous mobile robot is within a vicinity of the first location;
discharging the first item from the at least one storage surface by the first transfer system, wherein the second item remains in the second postion on the at least one storage surface as the first item is discharged;
receiving, by the second transfer system, the first item from the first transfer system, wherein the first item is received on at least one storage surface of the second transfer system;
receiving, by the transceiver aboard the second autonomous mobile robot, an instruction to transport the first item to a second location within the second zone; and
causing, by at least the second motor, the second autonomous mobile robot to travel to the second location.

19. The method of claim 18, further comprising:
receiving, by the transceiver aboard the second autonomous mobile robot, an instruction to transfer the first item to a third autonomous mobile robot at the second location, wherein the third autonomous mobile robot is authorized to operate in a third zone, wherein the second autonomous mobile robot is not authorized to operate in the third zone, wherein the third zone abuts the second zone at a second boundary, wherein the second location is on the second boundary, and wherein the third autonomous mobile robot comprises a third transfer system releasably coupled to a third drive unit;
receiving, by a transceiver aboard the third autonomous mobile robot, an instruction to receive the first item from the second autonomous mobile robot at the second location;

causing, by at least a third motor of the third drive unit, the third autonomous mobile robot to travel to the second location;

discharging, by the second transfer system, the first item from at least one storage surface of the second transfer system;

receiving, by the third transfer system, the first item from the second transfer system, wherein the first item is received on at least one storage surface of the third transfer system;

receiving, by the transceiver aboard the third autonomous mobile robot, an instruction to transport the first item to a third location within the third zone;

causing, by at least the third motor, the third autonomous mobile robot to travel to the third location; and discharging, by the third transfer system, the first item from the at least one storage surface of the third transfer system at the third location.

20. A distribution system comprising:
  a first autonomous mobile robot having a first transfer system;
  a second autonomous mobile robot having a second transfer system; and
  a computer system in communication with each of the first autonomous mobile robot and the second autonomous mobile robot,
  wherein the computer system is programmed with a plurality of instructions that, when executed by one or more computer processors of the computer system, cause the computer system to execute a method comprising:
    receiving, over a network, a request to deliver an item from a first location within a fulfillment center associated with the distribution system to a second location within the fulfillment center at a first time, wherein the item is disposed on the first transfer system at the first time;
    determining that the first location is within a first area in which the first autonomous mobile robot is permitted to operate;
    determining that the second location is within a second area in which the first autonomous mobile robot is not permitted to operate, wherein the second area abuts the first area at a boundary;
    determining that the second autonomous mobile robot is permitted to operate within the second area;
    selecting a rendezvous point for the first autonomous mobile robot and the second autonomous mobile robot, wherein the rendezvous point is associated with the boundary;
    transmitting a first instruction to proceed to the rendezvous point to the first autonomous mobile robot at a second time, wherein the first instruction comprises a first identifier of the rendezvous point;
    transmitting a second instruction to proceed to the rendezvous point to the second autonomous mobile robot at approximately the second time, wherein the second instruction comprises a second identifier of the rendezvous point;
    causing the first autonomous mobile robot to transfer the item to the second autonomous mobile robot by the first transfer system at the rendezvous point at a third time;
    causing the second autonomous mobile robot to receive the item from the first autonomous mobile robot by the second transfer system at the rendezvous point at approximately the third time;
    transmitting a third instruction to deposit the item at the second location to the second autonomous mobile robot at a fourth time, wherein the third instruction comprises a third identifier of the second location; and
    causing the second autonomous mobile robot to deposit the item at the second location at a fifth time.

21. The distribution system of claim 20, wherein the method further comprises:
  selecting at least one of a first angle or a first height for transferring the item from the first autonomous mobile robot to the second autonomous mobile robot based at least in part on at least one of a size of the item, a shape of the item, a mass of the item or a friction property of at least one outer surface of the item, wherein causing the first autonomous mobile robot to transfer the item to the second autonomous mobile robot by the first transfer system comprises at least one of:
    causing the first transfer system to be aligned at the first angle; or
    causing the first transfer system to be provided at the first height; and
  selecting at least one of a second angle or a second height for receiving the item from the first autonomous mobile robot by the second autonomous mobile robot based at least in part on the at least one of the size of the item, the shape of the item, the mass of the item or the friction property of the at least one outer surface of the item, wherein causing the second autonomous mobile robot to receive the item from the first autonomous mobile robot by the second transfer system comprises at least one of:
    causing the second transfer system to be aligned at the second angle; or
    causing the second transfer system to be provided at the second height.

22. The distribution system of claim 20, wherein the first transfer system comprises one of:
  a first plurality of individually addressable conveyors, wherein each of the first plurality of individually addressable conveyors comprises a motor in communication with a processor aboard the first autonomous mobile robot, wherein each of the motors is configured to operate a conveyor in a selected direction, and wherein each of the conveyors comprises a tension sensor within a belt;
  a first receptacle comprising a first chamber disposed above a first conveyor, wherein the first chamber is disposed above the first conveyor and wherein the first chamber is defined by a first deployable door and an interior cavity of the first receptacle, wherein the first deployable door and the first conveyor are in communication with the processor aboard the first autonomous mobile robot; or
  a first plurality of individually addressable diverters, wherein each of the first plurality of individually addressable diverters comprises a shaft having a proximal end coupled to a motor and a distal end coupled to a contact surface, wherein each of the motors is in communication with the processor aboard the first autonomous mobile robot, wherein each of the motors is configured to extend or retract the contact surface by a selected distance, and wherein each of the contact surfaces comprises an optical sensor disposed therein; and
  wherein the second transfer system comprises one of:
  a second plurality of individually addressable conveyors, wherein each of the second plurality of individually addressable conveyors comprises a motor in communication with a processor aboard the second autonomous mobile robot, wherein each of the motors is configured to operate a conveyor in a selected direction, and wherein each of the conveyors comprises a tension sensor within a belt;

a second receptacle comprising a second chamber disposed above a second conveyor, wherein the second chamber is disposed above the second conveyor and wherein the second chamber is defined by a second deployable door and an interior cavity of the second receptacle, wherein the second deployable door and the second conveyor are in communication with the processor aboard the second autonomous mobile robot; or a second plurality of individually addressable diverters, wherein each of the second plurality of individually addressable diverters comprises a shaft having a proximal end coupled to a motor and a distal end coupled to a contact surface, wherein each of the motors is in communication with the processor aboard the second autonomous mobile robot, wherein each of the motors is configured to extend or retract the contact surface by a selected distance, and wherein each of the contact surfaces comprises an optical sensor disposed therein.

* * * * *

UNITED STATES PATENT AND TRADEMARK OFFICE
CERTIFICATE OF CORRECTION

PATENT NO. : 10,894,664 B1  
APPLICATION NO. : 16/023686  
DATED : January 19, 2021  
INVENTOR(S) : Tye Michael Brady and Joseph Quinlivan Page 1 of 1

It is certified that error appears in the above-identified patent and that said Letters Patent is hereby corrected as shown below:

In the Claims

Column 47:
Line 24, Claim 17, "comprises a first transer system and a first drive unit" should read as --comprises a first transfer system and a first drive unit--.
Line 41, Claim 17, "determine for the selected ne of the plurality of" should read as --determined for the selected one of the plurality of--.

Column 48:
Line 41, Claim 18, "item remains in the second postion on the at least one" should read as --item remains in the second position on the at least one--.

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*